US009727036B2

(12) United States Patent
Taniguchi et al.

(10) Patent No.: US 9,727,036 B2
(45) Date of Patent: Aug. 8, 2017

(54) OPERATION PLAN CREATING METHOD, COMPUTER PRODUCT, AND OPERATION PLAN CREATING APPARATUS

(71) Applicant: FUJITSU LIMITED, Kawasaki-shi, Kanagawa (JP)

(72) Inventors: Tsuyoshi Taniguchi, Kawasaki (JP); Yoshio Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 555 days.

(21) Appl. No.: 14/463,186

(22) Filed: Aug. 19, 2014

(65) Prior Publication Data

US 2014/0358307 A1    Dec. 4, 2014

Related U.S. Application Data

(63) Continuation of application No. PCT/JP2012/056309, filed on Mar. 12, 2012.

(51) Int. Cl.
*G05B 13/04* (2006.01)
*H02J 7/00* (2006.01)
(Continued)

(52) U.S. Cl.
CPC ............ *G05B 13/04* (2013.01); *G05B 13/02* (2013.01); *G06Q 10/06* (2013.01); *G06Q 50/06* (2013.01); *H01M 10/44* (2013.01); *H02J 3/28* (2013.01); *H02J 3/32* (2013.01); *H02J 7/00* (2013.01); *H02J 7/35* (2013.01); *H02J 7/28* (2013.01);
(Continued)

(58) Field of Classification Search
None
See application file for complete search history.

(56) References Cited

U.S. PATENT DOCUMENTS

2012/0095608 A1* 4/2012 Murakami ............. G06Q 10/04
                                                    700/291
2013/0096728 A1* 4/2013 Steffes ...................... H02J 3/14
                                                    700/291

FOREIGN PATENT DOCUMENTS

JP    2005-086953    3/2005
JP    2008-141918    6/2008
(Continued)

OTHER PUBLICATIONS

Tao et al., "Forecasting Power Output for Grid-connected Photovoltaic Power System without using Solar Radiation Measurement", May 8, 2010.*
(Continued)

*Primary Examiner* — Qing Wu
(74) *Attorney, Agent, or Firm* — Staas & Halsey LLP

(57) ABSTRACT

An operation plan creating system, by simulation based on a supply and demand scenario, extracts for each time point during operation for one day, a scenario that raises the effect of correction of the operation at the time point. The operation plan creating system classifies action-requiring scenarios by action similarity. The operation plan creating system determines an action-requiring scenario group for which actions are similar, and a correction time. The operation plan creating system judges whether an early action scenario group can be identified by data available at an early action time on the current day. If identifiable, the operation plan creating system 103 creates an identification condition for the early action scenario group and an optimal operation plan for the scenarios satisfying the identification condition.

10 Claims, 33 Drawing Sheets

(51) Int. Cl.
  *H02J 3/28* (2006.01)
  *H02S 10/20* (2014.01)
  *H02J 7/28* (2006.01)
  *G05B 13/02* (2006.01)
  *H02J 3/32* (2006.01)
  *H02J 7/35* (2006.01)
  *G06Q 50/06* (2012.01)
  *H01M 10/44* (2006.01)
  *G06Q 10/06* (2012.01)
  *H02J 3/00* (2006.01)

(52) U.S. Cl.
  CPC ... *H02J 2003/003* (2013.01); *H02J 2003/007* (2013.01); *H02S 10/20* (2014.12); *Y02E 40/76* (2013.01); *Y02E 60/76* (2013.01); *Y04S 10/54* (2013.01); *Y04S 10/545* (2013.01); *Y04S 40/00* (2013.01); *Y04S 40/22* (2013.01)

(56) References Cited

FOREIGN PATENT DOCUMENTS

JP          4245583      3/2009
JP       2011-002929     1/2011

OTHER PUBLICATIONS

International Search Report mailed Jun. 12, 2012 in corresponding International Application PCT/JP2012/056309.
"Forecasting Electric Power Generation of Photovoltaic Power System for Energy Network", The Institute of Electrical Engineers of Japan Academic Journal B, vol. 127 (2007), No. 7, pp. 847-853.
"A Study of the Scheduling of Large-Scaled PV Power Station Ouput based on Solar Radiation Forecast", The Institute of Electrical Engineers of Japan Academic Journal B, vol. 129 (2009), No. 12, pp. 1514-1521.

* cited by examiner

| SUPPLY AND DEMAND SCENARIO ID | EARLY ACTION | | |
|---|---|---|---|
| | TIME | PLAN | GROUP ID |
| s1 | 9:00 | 270kW | ID_UP |
| s4 | 9:00 | 290kW | ID_UP |
| s7 | 9:00 | 250kW | ID_UP |
| s9 | 9:00 | 270kW | ID_UP |

| EARLY ACTION TIME | IDENTIFICATION CONDITION | CORRECTED OPERATION PLAN |
|---|---|---|
| 9:00 | CUMULATIVE SOLAR RADIATION IS 4.10MJ/$m^2$ OR LESS | BASE DISCHARGE VALUE 290kW |
| ... | ... | ... |

FIG.16

START
↓ S1601 (FIG.17)
EARLY ACTION SCENARIO EXTRACION PROCESS
↓ S1602 (FIG.21)
OUTPUT INFORMATION CREATION PROCESS
↓
END

FIG.23

| IDENTIFICATION CONDITION | ACTION | EFFECT FLAG |
|---|---|---|
| CUMULATIVE SOLAR RADIATION UNTIL 9:00 IS 1.0MJ/m² OR LESS TEMPERATURE IS 20 DEGREES OR MORE | BASE DISCHARGE VALUE 250 kW | UNAFFECTED |
| CUMULATIVE SOLAR RADIATION UNTIL 9:00 IS 1.0MJ/m² OR LESS TEMPERATURE IS LESS THAN 20 DEGREES | BASE DISCHARGE VALUE 220 kW | UNAFFECTED |
| CUMULATIVE SOLAR RADIATION UNTIL 9:00 IS MORE THAN 1.0MJ/m² CUMULATIVE SOLAR RADIATION UNTIL9:00 IS 7.0MJ/m² OR MORE | BASE DISCHARGE VALUE 150 kW | UNAFFECTED |
| CUMULATIVE SOLAR RADIATION UNTIL 9:00 IS MORE THAN 1.0MJ/m² CUMULATIVE SOLAR RADIATION UNTIL9:00 IS LESS THAN 7.0MJ/m² | BASE DISCHARGE VALUE 200 kW | AFFECTED |

PRE-VARIANCE HOURS OF SUNLIGHT

<div style="text-align:center">POST-VARIANCE HOURS OF SUNLIGHT</div>

|     | 0.0  | 0.1-0.5 | 0.6-0.9 | 1.0  |
|-----|------|---------|---------|------|
| 0.0 | 0.86 | 0.45    | 0.13    | 0.00 |
| 0.1 | 0.09 | 0.15    | 0.04    | 0.00 |
| 0.2 | 0.01 | 0.00    | 0.04    | 0.00 |
| 0.3 | 0.00 | 0.07    | 0.00    | 0.03 |
| 0.4 | 0.01 | 0.00    | 0.13    | 0.01 |
| 0.5 | 0.01 | 0.11    | 0.04    | 0.01 |
| 0.6 | 0.00 | 0.00    | 0.13    | 0.01 |
| 0.7 | 0.00 | 0.04    | 0.04    | 0.03 |
| 0.8 | 0.01 | 0.07    | 0.04    | 0.04 |
| 0.9 | 0.01 | 0.04    | 0.08    | 0.08 |
| 1.0 | 0.00 | 0.07    | 0.33    | 0.79 |

| SUPPLY AND DEMAND SCENARIO | ASSESSMENT VALUE FOR OPTIMAL OPERATION PLAN [kW] | OPTIMAL CONTROL PARAMETER [kW] |
|---|---|---|
| 1 | 36 | 278 |
| 2 | 106 | 314 |
| ⋮ | ⋮ | ⋮ |
| M×N | 78 | 236 |

| INITIAL OPERATION PLAN | CONTROL PARAMETER [kW] |
|---|---|
| 1 | 50 |
| 2 | 60 |
| ⋮ | ⋮ |
| P | 150 |

FIG.37 2819

| INITIAL OPERATION PLAN | SUPPLY AND DEMAND SCENARIO | ASSESSMENT VALUE [kW] OF OPTIMAL CORRECTED OPERATION PLAN FOR INITIAL OPERATION PLAN P |
|---|---|---|
| 1 | 1 | 34 |
| 1 | 2 | 42 |
| 1 | ⋮ | ⋮ |
| 1 | M×N | 66 |
| 2 | 1 | 0 |
| 2 | 2 | 84 |
| 2 | ⋮ | ⋮ |
| 2 | M×N | 22 |
| ⋮ | ⋮ | ⋮ |
| P | 1 | 22 |
| P | 2 | 0 |
| P | ⋮ | ⋮ |
| P | M×N | 54 |

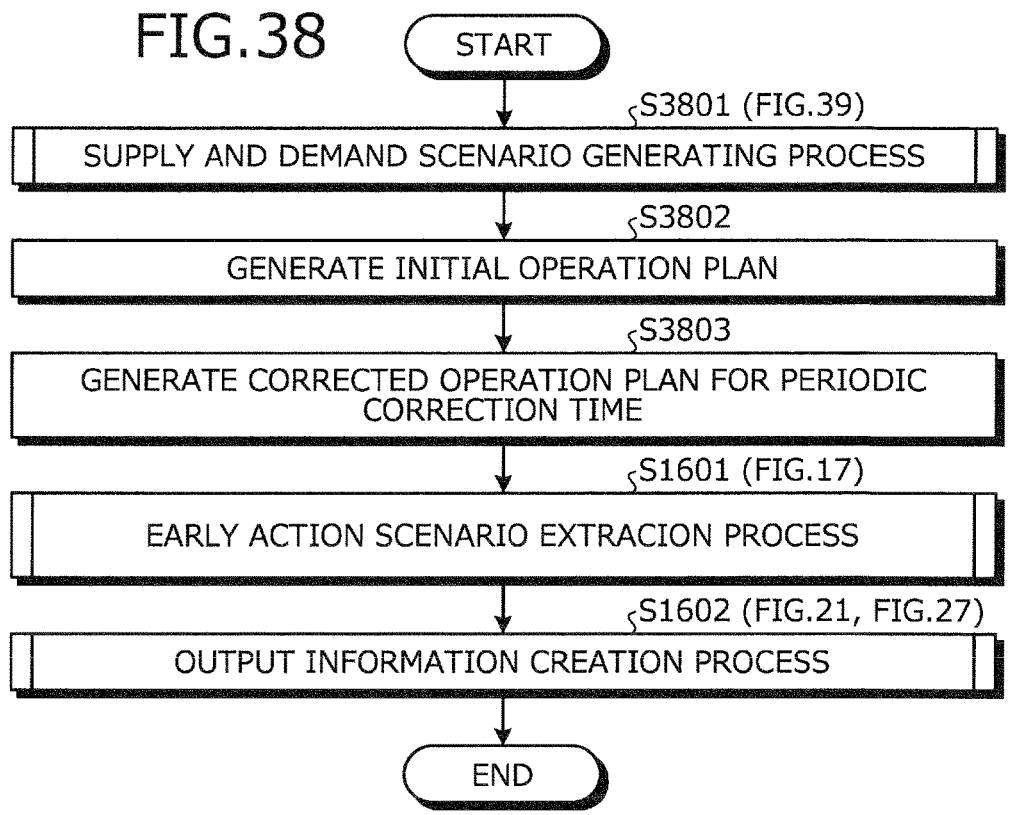

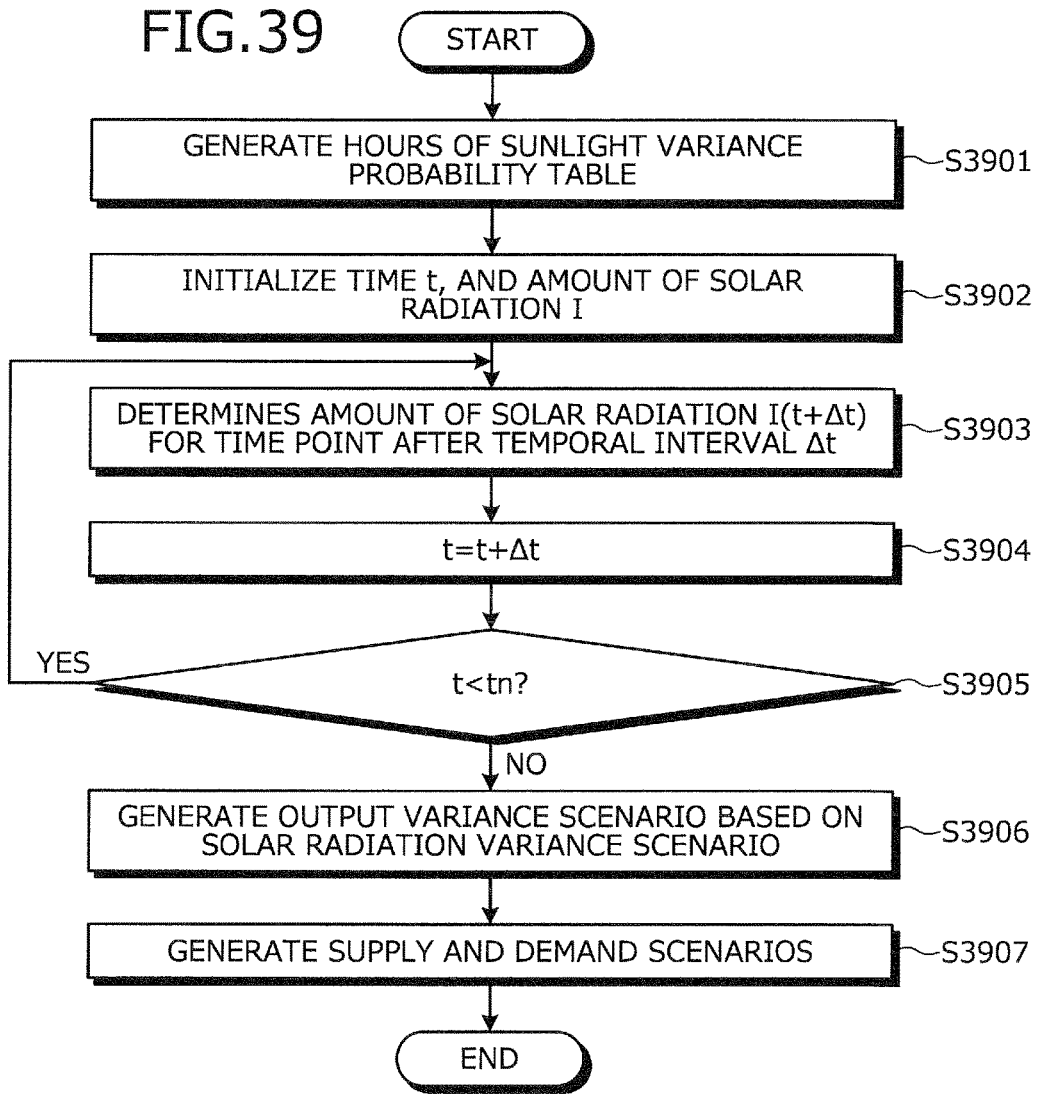

US 9,727,036 B2

OPERATION PLAN CREATING METHOD, COMPUTER PRODUCT, AND OPERATION PLAN CREATING APPARATUS

CROSS REFERENCE TO RELATED APPLICATIONS

This application is a continuation application of International Application PCT/JP2012/056309, filed on Mar. 12, 2012 and designating the U.S., the entire contents of which are incorporated herein by reference.

FIELD

The embodiments discussed herein are related to an operation plan creating method, a computer product, and an operation plan creating apparatus.

BACKGROUND

Global environmental issues are being recognized on a global-scale. As one countermeasure, the use of natural energy such as photovoltaics is drawing attention. In general, photovoltaics is easily affected by the weather, making the output of generated electricity unstable. As a result, various techniques are present to achieve effective utilization.

According to one method of coping with the instability of photovoltaics, storage cells and other types of distributed power sources such as fuel cells are operated according to an operation plan. This operation plan, for example, is a control parameter for suitably controlling the discharge of electricity from a storage cell, which has a limited capacity. For example, when power demand exceeds a given power value and a peak cut scheme of discharging the storage cell is used as a storage cell control scheme, this power value is the operation plan. In the operation of a combination of photovoltaics and storage cells, typically, storage cell operation is simulated based on predicted shifts in power demand and predicted weather changes for the following day, and the operation plan for operating the storage cell for the day is created such that an assessment value is optimized, the assessment value being a simulation result in a case where the power demand shifts as expected.

For example, according to one operation method, the operation plan is corrected during storage cell operation. Typically, a prediction made after checking weather conditions on a given day has a higher degree of certainty than a weather prediction made the day before. Thus, when the weather forecast made the day before is off, by correcting the implemented operation plan based on weather conditions confirmed on the day, the operation state of the storage cell is improved.

For example, according to another method, a storage cell operation plan is created by performing simulation based on correction of the operation plan when a forecast deviates from actual weather conditions. In this method, based on data concerning past power supply and demand, predicted deviation patterns in which a predicted value of the power supply and demand is off by a constant value or more and the occurrence probabilities thereof are preliminarily collected. An assessment value is obtained by performing a simulation for each predicted deviation pattern. The assessment value takes correction of the operation plan when the forecast deviates from actual weather conditions into consideration. Subsequently, an operation plan that considers cases where the forecast deviates from the actual weather conditions is created based on an overall assessment value obtained by weighting the assessment values when the forecast is correct, with the assessment values obtained for the predicted deviation patterns, according to the respective occurrence probabilities and adding the results. For examples of such technologies, refer to Japanese Patent No. 4245583; and Japanese Laid-Open Patent Publication Nos. 2005-86953 and 2008-141918. Further examples are discussed by Mitsuro KUDO, et al in "Forecasting Electric Power Generation of Photovoltaic Power System", The Institute of Electrical Engineers of Japan Academic Journal B, Vol. 127 (2007), No. 7, pp. 847-853; and by Satoshi TAKAYAMA, et al in "A Study on the Scheduling of Large-Scaled PV Power Station Output based on Solar Radiation Forecast", The Institute of Electrical Engineers of Japan Academic Journal B, Vol. 129 (2009), No. 12, pp. 1514-1521.

SUMMARY

According to an aspect of an embodiment, an operation plan creating method of a power generating system having a power generating apparatus configured to generate power according to an environmental condition from an external source, and a storage cell configured to be charged by the power from the power generating apparatus and discharged according to power supply and demand, includes: calculating based on a first corrected operation plan and a second corrected operation plan, an assessment value that indicates whether at an action time, the first corrected operation plan has to be corrected into the second corrected operation plan, the first corrected operation plan obtaining a discharge amount optimal when an operation plan related to the discharge amount from the storage cell is corrected at a given periodic correction time, the second corrected operation plan obtaining a discharge amount optimal when an initial operation plan of the storage cell is corrected at the action time different from the periodic correction time, the assessment value being calculated for a plurality of power supply and demand scenarios stored in a storage unit and indicating transitions of the power supply and demand according to the environmental condition from the external source; extracting from among the plurality of power supply and demand scenarios and based on the calculated assessment value, an action-requiring scenario requiring the first corrected operation plan to be corrected to the second corrected operation plan at the action time; classifying from the extracted action-requiring scenario and based on the initial operation plan for the action-requiring scenario and the second corrected operation plan, a timing-change action scenario that corrects, at the action time, the initial operation plan for the action-requiring scenario; generating for the classified timing-change action scenario and based on the environmental condition from the external source, an identification condition that identifies the classified timing-change action scenario; and correlating and outputting the generated identification condition and the classified timing-change action scenario. The creating method is executed by a computer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram depicting an example of an early action field in the scenario DB 700 used by an output information creating unit 602;

FIG. 15 is a diagram depicting an example of output by the output information creating unit 602;

FIG. 16 is a flowchart depicting and example of a process procedure by the creating apparatus 600;

FIG. 23 is a diagram depicting an example of an identification condition creation table 2300 created by a regression tree 2200;

FIG. 29 is a diagram depicting an example of an hours of sunlight variance probability table 2813;

FIG. 37 is a diagram of an example of a corrected operation assessment table 2819;

FIG. 38 is a flowchart depicting and example of the output information creation process procedure by the creating apparatus 600 according to the third embodiment; and FIG. 39 is a flowchart depicting a process procedure of a supply and demand scenario generating process by the supply and demand scenario generating unit 2802 (step S3801).

DESCRIPTION OF EMBODIMENTS

Embodiments of an operation plan creating method, an operation plan creating program, and an operation plan creating apparatus will be described in detail with reference to the accompanying drawings.

Figure 1:
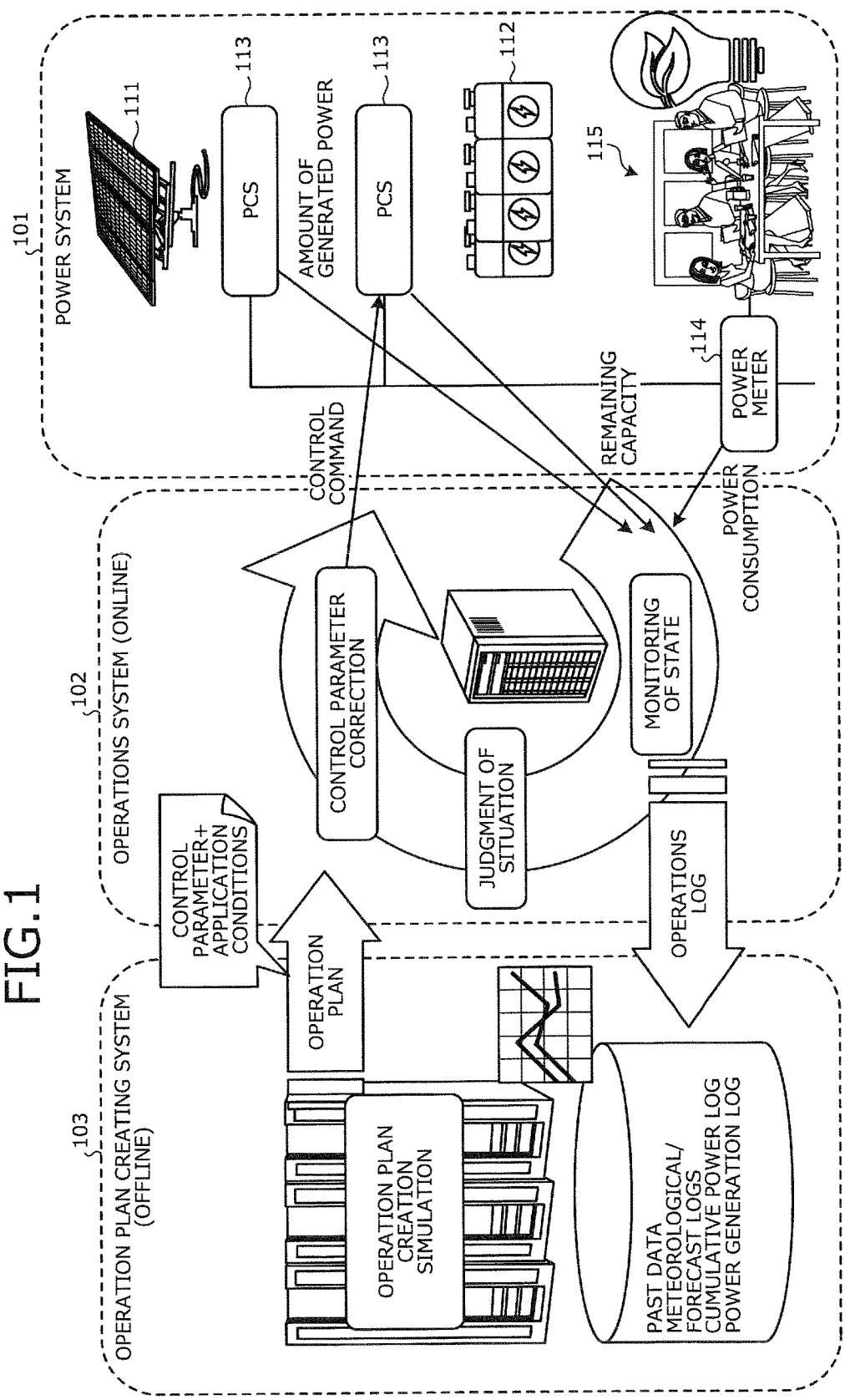
FIG. 1 is a diagram depicting an example of operation based on a storage cell operation plan.

A first embodiment will be described. FIG. 1 is a diagram depicting an example of operation based on a storage cell operation plan. In FIG. 1, a power system 101, for example, is installed in a building such as a house or condominium, a store, a facility, etc. and supplies power to the building. The power system 101 is configured by a power generating apparatus 111, a storage cell 112, a power conditioner (i.e., a power conditioning system (PCS)) 113, and a power meter 114, connected respectively. The power system 101 is a power generating system that includes the storage cell 112, which is charged by power from the power generating apparatus 111 and discharges electricity according the power supply and demand.

The power generating apparatus 111 is an apparatus that generates power according to external environmental conditions. More specifically, the power generating apparatus 111 is an apparatus that converts natural energy such as sunlight into electricity. Although a photovoltaic apparatus is described herein as one example, a wind power generating apparatus may be employed. The storage cell 112 is an apparatus that stores or discharges electricity generated by the power generating apparatus 111. The PCS is an apparatus that converts the electricity generated by the power generating apparatus 111 to direct current and alternating current, controls the charging and discharging of the storage cell 112, controls the amount of electricity generated by the power generating apparatus 111, etc. The power meter 114 is an instrument that measures power consumption in a building.

The electricity generated by the power generating apparatus 111 may be stored in the storage cell 112 or supplied to a power supply destination 115.

An operations system 102 obtains a cumulative power value or the amount of generated electricity from the power system 101 and monitors the power system 101. The operations system 102 further controls the PCS as well as charges and discharges the storage cell 112 based on an operation plan that is provided by an operation plan creating system 103 and subject to application conditions.

An operation plan is a control parameter prescribing the operation of controlled devices in the power system 101 such as the storage cell 112. For example, when the storage cell 112 is operated under a peak cut control scheme in which the storage cell 112 is discharged when the power demand exceeds a given power value, this power value ("base discharge value") is the control parameter, i.e., the operation plan.

Figure 2:
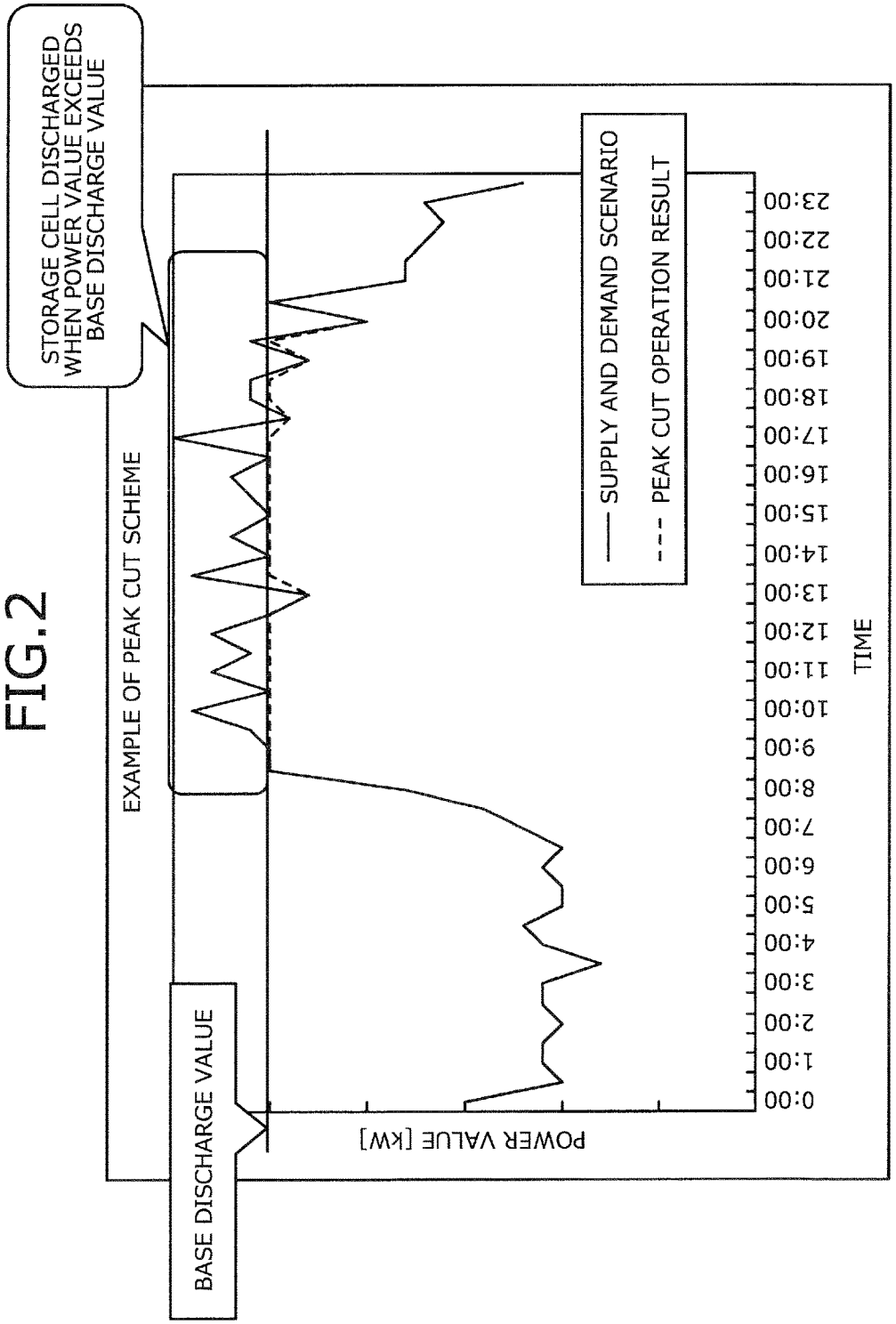
FIG. 2 is a diagram depicting an example of a peak cut control scheme.

FIG. 2 is a diagram depicting an example of the peak cut control scheme. In FIG. 2, the horizontal axis represents the time of day; and the vertical axis represents the power value. The curve in FIG. 2 represents a supply and demand scenario and the storage cell 112 discharge when the power value exceeds the base discharge value. Here, a supply and demand scenario is time series data of the difference of the power demand in a power network that uses power from the storage cell 112 and the photovoltaic output.

Description with reference to FIG. 1 is continued. An application condition is a condition that specifies a situation when the operation plan is to be used, and for example, includes an identification condition that identifies whether an early action time when it is to be judged whether the application of another operation plan (correction of the operation plan) is necessary and application thereof are required. The early action time and identification condition will be described in detail hereinafter.

The operations system 102 obtains from an external source, meteorological data indicating current weather conditions and/or meteorological forecast data forecasting future weather conditions; and in the power system 101, controls the power generation of the power generating apparatus 111 and the charging and discharging of the storage cell 112. More specifically, for example, at the start of the day, the operations system 102 obtains the latest weather forecast data at that time, selects an operation plan having an application condition corresponding to the data, and begins operation of the power system 101 according to the selected operation plan. The operations system 102 monitors the state of the power system 101 and meteorological conditions at given time points, and upon detecting a situation corresponding to the application condition given by the operation plan creating system 103, switches to an operation plan correlated with the application condition and continues operation of the power system 101.

Figure 3:
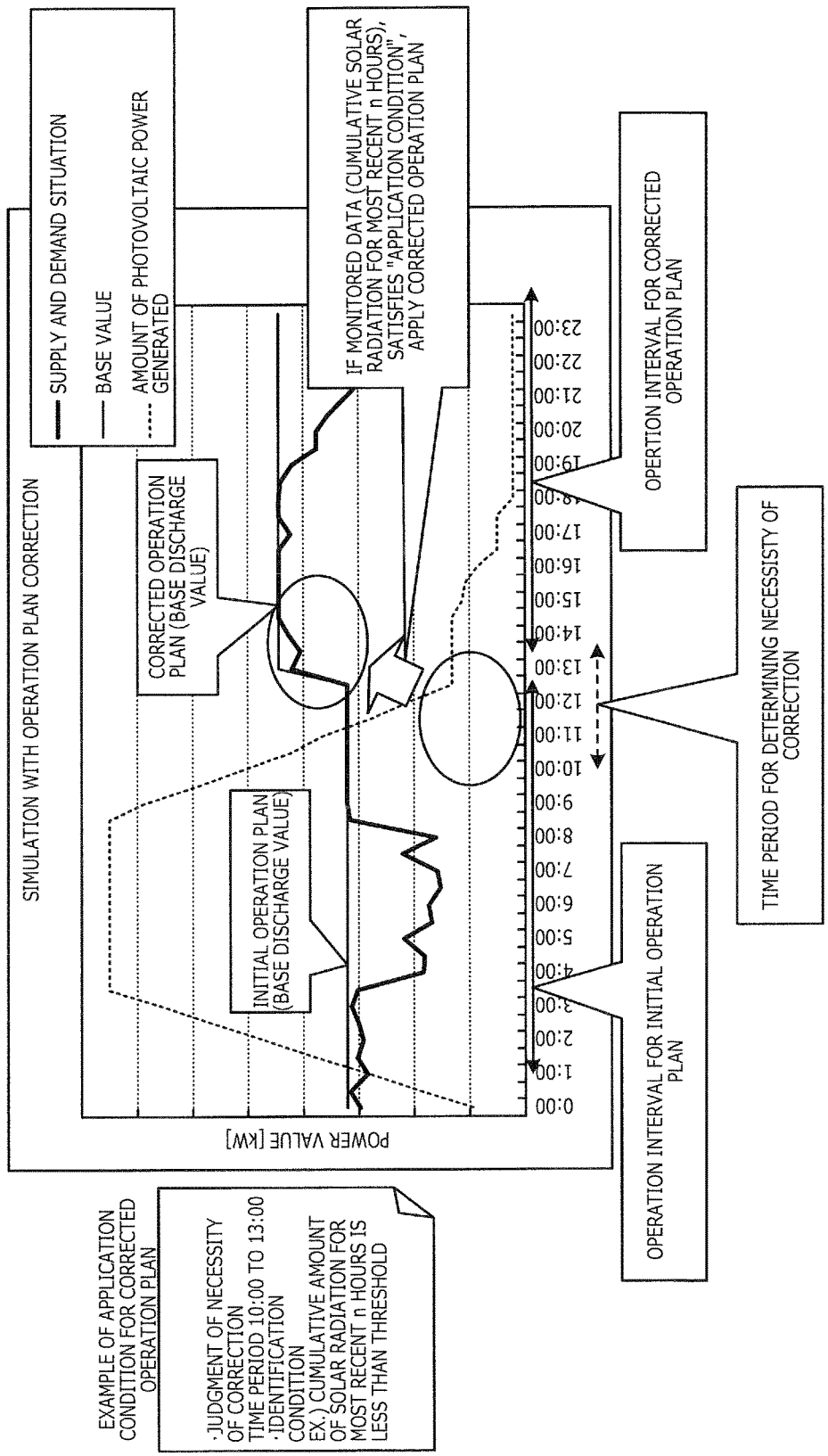
FIG. 3 is a diagram depicting a corrected operation plan having an application condition.

FIG. 3 is a diagram depicting a corrected operation plan having an application condition. In FIG. 3, the horizontal axis represents time; and the vertical axis represents the power value. FIG. 3 depicts an example where the corrected operation plan is applied when monitored data, such as the cumulative amount of solar radiation for the most recent n hours, satisfies the application condition.

Description with reference to FIG. 1 is continued. The operation plan creating system 103 obtains from the operations system 102, past data including meteorological/forecast logs, cumulative power logs, and power generation logs; and outputs to the operations system 102, a corrected operation plan having an application condition. More specifically, the operation plan creating system 103 obtains from an external apparatus, a supply and demand scenario fully covering transitions of possible supply and demand states. Further, the operation plan creating system 103 may generate the supply and demand scenario. The operation plan creating system 103 creates an operation plan based on the generated supply and demand scenario.

The operation plan creating system 103, by simulation that comprehensively assumes possible situations, automatically creates an application condition that is for detecting during operation of the operations system 102, a situation in which the created operation plan is to be corrected. More specifically, the operation plan creating system 103 executes (1) to (3) below as depicted in FIG. 4.

Figure 4:
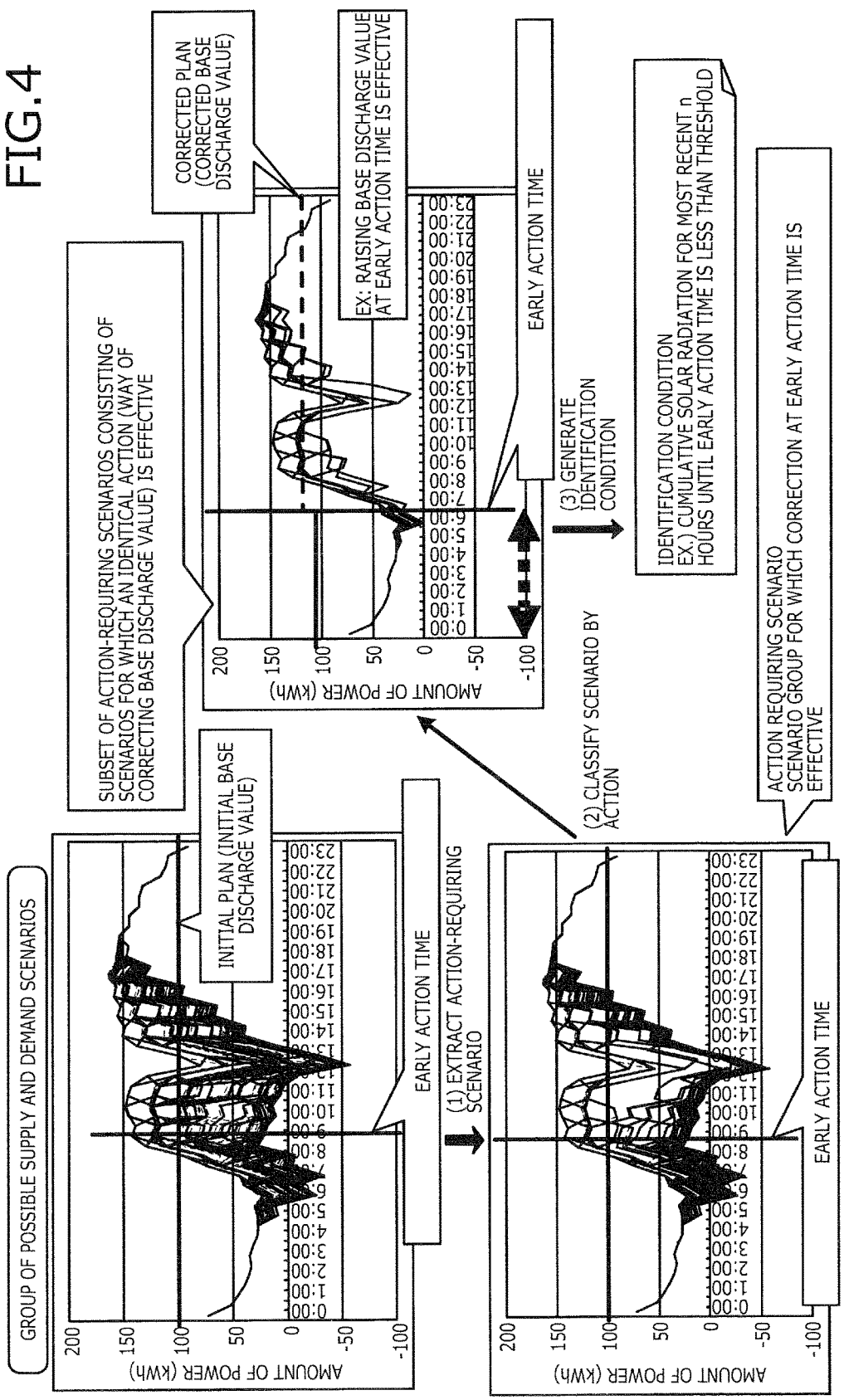
FIG. 4 is a diagram depicting an example of correction of an operation plan by an operation plan creating system 103.

FIG. 4 is a diagram depicting an example of correction of an operation plan by the operation plan creating system 103. In FIG. 4, (1) by simulation based on supply and demand scenarios, the operation plan creating system 103 extracts for each time point during operation for one day, a scenario in which the effect can be increased by correcting the operation plan at that time point. The extracted scenario is referred to as "action-requiring scenario".

(2) The operation plan creating system 103 classifies the action-requiring scenarios by the similarity of the action to be taken for a scenario at a given time point. The action to be taken for a scenario at a time point corresponds to an operation plan that is optimal for that scenario, at that time point and thereafter. The operation plan creating system 103 determines action-requiring scenario groups of scenarios having similar actions and correction times. An action-requiring scenario group of scenarios having similar actions is referred to as an "early action scenario group". Further, a correction time is called an "action time" and an "early action time" is one example of an action time.

(3) The operation plan creating system 103 judges whether an early action scenario group can be identified by data available at the early action time on the current day. The operation plan creating system 103, upon judging that an early action scenario group can be identified, creates identification conditions for the early action scenario group and an optimal operation plan for scenarios satisfying the identification conditions.

Through the operations of (1) to (3) above, the operation plan creating system 103 creates operation plan correction rules, i.e., a corrected operation plan subject to application conditions having an early action time and an identification condition. Consequently, for example, with respect to a supply and demand scenario requiring action by a given time point, i.e., a supply and demand scenario for which good results cannot be obtained unless the operation plan is corrected by the given time point, action can be taken at a suitable timing. More specifically, at a time point when action is required, if such a supply and demand scenario and a supply and demand scenario for which the same action is valid can be distinguished by available data, the operation plan can be corrected and the action taken with respect to the supply and demand scenario for which good results cannot be obtained unless the operation plan is corrected by the give time point.

Figure 5:
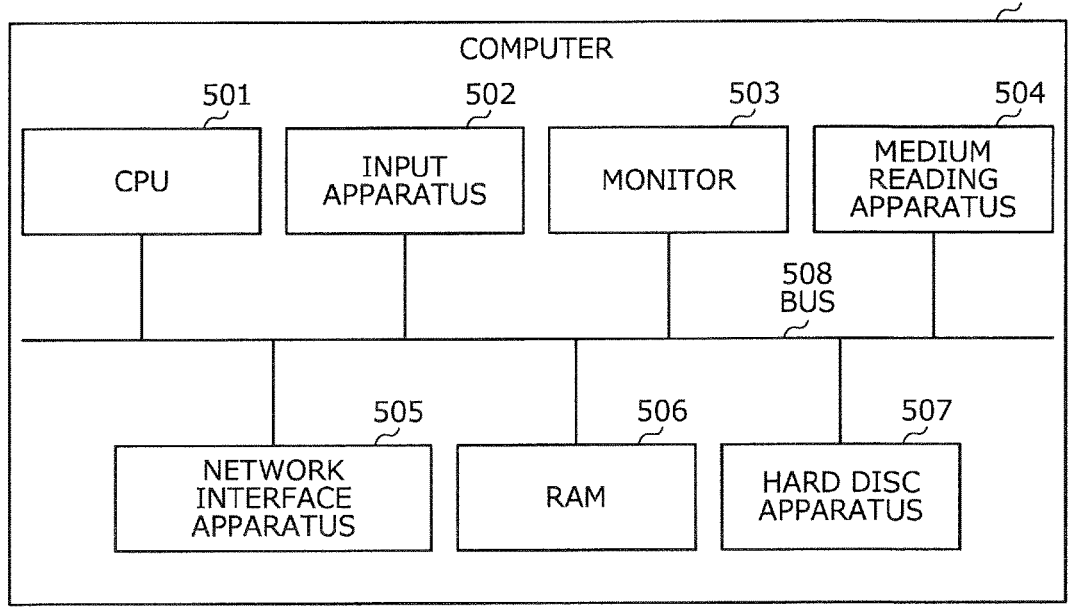
FIG. 5 is a diagram depicting a hardware configuration example of a computer configuring the operation plan creating system 103.

FIG. 5 is a diagram depicting a hardware configuration example of a computer configuring the operation plan creating system 103. As depicted in FIG. 5, a computer 500 includes a CPU 501 that executes various types of arithmetic processes, an input apparatus 502 that receives inputs of data by a user, and a monitor 503. The computer 500 further includes a medium reading apparatus 504 that reads programs and the like from a recording medium, and a network interface apparatus 505 that communicates data to and from other apparatuses, as well as random access memory (RAM) 506 that temporarily stores various types of information, and a hard disc apparatus 507. The apparatuses 501 to 507 are respectively connected by a bus 508.

The hard disc apparatus 507 stores the operation plan creating program. The hard disc apparatus 507 further stores various types of data for implementing the operation plan creating program. The CPU 501 reads the operation plan creating program from the hard disc apparatus 507 and expands the operation plan creating program on the RAM 506, whereby the operation plan creating program functions as an operation plan creating process.

The operation plan creating program does not necessarily have to be stored in the hard disc apparatus 507. For example, configuration may be such that the computer 500 reads out and executes the operation plan creating program stored on a computer-readable recording medium. The computer-readable recording medium corresponds to, for example, a transportable recording medium such compact disc read-only memory (CD-ROM), a digital versatile disc (DVD), universal serial bus (USB) memory, etc.; semiconductor memory such as flash memory, etc.; and a hard disc drive, etc. Further, configuration may be such that the program is stored on an apparatus connected by a public line, the Internet, a local area network (LAN), a wide area network (WAN), etc., whereby the computer 500 reads out the program from the apparatus for execution.

Functions of a creating apparatus will be described. The creating apparatus is included in the operation plan creating system 103 depicted in FIG. 1 and is a computer that implements an operation plan creating function. More specifically, the creating apparatus is a computer that with the combined use of photovoltaics, creates operation plan correction rules that are for implementing early actions and related to operation of the storage cell 112 targeting peak cut of supply and demand. For example, at the start of the day, the initial operation plan created for the storage cell 112 based on the latest meteorological information is assumed to be corrected at a periodic correction time coinciding with the timing at which the meteorological information is updated and operation plan correction rules are created for implementing actions according to the state at each time point before the periodic correction time. The periodic correction time may be, for example, midday, such as 13:00.

Here, a value created by a typical plan creating method that seeks an optimal plan for one supply and demand scenario that is predicted to be the most likely to occur at the time of operation plan creation can be used as the initial operation plan. In the first embodiment, although a case where rules for correcting the initial operation plan in the morning will be described as an example, this is not a limitation of the present invention. For example, correction rules for an operation plan created based on meteorological information at the periodic correction time can be created by the same procedure.

Figure 6:
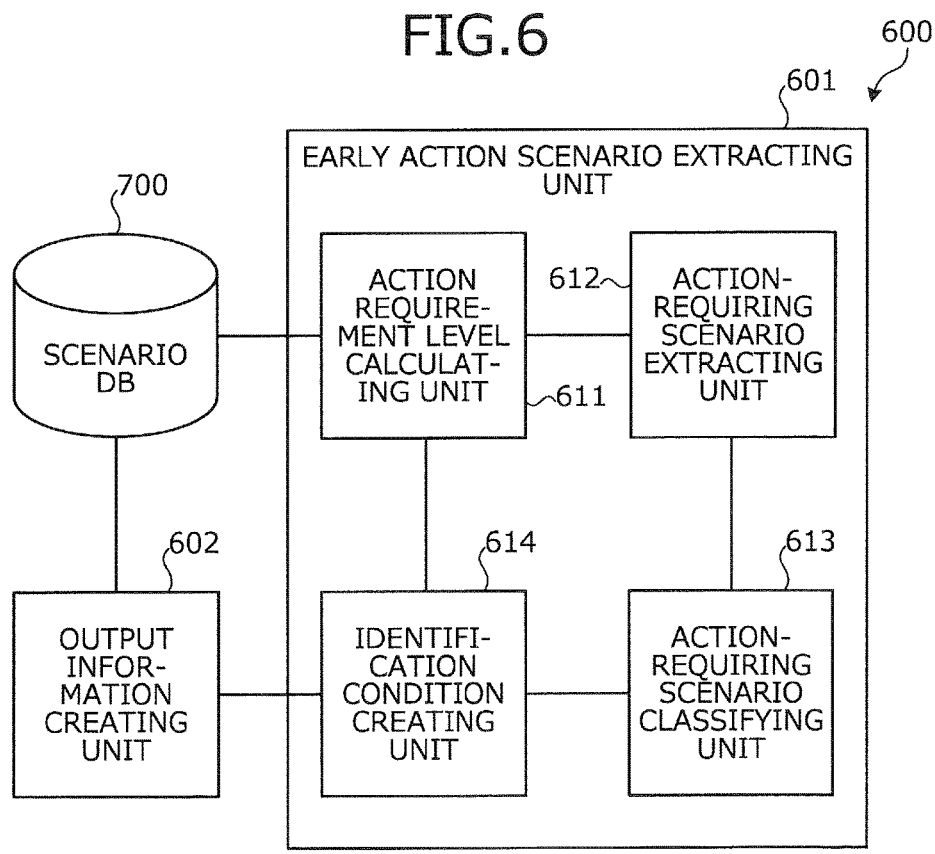
FIG. 6 is a block diagram of an example of a functional configuration of a creating apparatus.

FIG. 6 is a block diagram of an example of a functional configuration of the creating apparatus. A creating apparatus 600 has a scenario database (DB) 700, an early action scenario extracting unit 601, and an output information creating unit 602. A function of the scenario DB 700, more specifically, for example, is implemented by the hard disc apparatus 507 depicted in FIG. 5. Functions of the early action scenario extracting unit 601 and the output information creating unit 602, more specifically, for example, are implemented by executing on the CPU 501, a program stored in the RAM 506 or the hard disc apparatus 507 depicted in FIG. 5. Before describing the early action scenario extracting unit 601 and the output information creating unit 602, the scenario DB 700 will be described with reference to FIG. 7.

Figure 7:
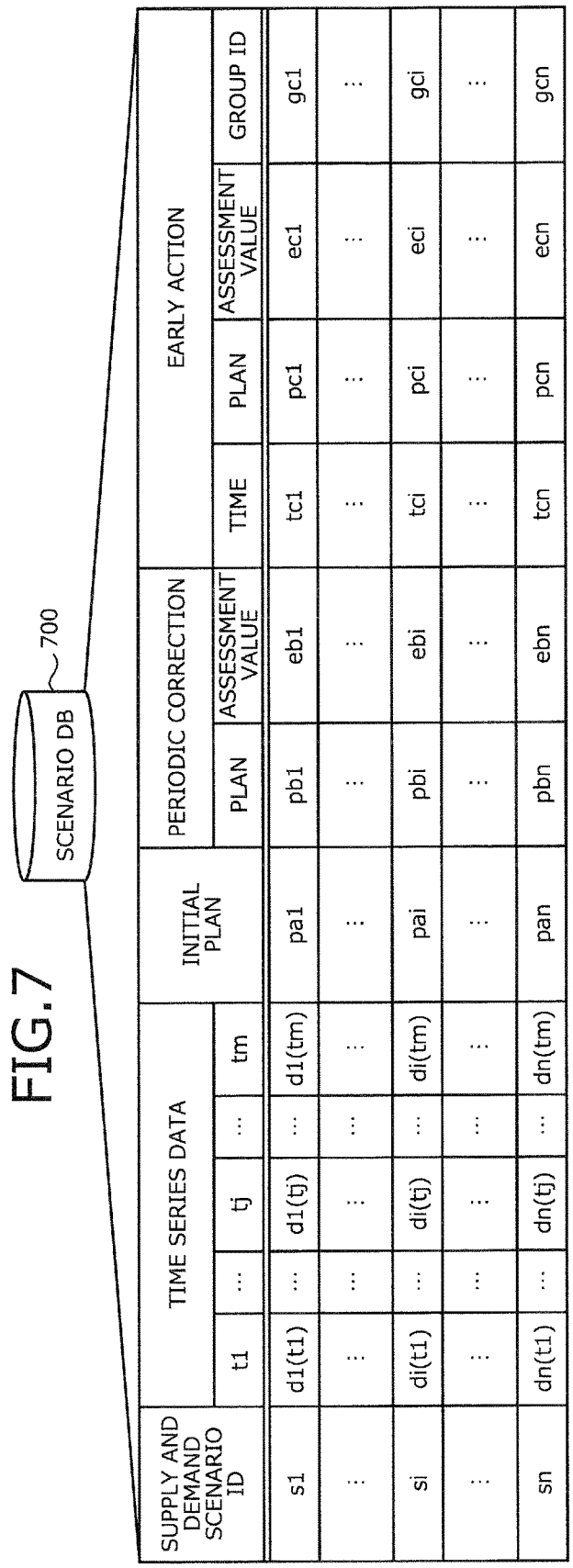
FIG. 7 is a diagram depicting an example of the contents of a scenario DB 700.

FIG. 7 is a diagram depicting an example of the contents of the scenario DB 700. The scenario DB 700 is a database of the operation plan creating system 103 and stores supply and demand scenarios. The scenario DB 700 has fields for supply and demand scenario IDs, time series data, initial plans, periodic corrections, and early actions. The supply and demand scenario ID field stores for n (n≥1) supply and demand scenarios, n supply and demand scenario IDs (s1 to sn) uniquely identifying the supply and demand scenarios. An i-th (1≤i≤n) supply and demand scenario will be indicated as "supply and demand scenario i". Time series data is data di(tj) identified by the supply and demand scenario i and time tj (1≤j≤m), and includes supply and demand data, observable data related to transitions of the supply and demand data, and meteorological forecast data. The supply and demand data are power values; and are obtained from power demand, generated electric power, and differences thereof, respectively indicated as di(tj).d, di(tj).s, and di(tj).p. The observable data is, for example, the amount of solar radiation di(tj).i, the temperature di(tj).t. The meteorological forecast data is a weather category di(tj).w including, for example, sunny, cloudy, rain.

The initial plan field stores for each supply and demand scenario i, an initial operation plan pai applied when the scenario is expected to occur. For example, in the present invention, when a correction plan is created for a plan created based only on a weather forecast, the same initial plan is stored for a scenario corresponding to the same weather category. Further, an initial operation plan pai is, for example, an initial base discharge value.

The periodic correction field and the early action field are areas storing key process results of a plan creating process of the present invention. The periodic correction field includes fields for plan fields and assessment values. The plan field stores periodically corrected plans pbi. A periodically corrected plan pbi is an operation plan (e.g., periodic base discharge value) optimal at a pre-determined periodic correction time and thereafter. The assessment value field stores an assessment value ebi of the periodically corrected plan.

The assessment value ebi of the periodically corrected plan is a simulation result obtained by simulation to estimate a result in a case where the initial operation plan is implemented until the correction time, after which, the optimal operation plan having the greatest effectiveness is implemented with a constraint of the remaining capacity of the storage cell at the correction time. The early action field includes fields for times, plans, assessment values, and group IDs. The time field stores an early action time tci for the supply and demand scenario i. The plan field stores an early action operation plan pci for the supply and demand scenario i. The assessment value field stores an assessment value eci of the early action operation plan pci. The early action operation plan pci is an optimal operation plan (e.g., base discharge value) at the early action time tci and thereafter. The group ID field stores an identifier gci of the early action scenario group corresponding to the scenario.

Description with reference to FIG. 6 is continued. The early action scenario extracting unit 601 receives input of a supply and demand scenario group and an early action time, and at the early action time, extracts a scenario requiring an action. More specifically, the early action scenario extracting unit 601 includes an action requirement level calculating unit 611, an action-requiring scenario extracting unit 612, an action-requiring scenario classifying unit 613, and an identification condition creating unit 614, sequentially described hereinafter.

The action requirement level calculating unit 611 calculates for each supply and demand scenario, an action requirement level that is an assessment value indicating the need for an action at an early action time. More specifically, for example, for each supply and demand scenario, the action requirement level calculating unit 611 performs two types of simulation to judge whether early action is necessary. One simulation simulates a case where the action is performed promptly and the other simulation simulates a case where correction of the initial operation plan is performed at the periodic correction time assumed under normal operation. The action requirement level calculating unit 611 compares the results of these two types of simulation to calculate the action requirement level, which indicates whether an action has to be taken promptly.

Based on the action requirement level, the action-requiring scenario extracting unit 612 extracts a scenario requiring early action from the supply and demand scenario group. For example, an extraction threshold for the action requirement level is set and when the action requirement level of a supply and demand scenario i for a given early action time tj is greater than or equal to the extraction threshold, the action-requiring scenario extracting unit 612 extracts the supply and demand scenario i as an action-requiring scenario.

The action-requiring scenario classifying unit 613 classifies the action-requiring scenarios extracted by the action-requiring scenario extracting unit 612, according to the similarity of the action (optimal operation plan for each scenario). The action-requiring scenario classifying unit 613 outputs classified action-requiring scenarios as an early action scenario group corresponding to the early action time.

The action-requiring scenario group extracted by the action-requiring scenario extracting unit 612 may include action-requiring scenarios having differing required actions. Even if such action-requiring scenarios can be identified, a suitable action, i.e., a valid operation plan cannot be defined for all the scenarios to be identified by a given identification condition. Consequently, the action-requiring scenario classifying unit 613 preliminarily performs classification according to action. An action-requiring scenario group classified by the action-requiring scenario classifying unit 613 is referred to as an "early action scenario group". An early action scenario is a timing-change action scenario.

The identification condition creating unit 614 receives the early action scenario group as input and separates by the data available at the early action time, an identifiable early action scenario group. The identification condition creating unit 614 creates an identification condition for the separated scenarios. Processes by the action requirement level calculating unit 611 to the identification condition creating unit 614 are executed at each early action time. The identification condition creating unit 614 is one example of a generating unit.

The output information creating unit 602 receives, as input, the identification condition created by the identification condition creating unit 614 and creates a corrected operation plan. The output information creating unit 602 outputs to the operations system 102, the early action time, the identification condition, and the corrected operation plan. The output information creating unit 602 is one example of an output unit.

An example of an action requirement level calculation by the action requirement level calculating unit 611 will be described. As described above, to assess whether the initial operation plan has to be corrected at a time sooner than the periodic correction time, the action requirement level calculating unit 611 executes for differing correction times, two types of simulations for the same supply and demand scenario. These simulations are simulations that estimate the effects (e.g., peak cut results, reduced environmental load, and cost reductions) obtained for the supply and demand scenario and at a correction time. Here, a correction time is an early action time or a periodic correction time.

More specifically, the simulation estimates the effects for a case where the initial operation plan is used until the correction time and thereafter, an optimal operation plan that achieves the greatest effect with the constraint of the remaining capacity of the storage cell is used at the correction time. An optimal operation plan is obtained by simulating cases where the storage cell 112 is operated using various control parameters concerning a supply and demand scenario, and selecting the operation plan for which the best assessment value is obtained as a result of simulation. When the correction time is the periodic correction time, in the periodic correction fields pbi, ebi of the supply and demand scenario DB 700, the optimal operation plan and the assessment value thereof are recorded. Further, when the correction time is the early action time, in the early action fields tci, pci, eci of the scenario DB 700, the early action time, the optimal operation plan, and the assessment value thereof are respectively recorded.

For example, when the storage cell 112 is operated by a peak cut scheme of discharging when the power demand exceeds a given power value, the peak cut result is used for the assessment value. The given power value is also referred to as the base discharge value. Further, an optimal control parameter represents a control parameter of the storage cell 112, obtaining the assessment value by the optimal operation plan.

For example, when the storage cell 112 is operated by a peak cut scheme, a base discharge value is used as a control parameter. The assessment value is not limited to a peak cut result and for example, environmental load reduction results, cost reduction results, or a combination of these values may be used as the assessment value. Further, the control parameter is not limited to the base discharge value. For example, when the storage cell 112 is operated by a constant discharge scheme, a combination of the time period when discharge is to occur and the amount of discharge are used as control parameters. Further, for example, when the storage cell 112 is operated by an excess power absorption scheme, the initial amount of power of the storage cell 112 is the control parameter. Hereinafter, with reference to FIGS. 8 to 11, description will be given for a case where the storage cell 112 is operated by a peak cut scheme and the peak cut result is used as the assessment value.

Figure 8:
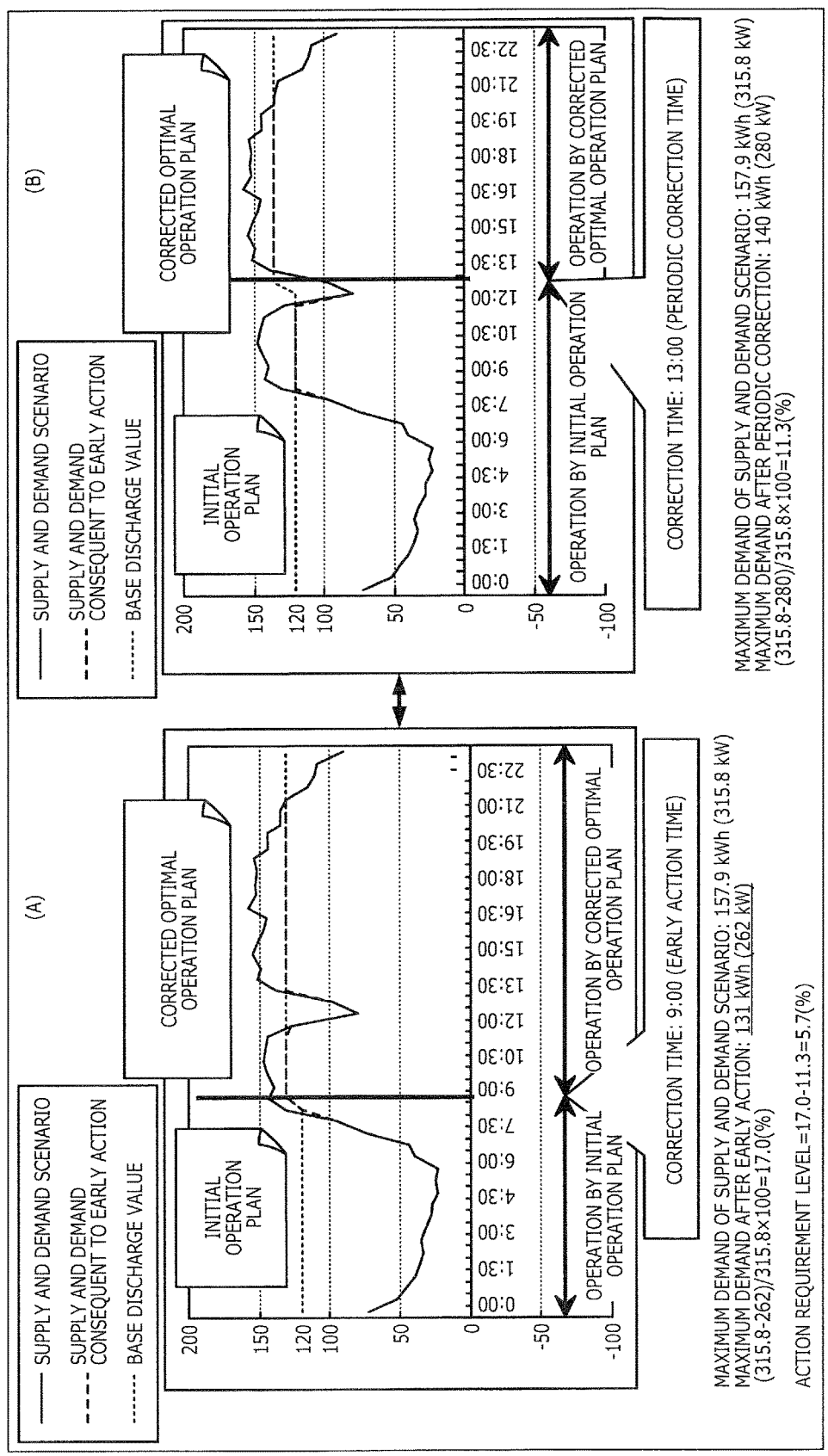
FIG. 8 is a diagram depicting a calculation example of an action requirement level (part 1)

FIG. 8 is a diagram depicting a calculation example of the action requirement level (part 1). FIG. 8 depicts a calculation example of the action requirement level for a case where the base discharge value is raised consequent to correction. In FIG. 8, (A) depicts a graph of simulation results when the operation plan is corrected at an early action time and (B) depicts a graph of simulation results when the operation plan is corrected at a periodic correction time. In both graphs, the horizontal axis represents time and the vertical axis represents the amount of electrical power [kWh]. The amount of electrical power may be indicated as the amount of electrical power used in 30 minutes, for example.

A calculation example of the action requirement level will be described with reference to FIG. 8. When the action requirement level is calculated, a demand value [kW] is used. The demand value is the average electrical power usage [kW] for a 30-minute period and therefore, is a value twice (a value divided by 0.5 [h]) the electrical power usage [kWh] for 30 minutes (0.5 [h]). For example, in (A) and (B) of FIG. 8, the maximum electrical power usage for 30 minutes in the original supply and demand scenario (time series data concerning the difference of the power demand and the generated electric power) is 157.9 [kWh] and therefore, in this case, the maximum demand value is 315.8 [kW].

Further, in (A) of FIG. 8, the maximum electrical power usage for 30 minutes in a case where the operation plan is corrected to the optimal operation plan at the early action time is 131 [kWh] and therefore, the maximum demand value consequent to the early action is 262 [kW]. Therefore, a result indicating the peak cut effect in (A) of FIG. 8 can be obtained by Equation (1).

$$(315.8-262)/315.8\times 100=17.0[\%] \quad (1)$$

Further, in (B) of FIG. 8, the electrical power usage for 30 minutes in the case where the operation plan is corrected to the optimal operation plan at the periodic correction time is 140 [kWh] and therefore, the maximum demand value consequent to periodic correction is 280 [kW]. Therefore, a result indicating the peak cut effect in (B) of FIG. 8 can be obtained by Equation (2).

$$(315.8-280)/315.8\times 100=11.3[\%] \quad (2)$$

The action requirement level can be obtained by Equation (3).

$$\text{action requirement level}=\text{result from early action}-\text{result from periodic correction} \quad (3)$$

In the example above, the action requirement level=17.0−11.3=5.7. Thus, when the effect is poor in a case where correction is performed at the periodic correction time as compared to the effect in a case where the initial operation plan is corrected at the early action candidate time, the action requirement level calculating unit 611 considers the action to be late and the cause of the drop in the effect, and calculates the action requirement level.

Figure 9:
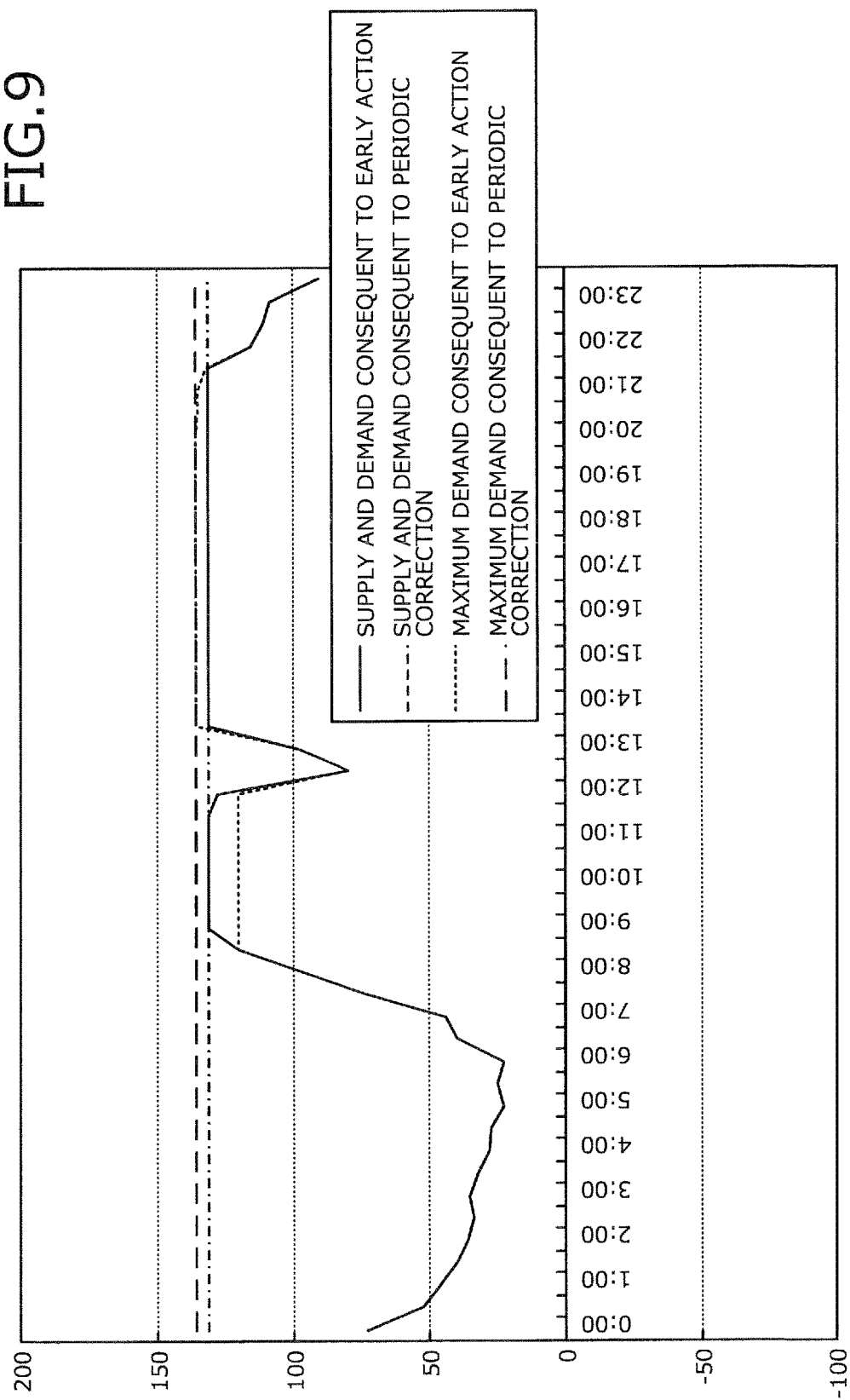
FIG. 9 is a diagram depicting a comparison example of (A) and (B) in FIG. 8.

FIG. 9 is a diagram depicting a comparison example of (A) and (B) in FIG. 8. FIG. 9 depicts a graph superimposing a scenario in a case where early action is taken for the supply and demand scenario in (A) of FIG. 8 and a scenario in a case where periodic correction is performed for the supply and demand scenario in (B) of FIG. 8.

Figure 10:
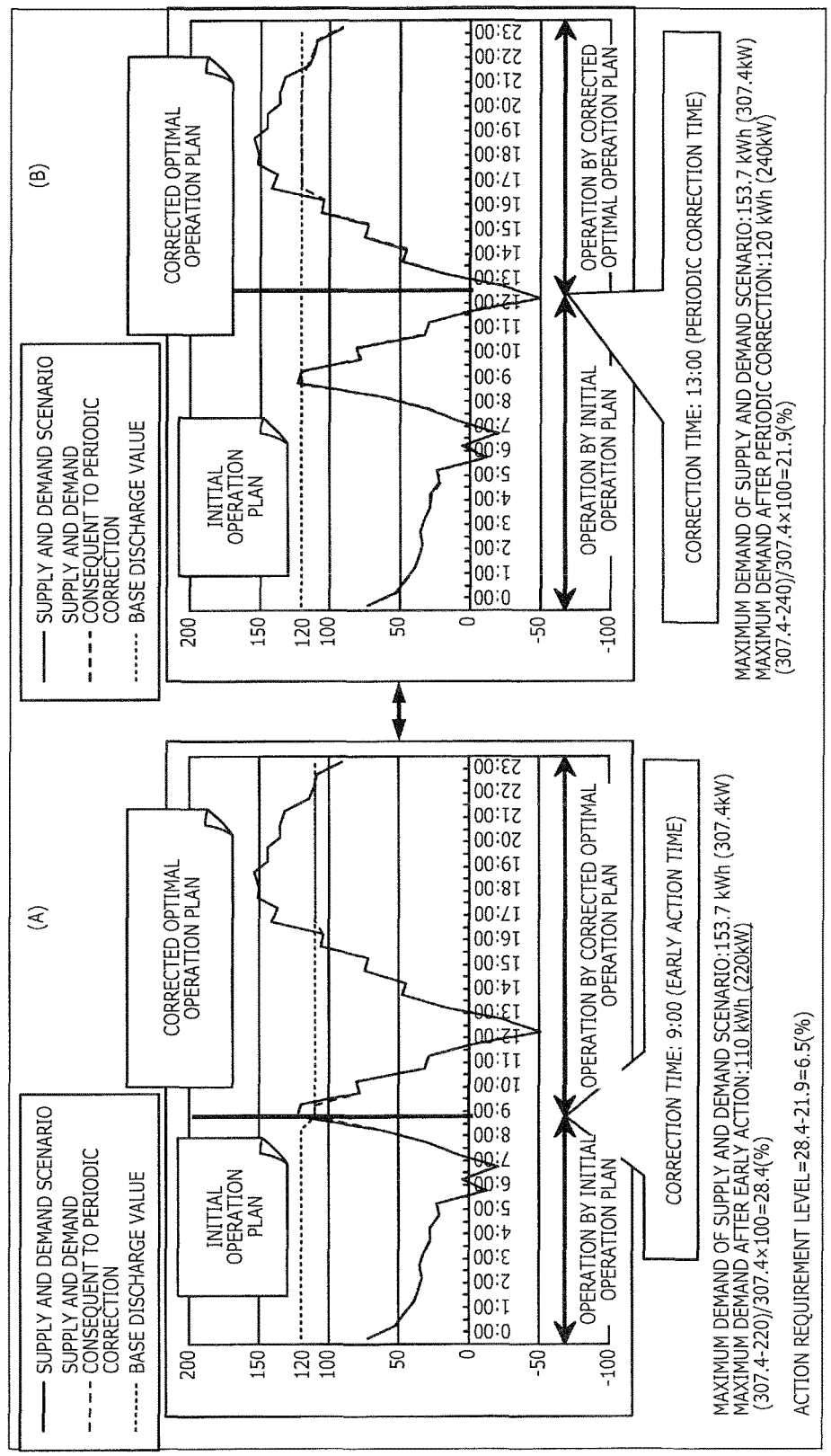
FIG. 10 is a diagram depicting a calculation example of the action requirement level (part 2)

FIG. 10 is a diagram depicting a calculation example of the action requirement level (part 2). FIG. 10 depicts a calculation example of the action requirement level when the base discharge value is lowered consequent to correction. In FIG. 10, (A) depicts a graph of simulation results when the operation plan is corrected at the early action time; and (B) depicts a graph of simulation results when the operation plan is corrected at the periodic correction time. In both graphs, the horizontal axis represents time and the vertical axis represents the amount of electrical power [kWh]. The amount of electrical power may be indicated as the amount of electrical power used in 30 minutes, for example.

A calculation example of the action requirement level will be described with reference to FIG. 10. The calculation method for the action requirement level is the same as that depicted in FIG. 8. In (A) and (B) of FIG. 10, the maximum electrical power usage is 153.7 [kWh] and therefore, the maximum demand value is 307.4 [kW].

Further, in (A) of FIG. 10, the maximum electrical power for a case where the operation plan is corrected to the optimal operation plan at the early action time is 110 [kWh] and therefore, the maximum demand value consequent to early action is 220 [kW]. Therefore, a result indicating the peak cut effect in (A) of FIG. 10 can be obtained by Equation (4).

$$(307.4-220)/307.4\times 100=28.4[\%] \quad (4)$$

Further in (B) of FIG. 10, the maximum electrical power usage in a case where the operation plan is corrected to the optimal operation plan at the periodic correction time is 120 [kWh] and therefore, the maximum demand value consequent to period correction is 240 [kW]. Therefore, a result indicating the peak cut effect in (B) of FIG. 10 can be obtained by Equation (5).

$$(307.4-240)/307.4\times 100=21.9[\%] \quad (5)$$

The action requirement level is obtained from Equation (3), where, 28.4−21.9=6.5 results.

Figure 11:
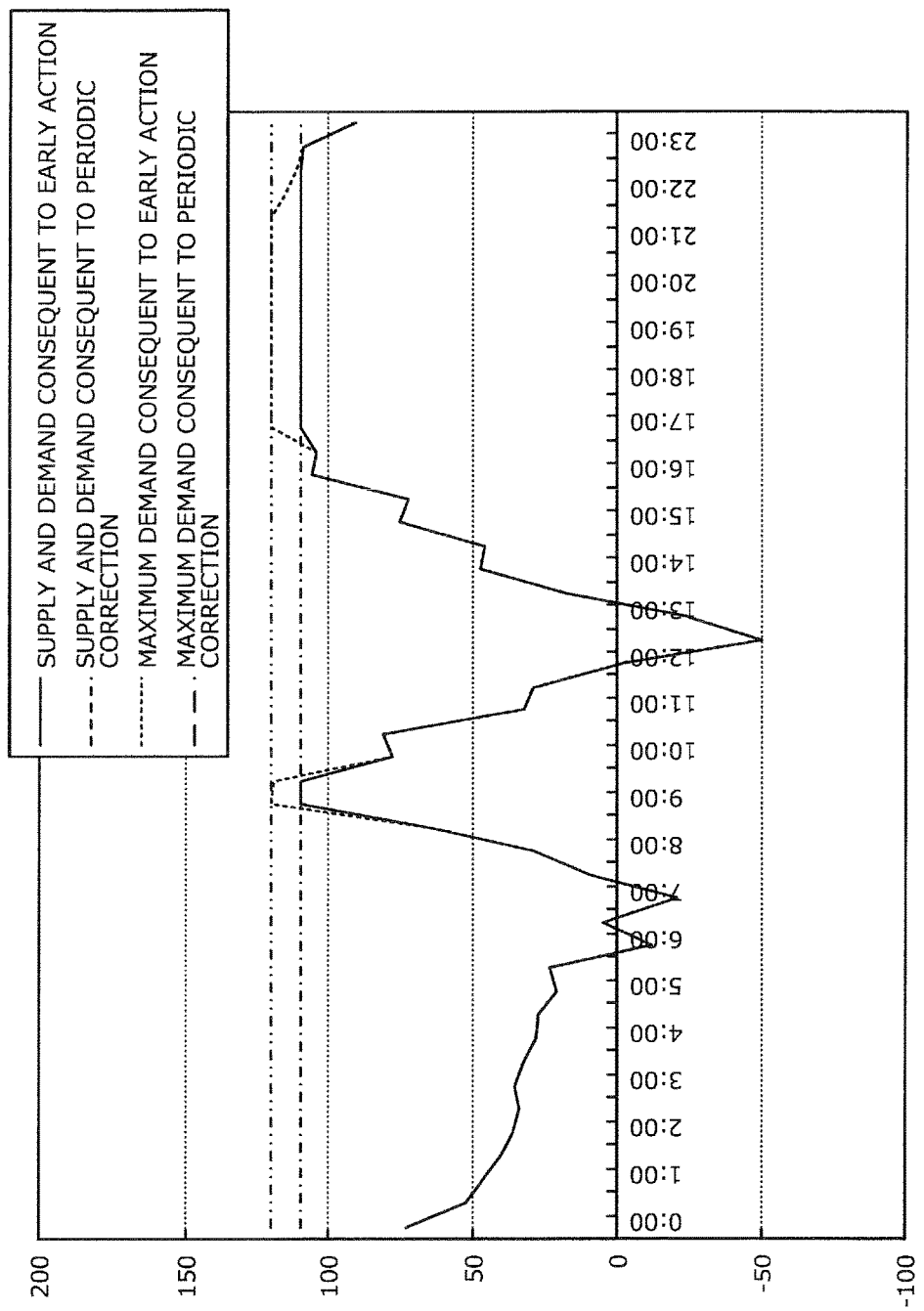
FIG. 11 is a diagram depicting a comparison example of (A) and (B) in FIG. 10.

FIG. 11 is a diagram depicting a comparison example of (A) and (B) in FIG. 10. FIG. 11 depicts a graph superimposing a scenario in a case where early action is taken for the supply and demand scenario in (A) of FIG. 10 and a scenario in a case where periodic correction is performed for the supply and demand scenario in (B) of FIG. 10. In FIG. 11, a hatched area indicates the amount of electrical power that could not be discharged by peak cut consequent to the correction being late in (B) of FIG. 10. In other words, since discharge occurs at a value higher than the demand under the peak cut that can be realized corresponding to the demand before the periodic correction, if early action is not taken, the demand becomes the maximum demand value.

The action requirement level calculating unit 611 obtains for each supply and demand scenario, an action requirement level as described above and when the obtained action requirement level is greater than or equal to a threshold, the action-requiring scenario extracting unit 612 extracts the supply and demand scenario as an action-requiring scenario.

An example of classification of an action-requiring scenario by the action-requiring scenario classifying unit 613 will be described. Action-requiring scenarios may include a scenario whose required action drastically differs. For example, with respect to the base discharge value in the initial operation plan, an action that raises the base discharge value also suppresses discharge, meanwhile, an action that lowers the base discharge value also facilitates discharge. In this case, even if an action-requiring scenario group is identified by an identification condition using the amount of solar radiation, the temperature, demand, etc., if an action to suppress discharge and an action to facilitate discharge are both present, the action to be taken cannot be defined as a single action.

Consequently, to ensure that the action is possible if an action-requiring scenario group can be identified, the action-requiring scenario classifying unit 613 classifies the action-requiring scenarios according to the similarity of the action. In the first embodiment, action-requiring scenarios are classified by the correction direction of the initial plan and the initial operation plan. Each group classified by this process is an early action scenario group and is assigned a group ID uniquely identifying the group. For each supply and demand scenario classified in an early action scenario group, the group ID of the early action scenario group to which the supply and demand scenario belongs is stored in the early action field of the scenario DB 700.

Figure 12:
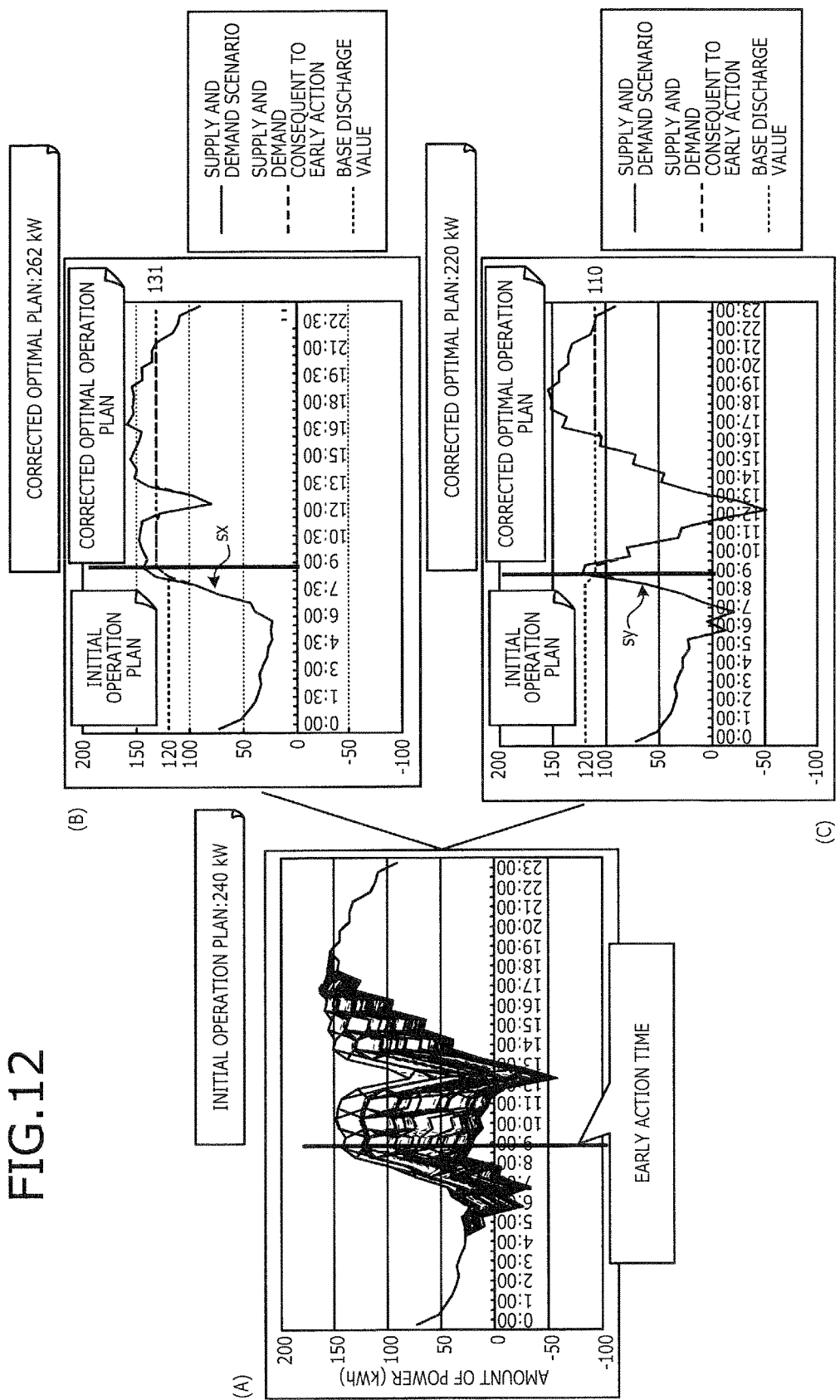
FIG. 12 is a diagram depicting an action-requiring scenario classification example.

FIG. 12 is a diagram depicting an action-requiring scenario classification example. FIG. 12 depicts an example classifying the action-requiring scenario in FIG. 8 and the action-requiring scenario in FIG. 10. The initial operation plan is assumed to be 240 [kW] (i.e., electrical power usage of 120 [kWh] for 30-minute period). In FIG. 12, (A) is an action-requiring scenario group extracted by the action-requiring scenario extracting unit 612. The action-requiring scenario group includes an action-requiring scenario sx depicted in FIG. 8 and an early action-requiring scenario sy depicted in FIG. 10.

In (B), the optimal operation plan ((A) of FIG. 8) after correction by an early action for the action-requiring scenario sx is 131 [kWh] and therefore, is greater than the initial operation plan of 120 [kWh]. Consequently, the action-requiring scenario sx is classified into a group that raises the base discharge value by correction.

In (C), the optimal operation plan after correction by an early action for the action-requiring scenario sy is 110 [kWh] and therefore, is less than the initial operation plan of 120 [kWh]. Consequently, the action-requiring scenario sy is classified into a group that lowers the base discharge value by correction.

Thus, the value of control parameters configuring an operation plan tend to be larger or smaller compared to the initial operation plan (correction direction of the operation plan) and the action-requiring scenarios are classified such that only those in the same direction are grouped together and recorded to memory, as an early action scenario group. For example, as described above, when the control parameters configuring the operation plan include only the base discharge value, the action-requiring scenario group is separated into two groups, a group that corresponds to optimal operation plans that raise the base discharge value compared to the initial operation plan and a group that corresponds to operation plans that lower the base discharge value. Each of the resulting groups is an early action scenario group.

Further, when an operation plan is created from multiple control parameters, the action-requiring scenario group is classified into two classification categories corresponding to an increase/decrease of the consecutive values of control parameters and into a group formed by combinations of classification categories. The number of classification categories is "type count-1", which corresponds to the types of values of the control parameters of discrete values. For example, in addition to the base discharge value, a target value of State of Charge (SOC) of a battery (SOC target value) is set and when the SOC is less than the SOC target value, if control is performed to charge the storage cell within a range that does not exceed the base discharge value, the action-requiring scenario group is classified into 4 classification categories corresponding to the two control parameters (the base discharge value and the SOC target value). In other words, the action-requiring scenario group is classified into 4 categories, including (1) both the base discharge value and the SOC target value are large, (2) the base discharge value alone is large, (3) the base discharge value alone is small, (4) both are small, as compared to the initial plan. Alternatively, if control is added in which the operating state (e.g., start/stop) of a power consuming device is changed according to a schedule, a classification category is further combined that corresponds to the different operating states of the device during each time period by which the schedule is set. For example, in a case where the operation and suspension of manufacturing equipment requiring continuous operation for a given period, one time per day, is controlled on an hourly schedule, classification categories corresponding to the time when the equipment is to be started up are combined to classify the action-requiring scenarios. Classified groups of scenarios are stored to memory as early action scenario groups.

An example of creation of an identification condition by the identification condition creating unit 614 will be described. The identification condition creating unit 614 creates an identification condition, for each early action scenario group of an early action scenario group classified by the action-requiring scenario classifying unit 613. More specifically, the identification condition creating unit 614 creates a determination model for determining whether a scenario is to belong to a given early action scenario group.

Here, a determination model is a model for making determination of whether the supply and demand scenario occurring during operation on the current day belongs to an early action scenario group or to other scenario groups, based on the data available at the early action time on the current day. The determination model is created using a common method of determination analysis. In other words, the identification condition creating unit 614 obtains based on relations of explanatory attributes and target attributes obtained by simulation, a determination function that is a criterion for determination; and based on the criterion, builds a model for determining whether the supply and demand scenario belongs to the early action scenario group.

The identification condition creating unit 614 assesses whether the created determination model enables an early action scenario group from among supply and demand scenarios to be identified with precision exceeding a threshold. If an early action scenario group can be identified with precision exceeding the threshold, the identification condition creating unit 614 creates based on the determination model, an identification condition for the early action scenario group.

Hereinafter, an example of creating an identification condition that is based on a determination model based on a distance in an explanatory attribute vector space will be given. This determination model, for example, is a determination model that judges action to be necessary if the cumulative amount of solar radiation of the current day is close to a standard cumulative amount of solar radiation for the action-requiring scenario group, and judges action to be unnecessary if the cumulative amount of solar radiation is close to a standard cumulative amount of solar radiation for scenarios for which action is unnecessary.

Figure 13:
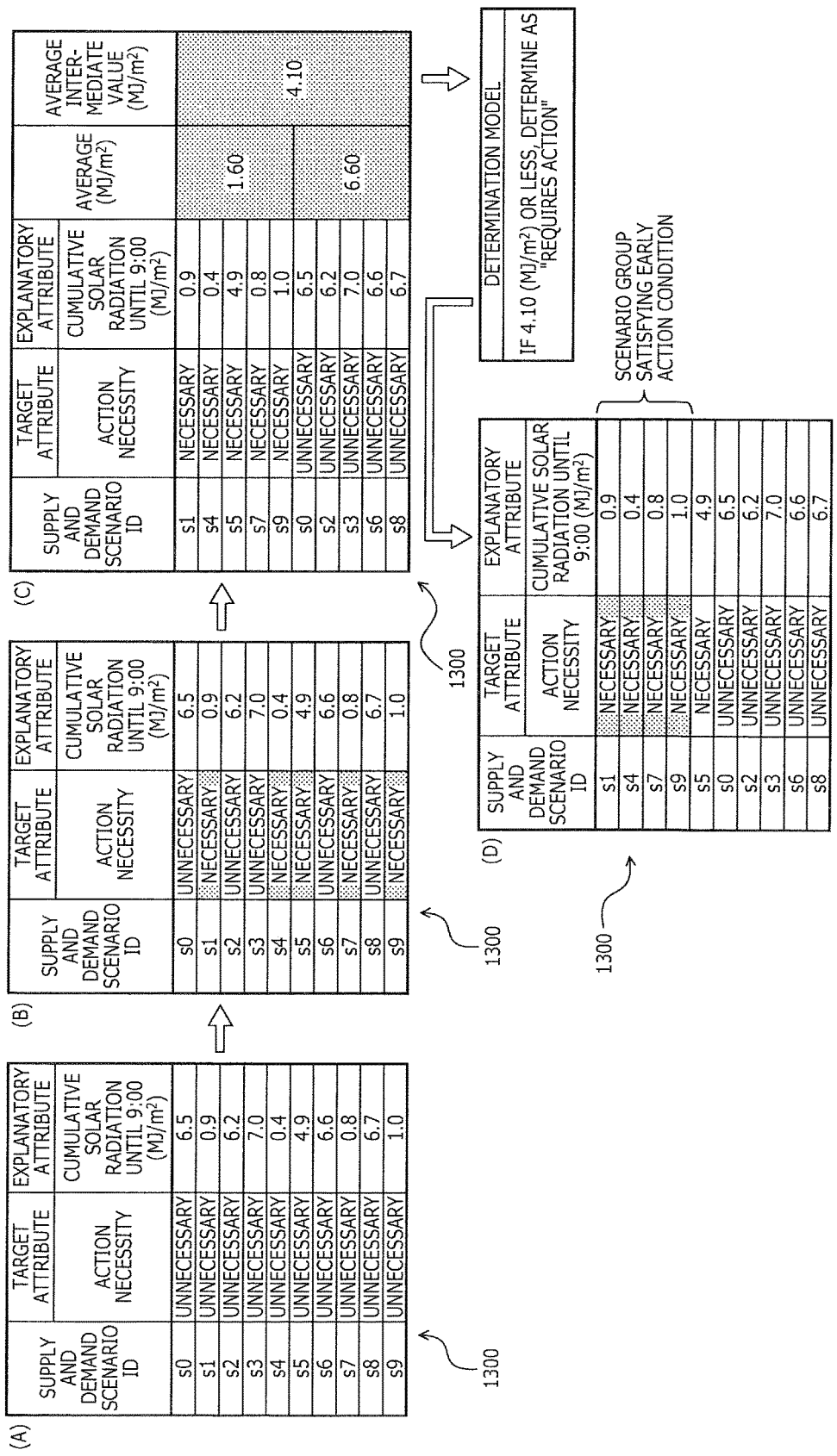
FIG. 13 is a diagram depicting an example of creating an identification condition by an identification condition creating unit 614.

FIG. 13 is a diagram depicting an example of creating an identification condition by the identification condition creating unit 614. In FIG. 13, for simplicity of the description, supply and demand scenarios s0 to s9 and an early action scenario group including s1, s4, s5, s7, and s9 will be described as an example. In the creation of the identification condition, an identification condition creation table 1300, for example, is used. The identification condition creation table 1300 is a table that has fields for supply and demand scenario IDs, target attributes, and explanatory attributes, and into which, a supply and demand scenario ID, a target attribute, and an explanatory attribute are set for each supply and demand scenario.

An explanatory attribute is data that serves as a clue in estimating the target attribute (the necessity of an action) and observable data available at the early action time on the current day or aggregate values of observable data are adopted as explanatory attributes. For example, observable data including the weather, temperature, solar radiation intensity, power consumption, etc. at the early action time, or aggregate values such as a cumulative amount of solar radiation, cumulative electrical power, etc. until the early action time are adopted. In the present example, the explanatory attribute is assumed to be "the cumulative amount of solar radiation [MJ/m$^2$] until 9:00".

As a value for setting an explanatory attribute, when explanatory attributes are consecutive values, the consecutive values are set. When explanatory attributes are discrete values, integers corresponding to each of the discrete values are set for the value. For example, in the case of the weather, discrete values such as 1, 2, and 3 are set corresponding to sunny, cloudy, rain, etc.

In FIG. 13, in (A), the identification condition creating unit 614 initializes the identification condition creation table 1300. More specifically, for example, the identification condition creating unit 614 sets the action necessity for all the supply and demand scenarios to "unnecessary". The identification condition creating unit 614 sets a value for the explanatory attribute of each supply and demand scenario. The value of the explanatory attribute, for example, is calculated from time series data in the scenario DB 700 set based on past data obtained from the operations system 102.

In (B), the identification condition creating unit 614 changes the action necessity for each of the early action scenarios s1, s4, s5, s7, and s9 of the early action scenario group to "necessary".

In (C), the identification condition creating unit 614 obtains the average amount of solar radiation for a supply and demand scenario for which the action necessity is "necessary", i.e., the early action scenarios s1, s4, s5, s7, and s9. In the present example, the average is 1.60 [MJ/m$^2$]. Similarly, the identification condition creating unit 614 obtains the average amount of solar radiation for the supply and demand scenarios s0, s2, s3, s6, and s8 for which the action necessity is "unnecessary". In the present example, the average is 6.60 [MJ/m$^2$]. The identification condition creating unit 614 then obtains an intermediate value of both averages. In the present example, the intermediate value is 4.10 [MJ/m$^2$]. The intermediate value of both averages is a value used as a determination criterion in the determination model. In (C), although an average is obtained, the median may be obtained.

The identification condition creating unit 614 creates a determination model for determining whether a scenario is to belong to an early action scenario group. In the present example, the identification condition creating unit 614 regards an intermediate value of both averages as a criterion and creates a determination model that determines that an early action scenario that is less than or equal to the intermediate value "requires action". This determination model is a determination model that judges whether observable values for the current operation day are close to the average amount of solar radiation of a group for which the average solar radiation amount is 1.60 [MJ/m$^2$] or a group for which the average solar radiation amount is 6.60 [MJ/m$^2$].

In (D), the identification condition creating unit 614 uses the determination model created in (C) and extracts a scenario ("scenario satisfying an early action condition") judged to "require action". Thus, among the early action scenarios s1, s4, s5, s7, and s9, the early action scenarios s1, s4, s7, and s9 are extracted as early action scenarios that "require action". On the other hand, the early action scenario s5 is determined to "not require action" by the determination model since the early action scenario s5 is close to the group for which the average amount of solar radiation is 6.60 [MJ/m$^2$]. Further, the scenarios extracted as a "scenario satisfying an early action condition" do not include the scenarios s0, s2, s3, s6, or s8 that do "not require action". Therefore, the precision (recall ratio) from the perspective of being able to extract without omission of any "early action scenarios" is 80% (4/5) and the precision (conformance ratio) from the perspective of whether a "scenario satisfying an early action condition" is correctly an "early action scenario" is 100%.

Thus, since an early action scenario group can be determined with a precision of a recall ratio of 80% and a conformance ratio of 100% by the determination model, for example, this determination model is an identification condition when a threshold of the recall ratio/conformance ratio is 80%.

In this manner, the early action scenario extracting unit 601 executes at each early action time, a series of processes from the calculation of the action requirement level to the creation of an identification condition. Before the execution of the processes from the calculation of the action requirement level to the creation of an identification condition for the next early action time, the early action scenario extracting unit 601, excludes from among the supply and demand scenario group, supply and demand scenarios (scenarios satisfying an early action condition) that satisfy the created identification condition from being subject to processing. In the example above, from among the supply and demand scenarios s0 to s9, the action-requiring scenarios s1, s4, s7, and s9 are deleted and the series of processes from the calculation of the action requirement level to the creation of an identification condition is executed at the next early action for the remaining supply and demand scenarios s0, s2, s3, s5, s6, and s8.

An example of creating a corrected operation plan by the output information creating unit 602 will be described. The output information creating unit 602 creates a corrected operation plan for an action-requiring scenario group identified by an identification condition. The output information creating unit 602 sequentially selects each identification condition created for each early action scenario group and subjects the selected identification condition to the following processes.

The output information creating unit 602 extracts from a supply and demand scenario group, a supply and demand scenario that satisfies the selected identification condition. The extracted supply and demand scenarios are not necessarily the same as the early action scenario group classified by the action-requiring scenario classifying unit 613. In other words, no scenario that does not satisfy the identification condition is included among the scenarios extracted here, even if the scenario is an early action scenario. On the contrary, only supply and demand scenarios that satisfy the identification condition, including supply and demand scenarios that are not early action scenarios are included. Consequently, in the first embodiment, at the output information creating unit 602, extraction of a supply and demand scenario based on an identification condition is again executed. At the upstream identification condition creating unit 614, the early action scenario group may be adjusted to satisfy the identification condition.

The output information creating unit 602 executes for each of the extracted supply and demand scenarios, a process of creating a corrected operation plan candidate. More specifically, for example, for each of the extracted supply and demand scenarios, the output information creating unit 602 obtains an operation plan that is optimal after the early action time recorded in the early action field of the scenario DB 700 and regards the obtained operation plan as a candidate of the corrected operation plan used in the processes hereinafter.

FIG. 14 is a diagram depicting an example of the early action field in the scenario DB 700 used by the output information creating unit 602. FIG. 14 depicts for the early action scenario group used in the description above, i.e., scenarios corresponding to early actions that correct the base discharge value (220 kW) of the initial plan at 9:00 in a direction that raises the base discharge value, the parts used in the processing of scenarios, including the supply and demand scenario ID field, and the time field, the plan field, and the group ID field of the early action field. In the processes hereinafter, operation plans (corrected operation plans calculated to be optimal at the early action time for the supply and demand scenarios, by the action requirement level calculating unit 611) recorded in the plan field are corrected operation plan candidates.

The output information creating unit 602 selects from among the corrected operation plans recorded in the early action field of the scenario DB 700, one corrected operation plan. Specifically, for example, the output information creating unit 602 selects as a corrected operation plan for the early action candidate time, the corrected operation plan that is safest among the corrected operation plans calculated for each of the extracted supply and demand scenarios. The safest corrected operation plan is a corrected operation plan for which the effect does not drop irrespective of the supply and demand scenario.

In the example depicted in FIG. 14, the corrected operation plans at the early action candidate time are 250 to 290 [kW], for the extracted supply and demand scenarios. For the peak cut effect, when the base discharge value has to be set to 290 [kW], if 250 [kW] is set, discharge occurs too often and the peak cut fails. On the contrary, when the base discharge value has to be set to 250 [kW], the peak cut does not fail even if 290 [kW] is set. Therefore, in the example depicted in FIG. 14, the supply and demand scenario s4 of 290 [kW] is selected as a safe corrected operation plan. The output information creating unit 602 ultimately outputs the early action time, the identification condition, and the corrected operation plan.

FIG. 15 is a diagram depicting an example of output by the output information creating unit 602. For example, output information 1500 is information in which an early action time, an identification condition, and a corrected operation plan are correlated, indicating that "when the amount of solar radiation until the early action time of 9:00 is 4.10 [MJ/m$^2$] or less, the base discharge value is corrected to 290 [kW]". The output information 1500 is output to the operations system 102. At the operations system 102, when the amount of solar radiation until 9:00 is 4.10 [MJ/m$^2$] or less, the operation plan is corrected to 290 [kW] at 9:00 before the periodic correction time (e.g., 13:00).

FIG. 16 is a flowchart depicting and example of a process procedure by the creating apparatus 600. The creating apparatus 600, via the early action scenario extracting unit 601, executes an early action scenario extraction process (step S1601), and via the output information creating unit 602, executes an output information creation process (step S1602).

Figure 17:
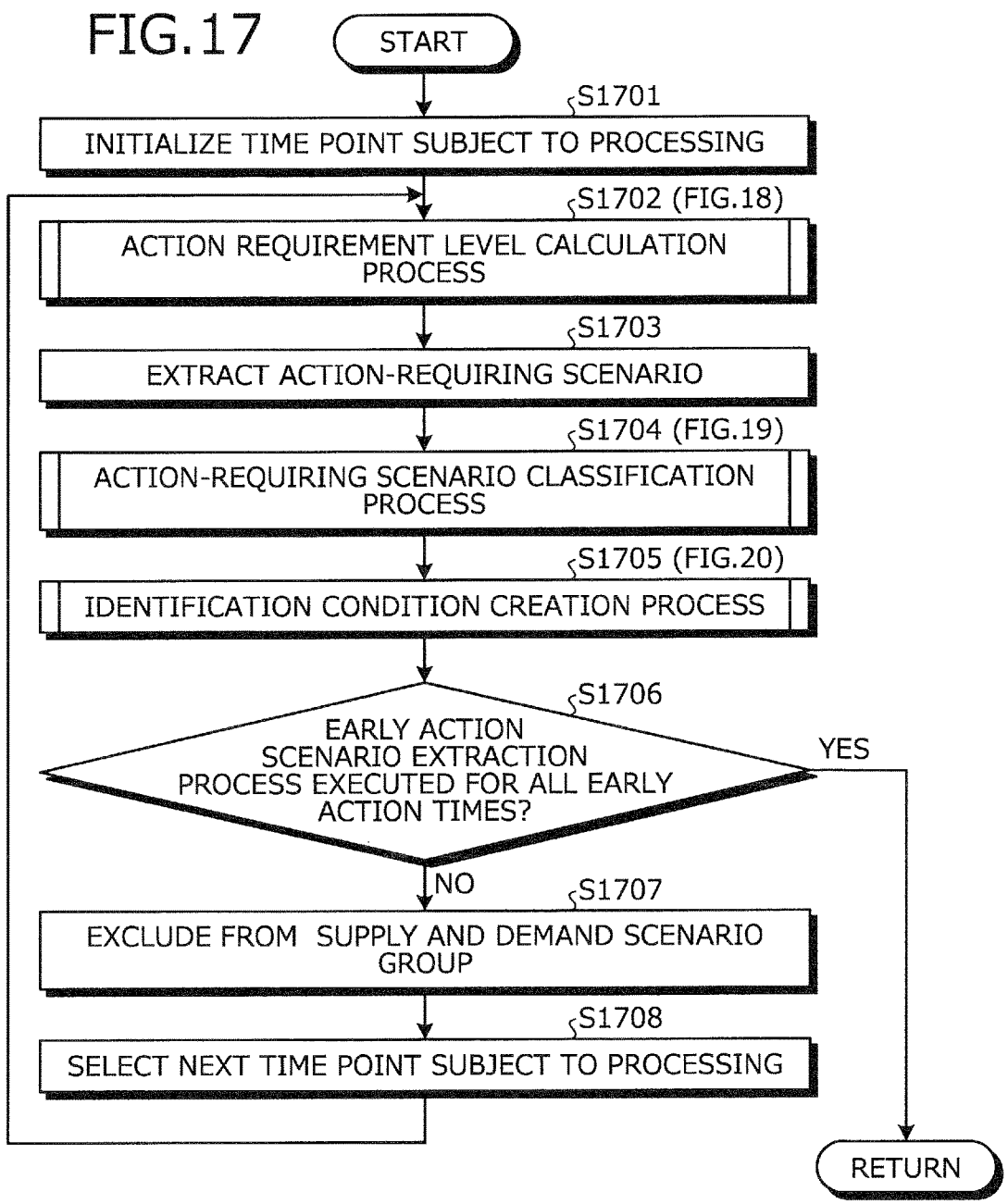
FIG. 17 is a flowchart depicting a detailed process procedure example of an early action scenario extraction process (step S1601) depicted in FIG. 16.

FIG. 17 is a flowchart depicting a detailed process procedure example of the early action scenario extraction process (step S1601) depicted in FIG. 16. The creating apparatus 600 initializes the time point to be subject to processing (step S1701). For example, the creating apparatus 600 sets the time point to be subject to processing to be t1. The creating apparatus 600, via the action requirement level calculating unit 611, executes an action requirement level calculation process for the early action time, which is the time point to be subject to processing (step S1702). Details of the action requirement level calculation process (step S1702) will be described with reference to FIG. 18.

The creating apparatus 600, via the action-requiring scenario extracting unit 612, extracts as an action-requiring scenario, a supply and demand scenario for which the action requirement level is greater than or equal to a threshold (step S1703). The creating apparatus 600, via the action-requiring scenario classifying unit 613, executes an action-requiring scenario classification process (step S1704), and via the identification condition creating unit 614, executes an identification condition creation process (step S1705). Details of the action-requiring scenario classification process (step S1704) will be described with reference to FIG. 19; and details of the identification condition creation process (step S1705) will be described with reference to FIG. 20.

The creating apparatus 600 determines whether the early action scenario extraction process has been executed for all early action times (step S1706). For example, the creating unit determines whether the time point subject to processing is the time point immediately before the periodic correction time. If the early action scenario extraction process has not been executed for all early action times (step S1706: NO), the creating apparatus 600 excludes the early action scenario identified by the identification condition from the supply and demand scenario group subject to assessment at the action requirement level calculation process (step S1702) (step S1707). The creating apparatus 600 selects the next early action time as the time point subject to processing (step S1708), and returns to step S1702. For example, if the time point subject to processing is early action time t1, the creating apparatus 600 selects the next early action time t2.

At step S1702, for the time point subject to processing selected at step S1708, the creating apparatus 600 executes the action requirement level calculation process with respect to the supply and demand scenario group subject to assessment and remaining after exclusion of the early action scenario at step S1707. Further, at step S1706, if the early action scenario extraction process has been executed for each early action time (step S1706: YES), the early action scenario extraction process (step S1601) ends.

Figure 18:
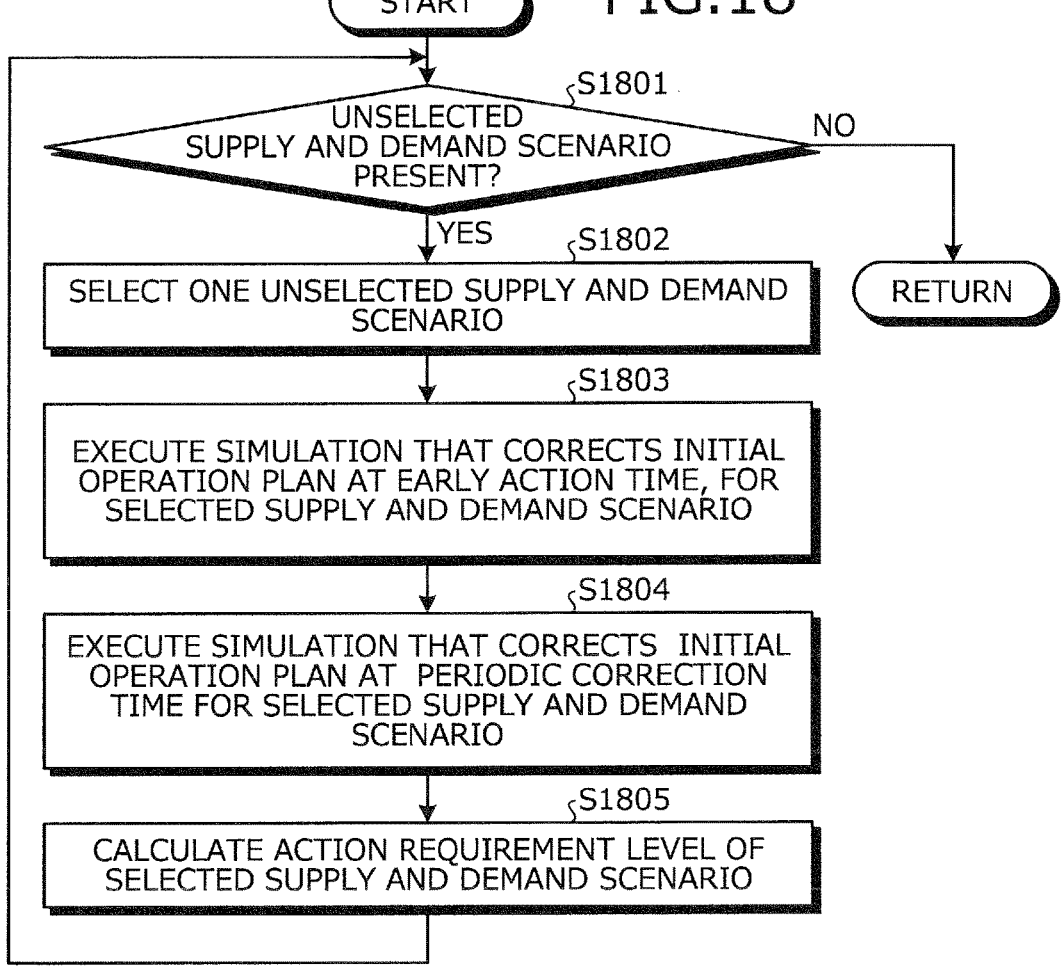
FIG. 18 is a flowchart depicting a detailed process procedure example of an action requirement level calculation process (step S1702) depicted in FIG. 17.

FIG. 18 is a flowchart depicting a detailed process procedure example of the action requirement level calculation process (step S1702) depicted in FIG. 17. In FIG. 18, the creating apparatus 600 determines whether an unselected supply and demand scenario that has not been selected from among the supply and demand scenario group subject to assessment is present (step S1801). If an unselected supply and demand scenario is present (step S1801: YES), the creating apparatus 600 selects one unselected supply and demand scenario (step S1802). The selected supply and demand scenario is referred to as the "selected supply and demand scenario".

The creating apparatus 600 executes for the selected supply and demand scenario, a simulation that corrects the initial operation plan at the early action time, and records the result in the early action field of the scenario DB 700 (step S1803). The creating apparatus 600 further executes a simulation that corrects the initial operation plan at the periodic correction time, and records the results in the periodic correction field of the scenario DB 700 (step S1804). The creating apparatus 600 calculates from both steps S1803 and S1804, the action requirement level of the selected supply and demand scenario (step S1805). The calculated action requirement level is correlated with the supply and demand scenario ID of the selected supply and demand scenario and stored to memory.

Thereafter, the creating apparatus 600 returns to step S1801 and executes steps S1802 to S1805 for each selected supply and demand scenario until no unselected supply and demand scenario remains. When no unselected supply and demand scenario is present (step S1801: NO), the action requirement level calculation process (step S1702) ends.

Figure 19:
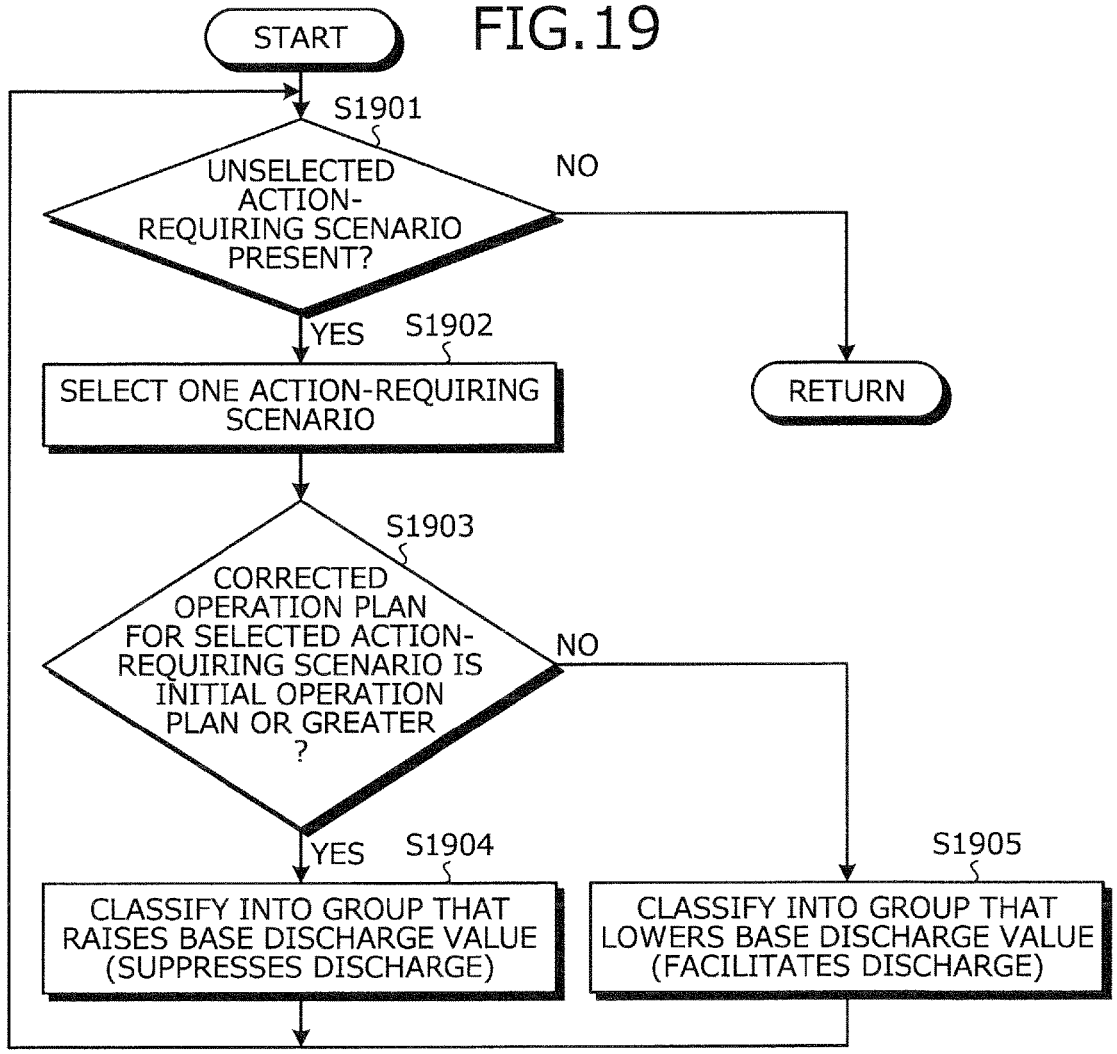
FIG. 19 is a flowchart depicting a detailed process procedure example of an action-requiring scenario classification process (step S1704) depicted in FIG. 17.

FIG. 19 is a flowchart depicting a detailed process procedure example of the action-requiring scenario classification process (step S1704) depicted in FIG. 17. In FIG. 19, the creating apparatus 600 determines whether an unselected action-requiring scenario that has not been selected from among the action-requiring scenarios extracted at step S1703 is present (step S1901). If an unselected action-requiring scenario is present (step S1901: YES), the creating apparatus 600 selects one action-requiring scenario (step S1902). The selected action-requiring scenario will be referred to as the "selected action-requiring scenario".

The creating apparatus 600 determines if the corrected operation plan for the selected action-requiring scenario is the initial operation plan or greater (step S1903). If the corrected operation plan for the selected action-requiring scenario is the initial operation plan or greater (step S1903: YES), the creating apparatus 600 classifies the selected action-requiring scenario into a group that raises the base discharge value (step S1904), and returns to step S1901.

On the other hand, if the corrected operation plan of the selected action-requiring scenario is not the initial operation plan or greater (step S1903: NO), the creating apparatus 600 classifies the selected action-requiring scenario into a group that lowers the base discharge value (step S1905), and returns to step S1901. As step S1901, if no unselected action-requiring scenario is present (step S1901: NO), the action-requiring scenario classification process (step S1704) ends.

Figure 20:
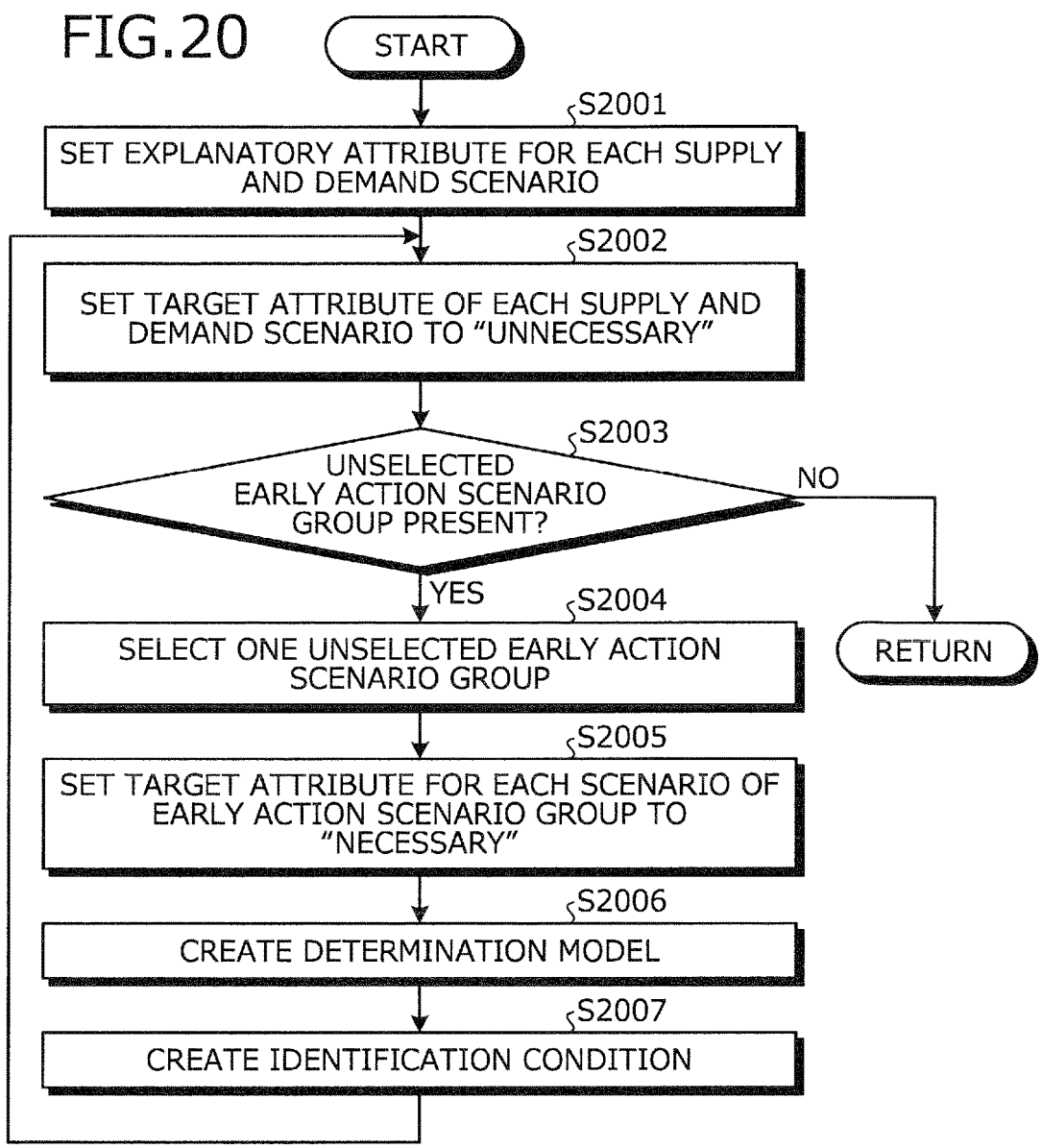
FIG. 20 is a flowchart depicting a detailed process procedure example of an identification condition creation process (step S1705) depicted in FIG. 17.

FIG. 20 is a flowchart depicting a detailed process procedure example of the identification condition creation process (step S1705) depicted in FIG. 17. In FIG. 20, the creating apparatus 600, as depicted in (A) of FIG. 13, sets in the identification condition creation table 1300, an explanatory attribute for each supply and demand scenario (step S2001), and further sets the target attribute of each supply and demand scenario to "unnecessary" (step S2002). Thus, the identification condition creation table 1300 depicted in (A) of FIG. 13 is created.

The creating apparatus 600 determines whether an unselected early action scenario group that has not been selected from the early action scenario group classified at step S1704 is present (step S2003). If an unselected early action scenario group is present (step S2003: YES), the creating apparatus 600 selects one unselected early action scenario group (step S2004), and sets the target attribute for each scenario of the selected early action scenario group to "necessary" (step S2005). Thus, the identification condition creation table 1300 becomes similar to that depicted in (B) of FIG. 13.

The creating apparatus 600, as depicted in (C) of FIG. 13, creates a determination model (step S2006), and creates an identification condition as depicted in (D) of FIG. 13 (step S2007). The creating apparatus 600 returns to step S2002 and resets the target attribute of each supply and demand scenario to "unnecessary". At step S2003, if an unselected early action scenario group is present (step S2003: YES), the operations at steps S2004 to S2007 are executed. Thus, an identification condition is created for each classified early action scenario group. At step S2003, if no unselected early action scenario group is present (step S2003: NO), the identification condition creation process (step S1705) ends.

Figure 21:
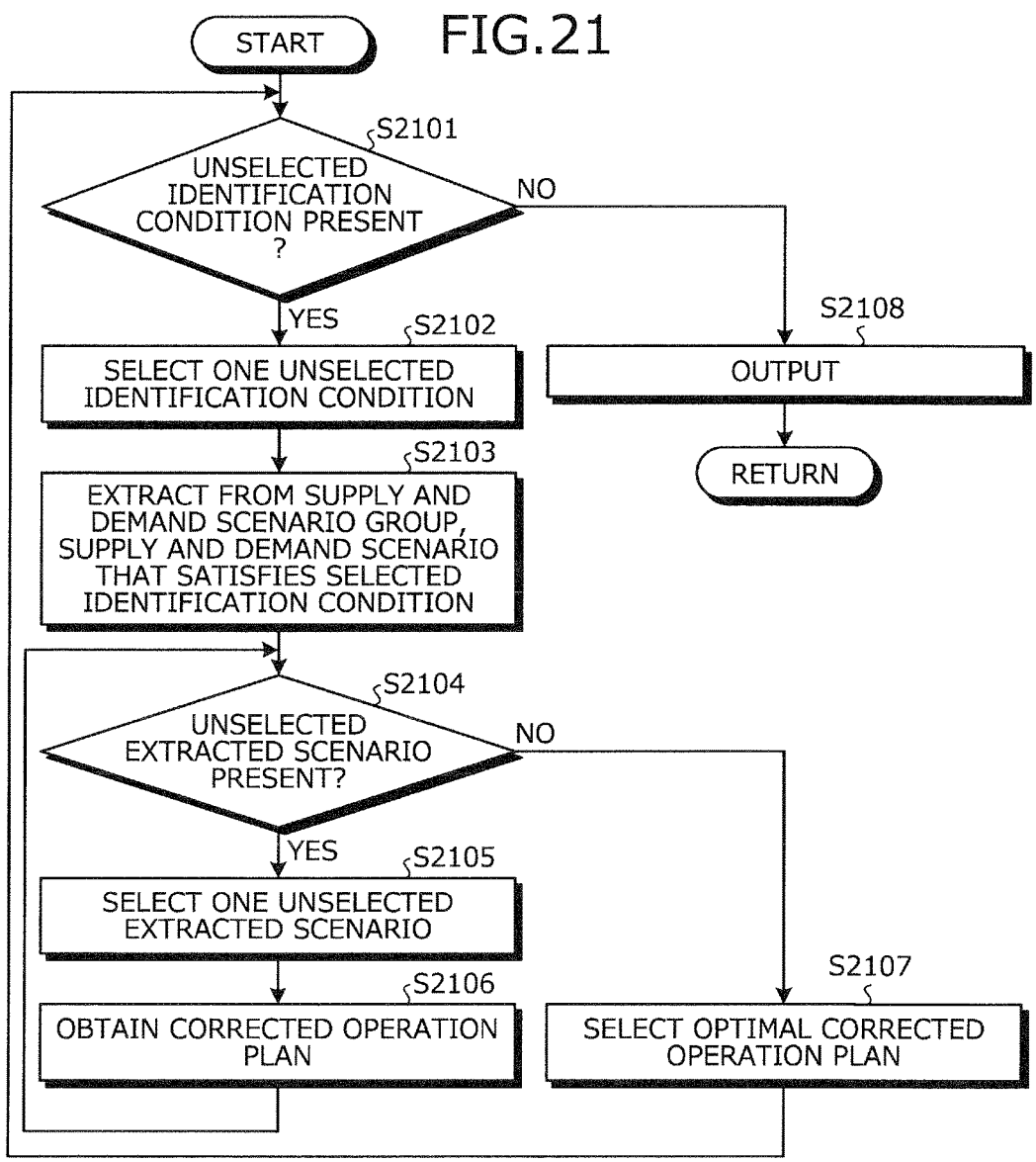
FIG. 21 is a flowchart depicting a detailed process procedure example of an output information creation process (step S1602) depicted in FIG. 16.

FIG. 21 is a flowchart depicting a detailed process procedure example of the output information creation process (step S1602) depicted in FIG. 16. In FIG. 21, the creating apparatus 600 determines whether an unselected identification condition is present (step S2101). If an unselected identification condition is present (step S2101: YES), the creating apparatus 600 selects one unselected identification condition (step S2102). The selected identification condition is referred to as the "selected identification condition".

The creating apparatus 600 extracts from the supply and demand scenario group, a supply and demand scenario that satisfies the selected identification condition (step S2103). The extracted supply and demand scenario is referred to as the "extracted scenario". The creating apparatus 600 determines whether an unselected extracted scenario is present (step S2104). If an unselected extracted scenario is present (step S2104: YES), the creating apparatus 600 selects one unselected extracted scenario (step S2105), and obtains a corrected operation plan for the selected extracted scenario (step S2106). More specifically, the creating apparatus 600, via the output information creating unit 602, obtains for the selected extracted scenario, the operation plan recorded in the early action field of the scenario DB 700, i.e., a corrected operation plan that is optimal at the early action time.

Thereafter, the creating apparatus 600 returns to step S2104 and determines whether an unselected extracted scenario is present (step S2104). If no unselected extracted scenario is present (step S2104: NO), the creating apparatus 600 selects from among the corrected operation plans for each extracted scenario, the optimal corrected operation plan (step S2107). When the optimal corrected operation plan is selected, the optimal corrected operation plan together with the combination of the early action time and identification condition are retained as one set of the output information 1500. Thereafter, the creating apparatus 600 returns to step S2101 and recursively executes steps S2102 to S2107 until no unselected identification condition remains.

At step S2101, if no unselected identification condition is present (step S2101: NO), the creating apparatus 600 outputs to the operations system 102, the output information 1500 such as that depicted in FIG. 15 (step S2108). Thus, the output information creation process (step S1602) ends.

Here, the validity of an early action in the first embodiment will be described. A situation where it is desirable to raise the peak cut effect will be taken as an example. In this case, if the setting of the initial base discharge value is low, unnecessary discharge occurs before the periodic correction time and as a result, the remaining capacity of the storage cell at the periodic correction time becomes insufficient, and during a time period thereafter, the peak at which a cut is to occur cannot be responded to. Consequently, to minimize superfluous discharge as much as possible, the operation plan has to be corrected at a time period as early as possible.

On the other hand, at the initial state of operation, there are few clues (observed data) for narrowing down the supply and demand scenarios that may occur, making it difficult to judge whether the situation is one in which discharge should be suppressed. Thus, in the first embodiment, for an early action time candidate, the creating apparatus 600 extracts by simulation and from among possible supply and demand situations, a supply and demand scenario for which discharge should be suppressed, and checks whether the extracted scenarios can be identified by data that can be obtained at that time point.

Thus, the creating apparatus 600 determines an early action time and an identification condition, as a condition for starting discharge suppression, and creates a suitable action for a situation that satisfies the condition. For example, the creating apparatus 600 creates a safe base discharge value that can prevent unnecessary discharge. This condition enables at each time point of the current operation day, detection of a situation requiring suppression of the amount of discharge, and by implementing the action, unnecessary discharge can be prevented, enabling the peak cut effect to be increased.

As another example, when effective utilization is desired, the storage of excess photovoltaic power to the storage cell 112 may be considered. If the storage cell 112 has not been depleted sufficiently to store the excess power to be generated, loss occurs since the excess power cannot be stored. In this example, the selling of excess power is not considered. Therefore, before the excess power is generated, discharge has to be performed suitably to enable absorption of the excess power.

Nonetheless, in discharging without the occurrence of reverse power flow, the amount of discharge has to be confined within a range of the power demand and therefore, the time point when discharge is to begin is also dependent on supply and demand transitions. Thus, in the first embodiment, by a simulation based on a supply and demand scenario reflecting supply and demand transitions for an early action time candidate, an action-requiring scenario for which discharge is to begin at the early action time is identified and an identification condition for detecting the scenario is created. By the identification condition, at each time point of the current operation day, a situation where excess power absorption has to be dealt with is detected and discharge to enable absorption of the excess power is performed thereby, enabling the loss of the excess power to be prevented.

A second embodiment will be described. In the first embodiment, as depicted in FIG. 12, the creating apparatus 600 performs classification based on whether a corrected optimal operation plan for an action-requiring scenario extracted by the action requirement level is the initial operation plan or greater. In contrast, in the second embodiment, the creating apparatus 600 builds a regression tree, classifies the action-requiring scenarios by the built regression tree, and creates an identification condition using the regression tree. In the second embodiment, although the action-requiring scenario classifying unit 613, the identification condition creating unit 614, and the output information creating unit 602 differ from those of the first embodiment, other aspects are identical to those of the first embodiment. Therefore, in the second embodiment, the action-requiring scenario classifying unit 613, the identification condition creating unit 614, and the output information creating unit 602 will be described. First, the action-requiring scenario classifying unit 613 of the second embodiment will be described.

The action-requiring scenario classifying unit 613 obtains by the regression tree, a group of action-requiring scenarios for which the values of the data available at the early action time are similar and whose actions (for each scenario, an optimal corrected operation plan) differ within a given range. More specifically, for example, the action-requiring scenario classifying unit 613 builds a regression tree of an action-requiring scenario group for which the actions are target attributes, the available data at the early action time are explanatory attributes. The action-requiring scenario classifying unit 613 builds the regression tree such that differences of actions at leaf nodes of the regression tree are a given threshold or less. For example, as a difference between actions at leaf nodes of the regression tree, a value of the mean square error may be used. The action-requiring scenario classifying unit 613 selects as an early action scenario group, a leaf node for which the action difference is the given threshold or less. The selected early action scenario group (leaf node) is assigned a group ID uniquely identifying the group, and for the supply and demand scenarios classified in the early action scenario groups, the corresponding group ID is stored to the 00 early action field gci.

Figure 22:
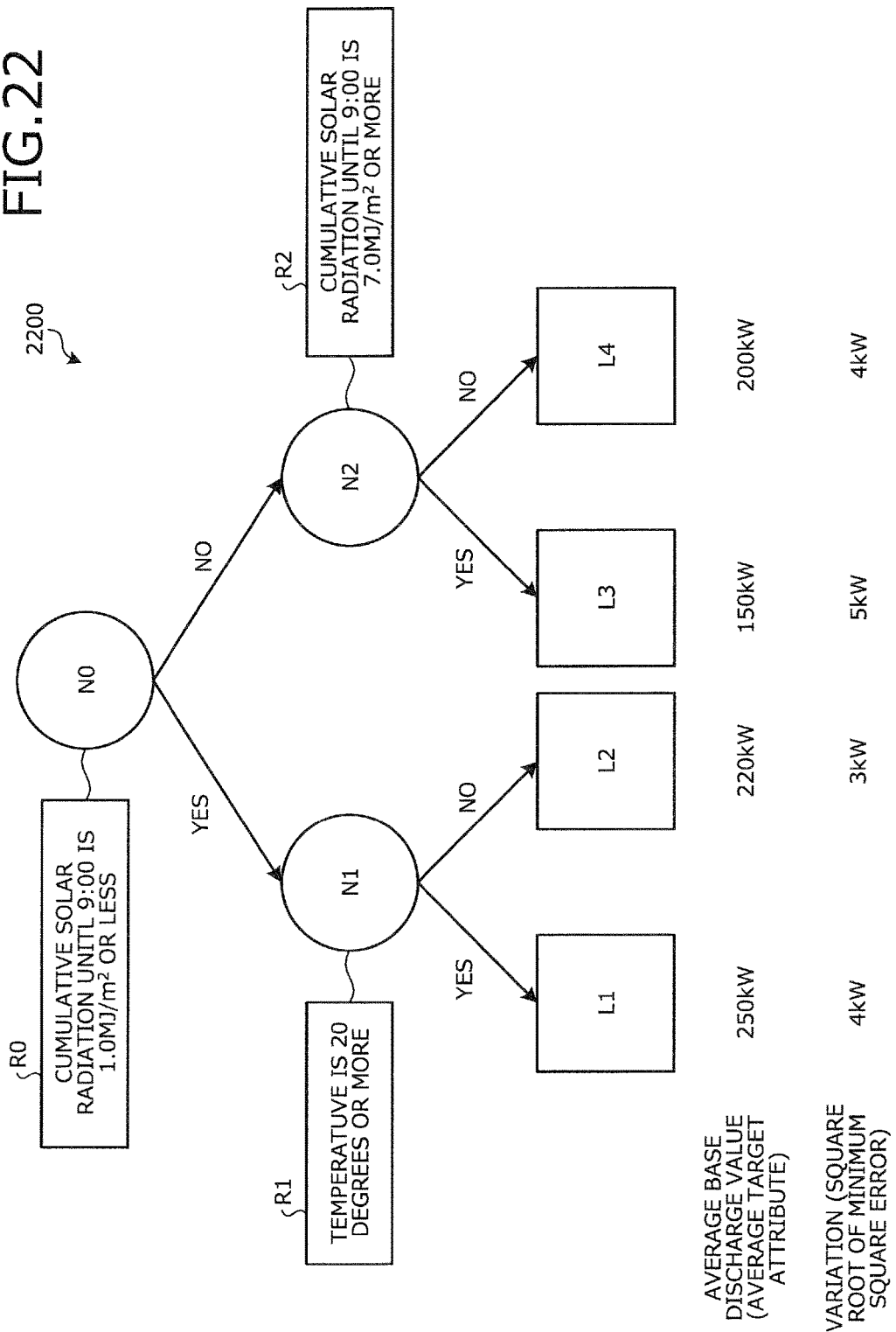
FIG. 22 is a diagram depicting an example of action-requiring scenario classification by a regression tree.

FIG. 22 is a diagram depicting an example of action-requiring scenario classification by a regression tree. FIG. 22 depicts an example of a regression tree 2200 built such that the target attribute is set to "base discharge value (action)", the explanatory attribute is set to "the cumulative amount of solar radiation until 9:00 and the temperature"; and the square root of the minimum square error becomes 5 [kW] or less.

The root node N0 at the uppermost tier of the regression tree 2200 corresponds to the action-requiring scenarios overall and the four leaf nodes at the lowermost tier correspond to the early action scenario groups. Further, the root node N0 and the two intermediate nodes N1 and N2 have rules (division test) for dividing the scenario groups respectively corresponding thereto to lower nodes.

For example, a division rule R0 for the root node N0 is "the cumulative amount of solar radiation until 9:00 is 1.0 [MJ/m$^2$] or less". Further, a division rule R1 for the intermediate node N1 is "the temperature is 20 degrees or more". A division rule R2 for the intermediate node N2 is "the cumulative amount of solar radiation until 9:00 is 7.0 [MJ/m$^2$] or more".

The leaf nodes L1 to L4 have some variation from the average of the actions (for each scenario, an optimal base discharge value) of the action-requiring scenarios respectively classified to the leaf nodes L1 to L4. For example, the leaf node L1 corresponds to scenarios that are among action-requiring scenarios and satisfy both the division rules R0 and R1; and the leaf node L1 indicates that the average of the actions (for each scenario, an optimal base discharge value) of the scenarios is 250 [kW] and the variation is 4 [kW].

In the present example, since all of the leaf nodes L1 to L4 satisfy a condition of a minimum square error threshold, each of the leaf nodes L1 to L4 are selected as an early action scenario group. However, if a leaf node that does not satisfy the condition of the minimum square error threshold is present, the scenarios corresponding to the leaf node are not extracted as an early action scenario group.

The identification condition creating unit 614 of the second embodiment will be described. The identification condition creating unit 614 creates an identification condition based on the regression tree 2200. More specifically, a division test of the regression tree 2200 built by the action-requiring scenario classifying unit 613 is an identification condition candidate. In other words, the regression tree 2200 expresses the rules for dividing an action-requiring scenario group that corresponds to the root node N0, into early action scenario groups that correspond to the leaf nodes L1 to L4.

Therefore, the identification condition creating unit 614 can create based on a division test from the root node N0 to the leaf nodes L1 to L4 , a condition that identifies an early action scenario group from the action-requiring scenario group. Meanwhile, non-action-requiring scenarios that are not action-requiring scenarios are included among the supply and demand scenarios. Therefore, if all of the supply and demand scenarios are divided from the root node N0 by the regression tree 2200, the leaf nodes L1 to L4 corresponding to early action scenario groups will be assigned non-action-requiring scenario. In other words, if an identification condition for an early action scenario group is created by the regression tree 2200, not just early action scenarios, but non-action-requiring scenarios may also be identified by the created identification condition.

Thus, the identification condition creating unit 614 of the second embodiment checks that the identification condition and action for each early action scenario group expressed by the regression tree 2200 have no adverse effect on non-action-requiring scenarios identified by the identification condition. The identification condition creating unit 614 performs a process of employing the identification condition only if there is no adverse effect.

In other words, the identification condition creating unit 614 executes the following two types of simulation for non-action-requiring scenarios identified by the identification condition created for each early action scenario group and created based on the regression tree 2200, and assesses the difference of the effects obtained as simulation results. One of the two types of simulation is a simulation that uses the initial operation plan until the early action time, and thereafter, corrects the operation plan according to the action recorded in the corresponding leaf node of the regression tree 2200. The action is the average or the greatest optimal base discharge value for the early action scenario. The other type of simulation is a simulation that continues operation according to the initial operation plan.

If the effect drops consequent to the action, there is a disadvantage consequent to the action and therefore, the identification condition is not employed. On the other hand, for example, even if a non-action-requiring scenario is identified by the identification condition for the early action scenario group, if the effect is not adversely affected by the action, there is no problem as an identification condition and therefore, such an identification condition is employed.

Hereinafter, although a process employing only identification conditions that have no adverse effects will be described, configuration may be such that at the identification condition creating unit 614 of the second embodiment, an identification condition is further added so that non-action-requiring scenarios that are adversely affected are identified, thereby, preventing adverse effects from occurring. For example, as with the identification condition creating unit 614 of the first embodiment, the identification condition creating unit 614 of the second embodiment sets a target attribute for non-action-requiring scenarios that are not adversely affected the early action scenario group and early action to "necessary"; and sets a target attribute for non-action-requiring scenarios adversely affected by an early action to "unnecessary". The identification condition creating unit 614 of the second embodiment may add the created identification condition to the identification conditions created using the regression tree 2200.

FIG. 23 is a diagram depicting an example of an identification condition creation table 2300 created by the regression tree 2200. The identification condition creation table 2300 includes fields for identification conditions, actions, and effect flags. The identification condition field stores, as one example of an identification condition, a logical AND operator of a division rule from the root node to the leaf nodes. The action field stores, as an example of an action, a base discharge value. The effect flag field stores a flag by a non-action-requiring scenario check and indicating "not affected" or "affected" for the non-action-requiring scenario.

In the case of "not affected", even if the action indicated in the action field is performed, the effect is not adversely affected. In the case of "affected", if the action indicated in the action field is performed, the effect is adversely affected. A record on the first line of the identification condition creation table 2300 in FIG. 23 corresponds to the leaf node L1, a record on the second line corresponds to the leaf node L2, a record on the third line corresponds to the leaf node L3, and a record on the fourth line corresponds to the leaf node L4.

For example, the record on the first line indicates that identification conditions created by the regression tree 2200 are "the cumulative amount of solar radiation until 9:00 is 1.0 $[MJ/m^2]$ or less" and "the temperature is 20 degrees or more". The record further indicates that as a result of a simulation that changes the base discharge value to 250 [kW] at 9:00, which is the early action time, for non-action-requiring scenarios identified by the identification conditions, deterioration of the effect in each of the non-action-requiring scenarios is within a given threshold.

On the other hand, the record on the fourth line indicates that the identification conditions created by the regression tree 2200 are "the cumulative amount of solar radiation until 9:00 is more than 1.0 $[MJ/m^2]$" and "the cumulative amount of solar radiation until 9:00 is less than 7.0 $[MJ/m^2]$". The record further indicates that as a result of a simulation that changes the base discharge value to 200 [kW] at 9:00, which is the early action time, for non-action-requiring scenarios identified by the identification conditions, deterioration of the effect exceeds the given threshold for some scenarios.

By a non-action-requiring scenario check, the output information creating unit 602 of the second embodiment sets as a corrected operation plan, a "not affected" combination among combinations of an identification condition created by the identification condition creating unit 614 and an action. In the example depicted in FIG. 23, the output information creating unit 602 sets the records on the first to third lines of the identification condition creation table 2300 as corrected operation plans and outputs the set records to the operations system 102.

Thus, for example, at the operations system 102, when the cumulative amount of solar radiation until 9:00 on the current day is 1.0 $[MJ/m^2]$ or less and the temperature is 20 degrees or higher, the base discharge value, which is the initial operation plan, is corrected to 250 [kW] at 9:00, which is the early action time. Consequently, since the deterioration is less than or equal to the threshold if the effect deteriorates, the action is taken as a valid action. Further, in the second embodiment, the corrected operation plan can be created by extraction from the identification condition creation table 2300, thereby enabling efficiency of the corrected operation plan creation process to be facilitated.

An example of a process procedure by the creating apparatus 600 according to the second embodiment will be described. As described above, in the second embodiment, the action-requiring scenario classifying unit 613, the identification condition creating unit 614, and the output information creating unit 602 differ from those of the first embodiment. Therefore, concerning process procedures, only processes by the action-requiring scenario classifying unit 613, the identification condition creating unit 614, and the output information creating unit 602 will be described and since other aspects are the same as those of the first embodiment, description thereof is omitted hereinafter. An example of a process procedure of the action-requiring scenario classification process by the action-requiring scenario classifying unit 613 will be described.

Figure 24:
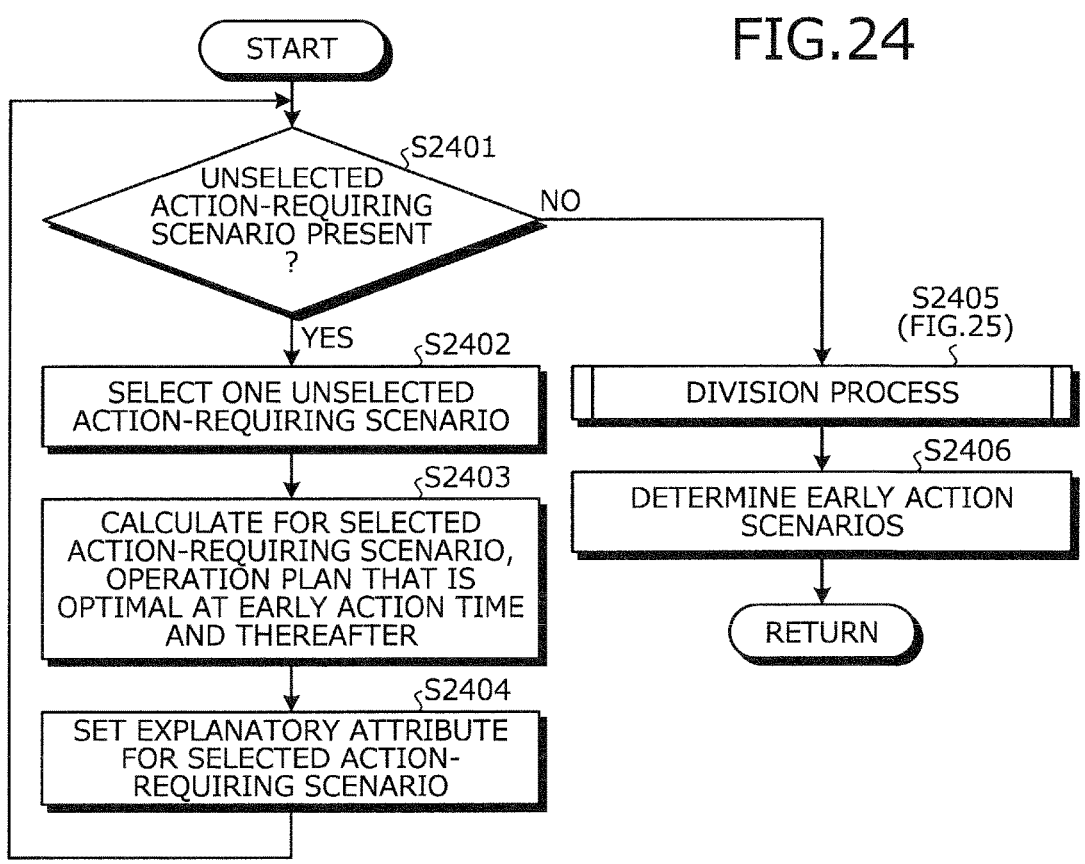
FIG. 24 is a flowchart depicting an example of a process procedure for action-requiring scenario classification by an action-requiring scenario classifying unit 613 according to a second embodiment.

FIG. 24 is a flowchart depicting an example of a process procedure for action-requiring scenario classification by the action-requiring scenario classifying unit 613 according to the second embodiment. In FIG. 24, the creating apparatus 600 determines whether of the action-requiring scenarios extracted by the action-requiring scenario extracting unit 612, an unselected action-requiring scenario is present (step S2401).

If an unselected action-requiring scenario is present (step S2401: YES), the creating apparatus 600 selects one unselected action-requiring scenario (step S2402). The selected action-requiring scenario will be referred to as the "selected action-requiring scenario". The creating apparatus 600 calculates by simulation and for the selected action-requiring scenario, an operation plan that is optimal at the early action time and thereafter (step S2403). The calculated optimal operation plan is regarded as a target attribute of the selected action-requiring scenario. The creating apparatus 600 calculates for the selected action-requiring scenario and based on the scenario DB 700, data available at the early action time, sets the result as an explanatory attribute (step S2404), and returns to step S2401. The data available at the early action time is, for example, the amount of solar radiation and/or temperature. In the second embodiment, multiple explanatory attributes are set to build the regression tree. In the present example, the division rules include R0 to R2.

At step S2401, if no unselected action-requiring scenario is present (step S2401: NO), the creating apparatus 600 executes a division process (step S2405). In the division process (step S2405), the creating apparatus 600 builds the regression tree 2200, and divides the action-requiring scenario group into scenarios corresponding to the leaf nodes. Details of the division process (step S2405) will be described hereinafter. After the division process (step S2405), the creating apparatus 600 determines as early action scenarios, scenarios for which the difference of the actions is within a given range, among the scenarios corresponding to the leaf node of the regression tree 2200 (step S2406), thereby ending the action-requiring scenario classification process (step S1704).

Figure 25:
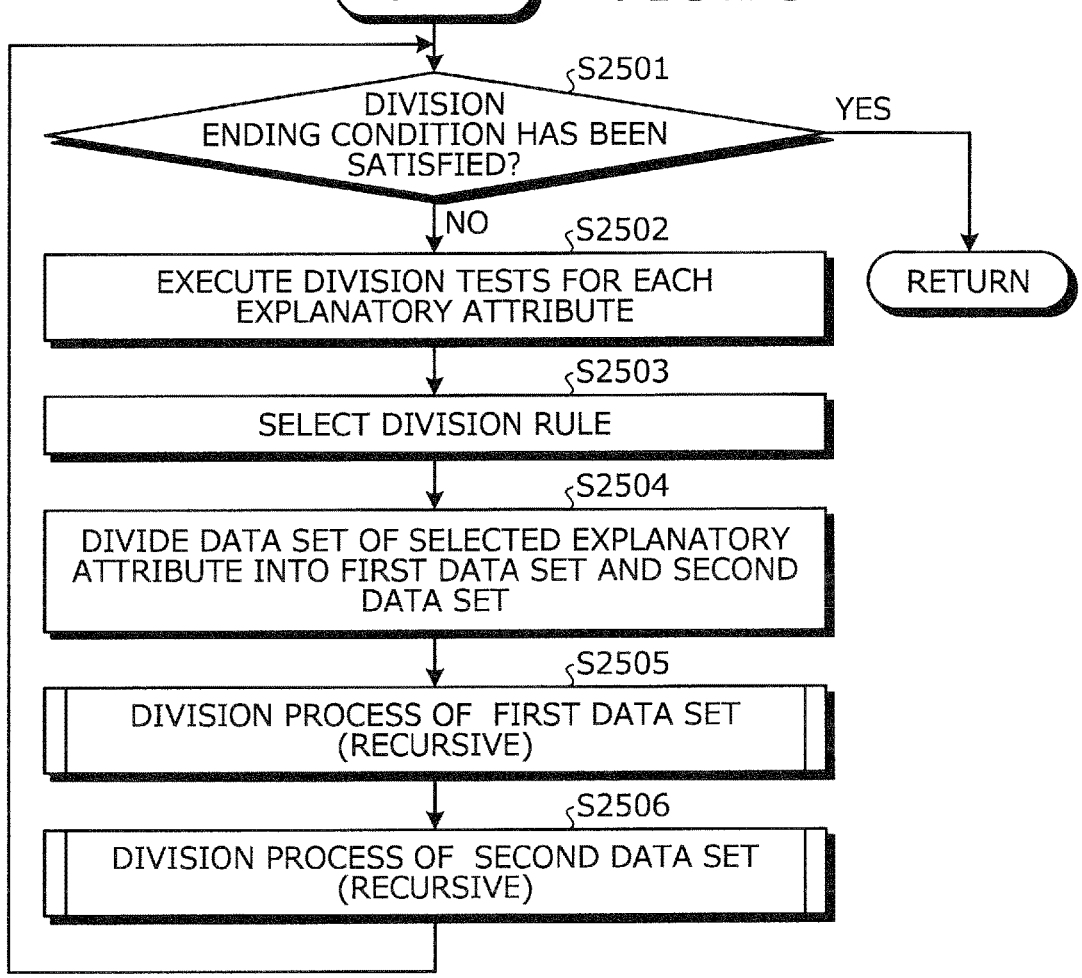
FIG. 25 is a flowchart depicting a detailed process procedure example of a division process (step S2405) depicted in FIG. 24.

FIG. 25 is a flowchart depicting a detailed process procedure example of the division process (step S2405) depicted in FIG. 24. In FIG. 25, the creating apparatus 600 determines whether a division ending condition has been satisfied (step S2501). The division ending condition is a condition stipulating for the action-requiring scenario group corresponding to the node subject to division, that the variation (minimum square error) of the target attribute, which is the optimal operation plan obtained at step S2401, be a given threshold or less; and a data count (scenario count) that corresponds to the node subject to division be sufficiently small with respect to the total data count (total scenario count).

If the division ending condition is not satisfied (step S2501: NO), the creating apparatus 600 executes for the action-requiring scenario group corresponding to the node subject to division, division tests for each explanatory attribute (step S2502). More specifically, in the division tests corresponding to the explanatory attributes, a division rule is set by the explanatory attribute such that the mean square error of the target attribute in the two groups after division is minimized (or the variance between groups is maximized). The creating apparatus 600 selects a division rule that minimizes the mean square error or maximizes variance between classes (step S2503).

According to the selected division rule, the creating apparatus 600 divides into a first data set and a second data set, the action-requiring scenario group that corresponds to the node subject to division and is a data set (step S2504). For example, when the division rule is "the cumulative amount of solar radiation until 9:00 is 1.0 [$MJ/m^2$] or less" at the root node N0, the action-requiring scenario group corresponding to the node N0 is divided into a first data set that is "the cumulative amount of solar radiation until 9:00 is 1.0 [$MJ/m^2$] or less" and a second data set that is not "the cumulative amount of solar radiation until 9:00 is 1.0 [$MJ/m^2$] less".

Thereafter, the creating apparatus 600 executes a division process of the first data set (step S2505). More specifically, the creating apparatus 600 executes steps S2501 to S2504 with respect to the first data set. Further, the creating apparatus 600 executes a division process of the second data set (step S2506). More specifically, the creating apparatus 600 executes steps S2501 to S2504 with respect to the second data set.

The division process of the first data set (step S2505) and the division process of the second data set (step S2506) are recursive division processes (step S2405). After the division process of the second data set (step S2506), the creating apparatus 600 returns to step S2501. As step S2501, if the division ending condition is satisfied (step S2501: YES), the creating apparatus 600 ends the division process (step S2405).

Figure 26:
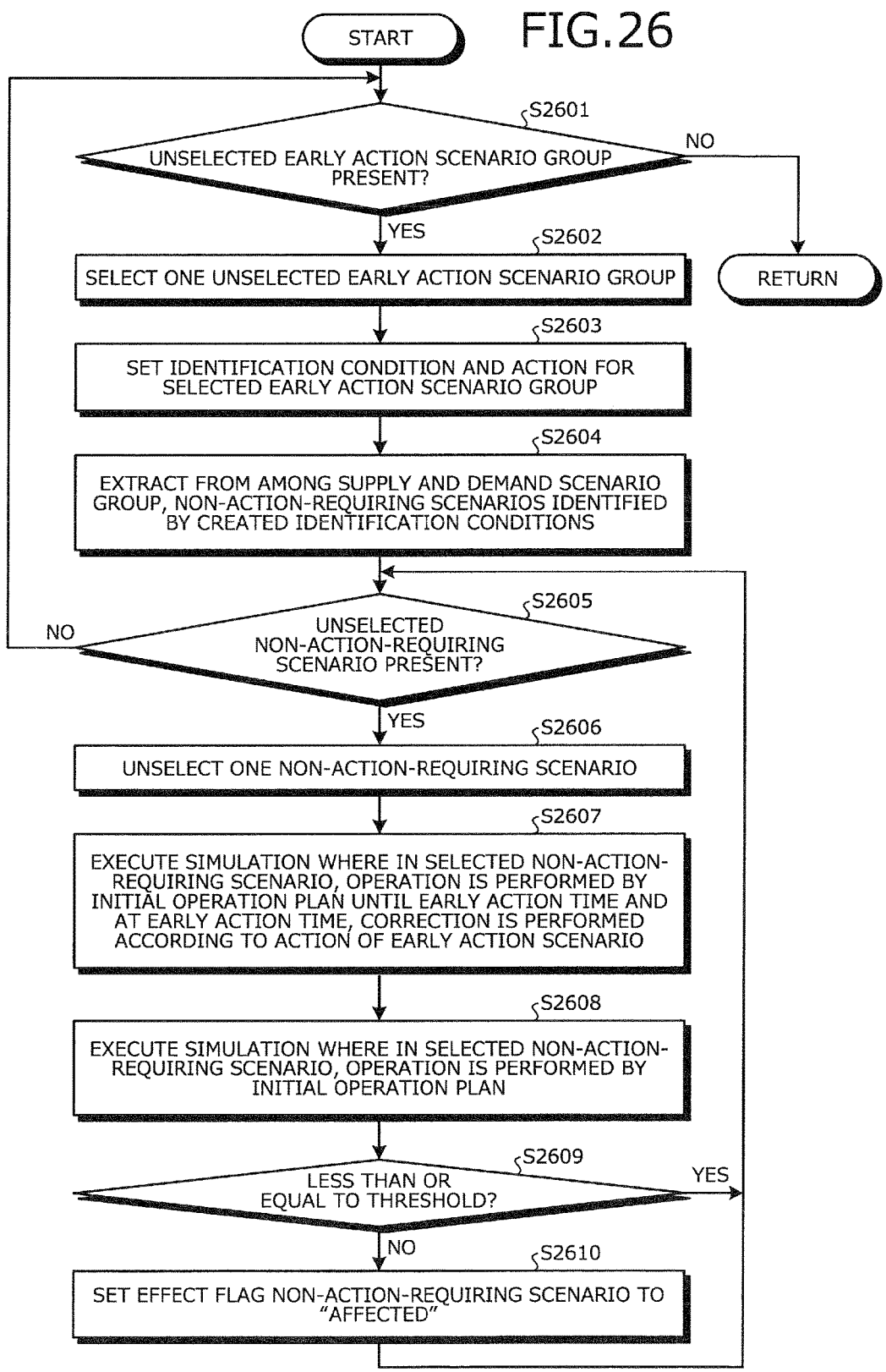
FIG. 26 is a flowchart depicting a detailed process procedure example of the identification condition creation process by the identification condition creating unit 614 according to the second embodiment.

FIG. 26 is a flowchart depicting a detailed process procedure example of the identification condition creation process by the identification condition creating unit 614 according to the second embodiment. In FIG. 26, the creating apparatus 600 determines whether in the regression tree 2200, an unselected early action scenario group is present (step S2601). If an unselected early action scenario group is present (step S2601: YES), the creating apparatus 600 selects one unselected early action scenario group (step S2602).

The creating apparatus 600 sets in the identification condition creation table 1300, an identification condition and an action for the selected early action scenario group (step S2603). More specifically, for example, the creating apparatus 600 sets the path of division rules from the root node N0 to the leaf node of the selected early action scenario group as the identification conditions. The optimal operation plan obtained at step S2403 is stored to the action field of the identification condition creation table 2300.

For example, the creating apparatus 600 sets "the cumulative amount of solar radiation until 9:00 is 1.0 [$MJ/m^2$] or less" and "the temperature is 20 degrees or more" as the identification conditions for the early action scenario group of the leaf node L1. Further, the creating apparatus 600 sets the average of the optimal operation plan calculated at step S2403 as an action for each early action scenario of the early action scenario group. At this time point, the effect flags are all in the initial state and indicate "not affected".

The creating apparatus 600 extracts from among non-action-requiring scenarios of the supply and demand scenario group, non-action-requiring scenarios identified by identification conditions created for the selected early action scenario group (step S2604). More specifically, for example, the identification condition creating unit 614 provides non-action-requiring scenarios to the regression tree 2200 and executes a division test. Consequently, non-action-requiring scenarios are classified to the leaf nodes L1 to L4. The identification condition creating unit 614 extracts from among the non-action-requiring scenarios classified to the leaf nodes L1 to L4, non-action-requiring scenarios classified to the leaf node corresponding to the selected early action scenario group.

Subsequently, the creating apparatus 600 determines whether an unselected non-action-requiring scenario that has not been selected from among the extracted non-action-requiring scenarios is present (step S2605). If an unselected non-action-requiring scenario is present (step S2605: YES), the creating apparatus 600 selects on unselected non-action-requiring scenario (step S2606). The creating apparatus 600 executes a simulation wherein the selected non-action-requiring scenario, operation is performed by the initial operation plan until the early action time and at the early action time, correction is performed according to the action of the early action scenario (step S2607). The creating apparatus 600 further executes a simulation where in the selected non-action-requiring scenario, operation is performed by the initial operation plan (step S2608).

The creating apparatus 600 compares the effects (e.g., the base discharge values, which are the optimal operation plans) obtained as simulation results at steps S2607 and S2608 (step S2609). If the difference of the effects is less than or equal to a given threshold (step S2609: YES), the identification condition set at step S2603 is employed and therefore, the creating apparatus 600 leaves the effect flag that corresponds to the identification condition set at step S2603 set to OFF and returns to step S2605.

On the other hand, if the difference of the effects is greater than the given threshold (step S2609: NO), the creating apparatus 600 sets the effect flag that corresponds to the identification condition created at step S2603 to "affected" (step S2610). In other words, to prevent the effect of the non-action-requiring scenario from dropping consequent to the early action, the identification condition is not employed. The creating apparatus 600 returns to step S2605. The creating apparatus 600 recursively executes the operations at step S2606 and thereafter until no unselected non-action-requiring scenario remains. Further, at step S2605, when no unselected non-action-requiring scenario is present (step S2605: NO), the creating apparatus 600 returns to step S2601.

The creating apparatus 600 recursively executes the operations at step S2602 and thereafter until no unselected early action scenario group remains. At step S2601, when no unselected early action scenario group is present (step S2601: NO), the creating apparatus 600 ends the identification condition creation process (step S1705).

Figure 27:
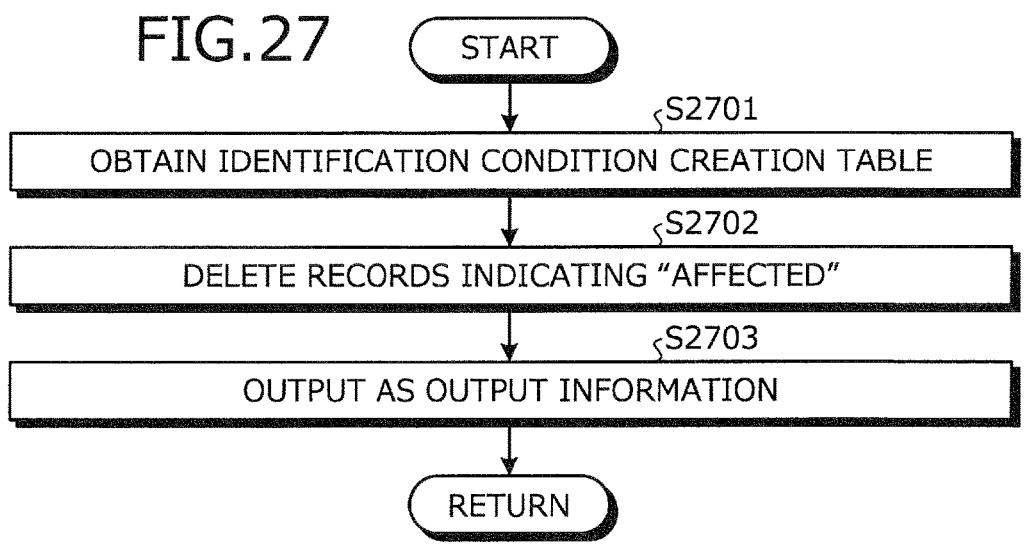
FIG. 27 is a flowchart depicting a detailed process procedure example of the output information creation process by the output information creating unit 602 according to the second embodiment.

FIG. 27 is a flowchart depicting a detailed process procedure example of the output information creation process by the output information creating unit 602 according to the second embodiment. In FIG. 27, the creating apparatus 600 obtains the identification condition creation table 2300 (step S2701). The creating apparatus 600 deletes from the obtained identification condition creation table 2300, records having an effect flag indicating "affected" (step S2702). The creating apparatus 600 outputs the identification condition creation table 2300 after deletion, as output information, to the operations system 102 (step S2703).

Thus, according to the second embodiment, the corrected operation plan can be created by extraction from the identification condition creation table 2300, thereby facilitating improved efficiency of the creation process for the corrected operation plan. Further, by confirming that a non-action-requiring scenario identified by an identification condition is not adversely affected, an identification condition that adversely affects an early action can be prevented from being employed. Thus, improvement of the precision of the early action prediction can be facilitated.

A third embodiment will be described. In the first and second embodiments, although a preliminarily set supply and demand scenario group is used, in the third embodiment, the creating apparatus 600 generates a supply and demand scenario group. Parts identical to those of the first and second embodiments are given the same reference numerals used in the first and second embodiments, and description thereof is omitted hereinafter.

Figure 28:
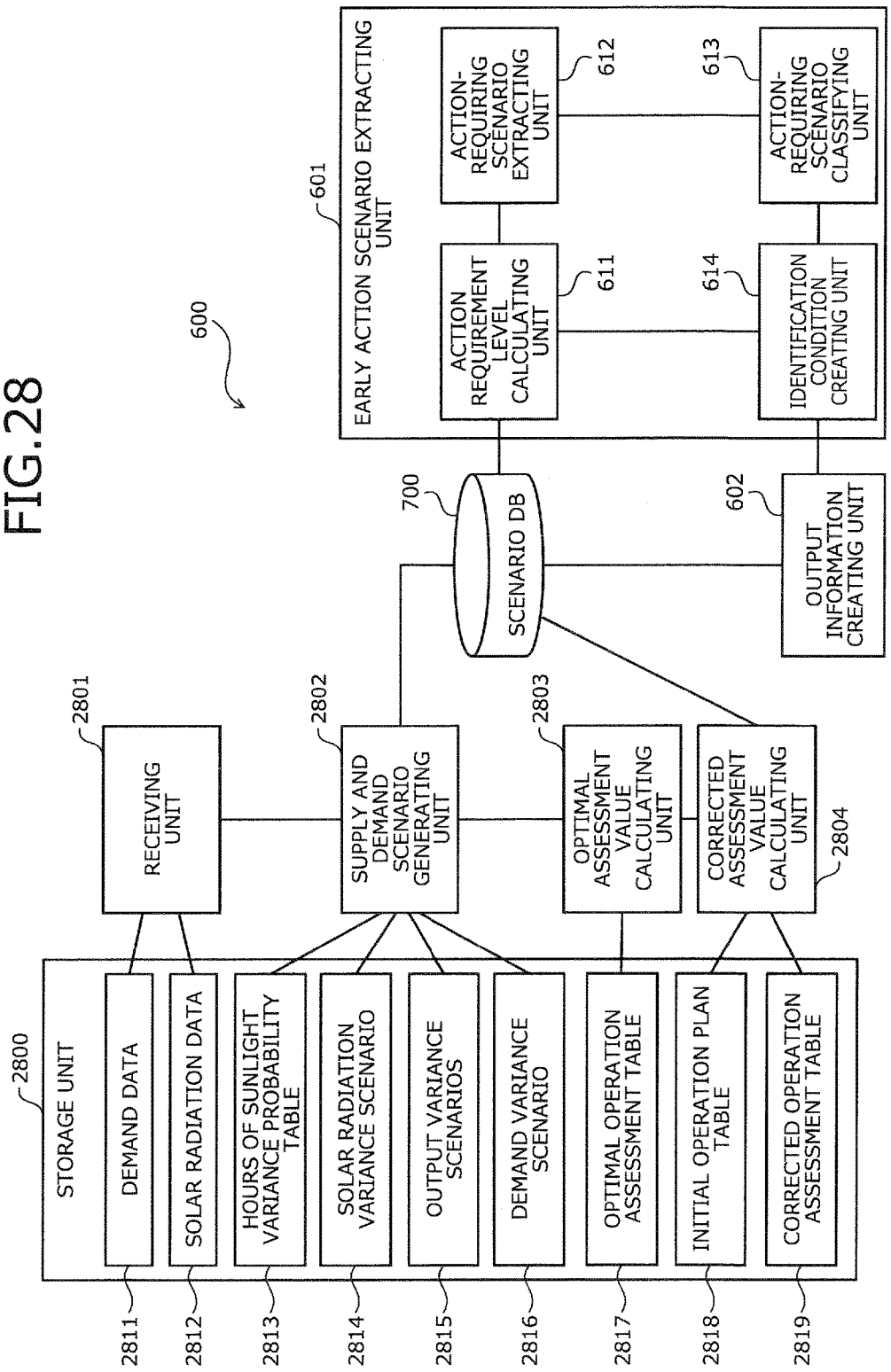
FIG. 28 is a block diagram depicting an example of a functional configuration of the creating apparatus 600 according to a third embodiment.

FIG. 28 is a block diagram depicting an example of a functional configuration of the creating apparatus 600 according to the third embodiment. In FIG. 28, the creating apparatus 600 further includes a storage unit 2800, a receiving unit 2801, a supply and demand scenario generating unit 2802, an optimal assessment value calculating unit 2803, and a corrected assessment value calculating unit 2804, in addition to the scenario DB 700, the early action scenario extracting unit 601, and the output information creating unit 602. The storage unit 2800 stores various types of data. Further, generated data is stored to storage unit 2800 by the CPU 501. Data stored in the storage unit 2800 can be read out by the CPU 501. The storage unit 2800, for example, is implemented by the hard disc apparatus 507.

The receiving unit 2801 receives various types of information from the input apparatus 502. For example, the receiving unit 2801 receives demand data 2811 and solar radiation data 2812 from the input apparatus 502; and stores the received the demand data 2811 and the solar radiation data 2812 to the storage unit 2800. The demand data 2811 is time series data concerning demand power values. For example, the demand data 2811 is data correlating each time period for one day with demand power values. The demand power values, for example, are calculated from statistical data of past power consumption values.

The solar radiation data 2812 is a record of past amounts of solar radiation, for given times. The amount of solar radiation, for example, includes values measured in units of hours of sunlight. Here, hours of sunlight is a value defined as the hours that the earth is irradiated with direct sunlight unobstructed by clouds and of an intensity that is a given value (generally, 0.12 [kW/m$^2$]) or more. The solar radiation data 2812, for example, are hourly recordings of the hours of sunlight and the cumulative amount of solar radiation per unit area for one month (July 2010). The solar radiation data 2812, for example, is data obtained from a database of the Japan Meteorological Agency.

For example, as conditions identifying a range of fluctuation of the amount of solar radiation that has to be taken into consideration in the creation of an operation plan, the receiving unit 2801 receives from the input apparatus 502, a start time t0, an end time tn, an initial hours of sunlight value h0, and a temporal interval Δt. Here, the start time t0 and the end time tn respectively correspond to a time period during which generated electric power has a possibility of fluctuating consequent to the effects of weather changes and to an extent requiring consideration, i.e., the start time and the end time of a time period during which sufficient electric power can be expected to be generated in clear weather. For example, the start time t0 is 9:00 and the end time tn is 15:00.

The initial hours of sunlight value h0 is the amount of solar radiation at the start time t0 of the day for which the initial operation plan is created, and for example, is calculated based on the weather forecast for the start time t0 by the weather forecast on the previous day. For example, if the weather at the start time t0 has been forecast to be "sunny", the initial hours of sunlight value h0 is "1". Here, although the receiving unit 2801 has been described to receive the initial hours of sunlight value h0, configuration is not limited hereto. For example, the receiving unit 2801 may receive the initial amount of solar radiation. By converting the amount of solar radiation into hours of sunlight, the initial hours of sunlight value h0 is calculated.

In this conversion, for example, a correlative relation between the hours of sunlight for each month and the amount of solar radiation for the month is used. More specifically, regression analysis of the hours of sunlight and the amount of solar radiation is performed, and the obtained regression line expression is used to calculate the hours of sunlight. Further, the temporal interval Δt corresponds to a time interval of the hours of sunlight recorded in the solar radiation data 2812. For example, the temporal interval Δt is one hour. The receiving unit 2801 outputs the received start time t0, end time tn, initial hours of sunlight value h0, and temporal interval Δt to the supply and demand scenario generating unit 2802.

The supply and demand scenario generating unit 2802 generates multiple scenarios indicating the potential of transition of a supply and demand power value. For example, the supply and demand scenario generating unit 2802 builds based on the solar radiation data 2812, a weather variance model modeling weather changes per unit time as a Markov process. The supply and demand scenario generating unit 2802 performs a Monte Carlo simulation based on the built weather variance model and thereby, generates multiple output variance scenarios 2815.

The supply and demand scenario generating unit 2802 obtains the difference of a demand variance scenario 2816 indicated by the demand data 2811 and the output variance scenarios 2815 and thereby, generates multiple supply and demand scenarios. Here, a supply and demand scenario is time series data of the difference of the power demand in a power network operating the storage cell 112 and the photovoltaic output. The supply and demand scenario generating unit 2802 is one example of a generating unit. Further, the supply and demand power value correspond to the difference of the power demand in the power network on which the storage cell 112 is operating and the photovoltaic output, and is further referred to as the supply and demand difference, or supply and demand balance. A supply and demand scenario is one example of a scenario.

Hereinafter, a process executed by the supply and demand scenario generating unit 2802 will be described in detail. For example, the supply and demand scenario generating unit 2802 generates an hours of sunlight variance probability table 2813 from the solar radiation data 2812. More specifically, the supply and demand scenario generating unit 2802 assumes that the hours of sunlight at a given time is affected by the hours of sunlight at the time point immediately before, and models changes, per unit time, in the hours of sunlight as a Markov process. Here, the supply and demand scenario generating unit 2802 is able to model changes in the hours of sunlight as a Markov process because the hours of sunlight are affected by clouds, and the state of the clouds such as the amount and density can be thought to continuously change over time, i.e., the hours of sunlight measured at time intervals that enable the continuous variation of the cloud state to be captured can be thought to be affected by the weather the time point immediately before.

FIG. 29 is a diagram depicting an example of the hours of sunlight variance probability table 2813. The horizontal direction of FIG. 29 represents pre-variance hours of sunlight $H_{before}$ and is divided into four fields including "0.0", "0.1-0.5", "0.6-0.9", and "1.0". Further, the vertical direction represents post-variance hours of sunlight $H_{after}$ and is divided into 11 fields including from "0.0" to "1.0", at "0.1" intervals. As depicted in FIG. 29, the hours of sunlight variance probability table 2813 stores conditional probabilities $P(H_{after}|H_{before})$ that the pre-variance hours of sunlight $H_{before}$ will change to the post-variance hours of sunlight $H_{after}$ after one hour elapses. Conditional probabilities P are indicated by values 0 to 1.

As depicted in FIG. 29, the hours of sunlight variance probability table 2813, for example, stores indication that the conditional probability P that the hours of sunlight $H_{before}$ will change from "0.0" to the hours of sunlight $H_{after}$ "0.0" after one hour elapses is "0.86". Further, the hours of sunlight variance probability table 2813 stores indication that the conditional probability P that the hours of sunlight $H_{before}$ will change from "0.1-0.5" to the hours of sunlight $H_{after}$ "0.3" after one hour elapses is "0.07". The hours of sunlight variance probability table 2813 stores similar information concerning other conditional probabilities P. The data structure of the hours of sunlight variance probability table 2813 depicted in FIG. 29 is one example and not limited hereto. For example, the pre-variance hours of sunlight $H_{before}$ may be classified into 11 fields from "0.0" to "1.0", divided at "0.1" intervals.

Figure 30:
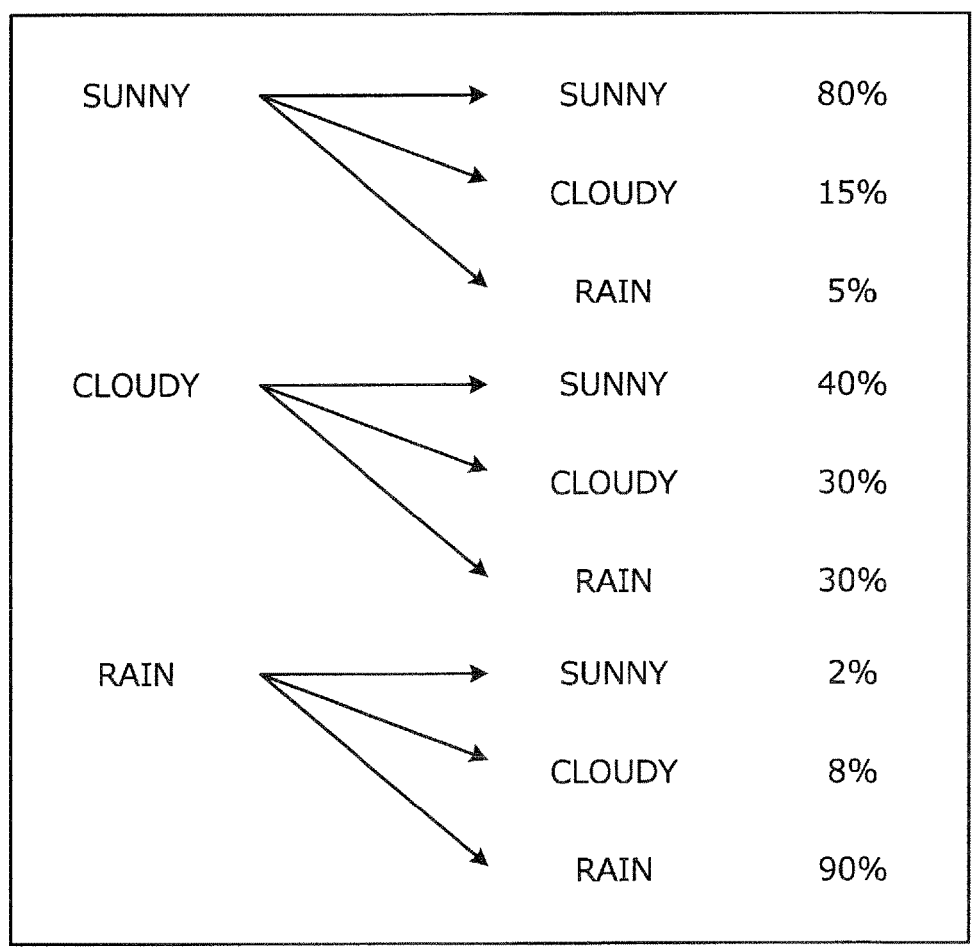
FIG. 30 is a diagram for describing a weather variance model.

FIG. 30 is a diagram for describing the weather variance model. For example, as depicted in FIG. 30, the supply and demand scenario generating unit 2802 performs classification into three types of weather including sunny, cloudy, and rain. The supply and demand scenario generating unit 2802 calculates from past recorded weather data, the probability that the weather will change from the current weather to the weather one hour later 1 (three types, including sunny, cloudy, rain) and thereby, generates the weather variance model. The supply and demand scenario generating unit 2802 recursively applies the weather variance model hourly and thereby, outputs multiple scenarios indicating the possibility of weather changes for one day. The weather variance model depicted in FIG. 30 is one example. More specifically, the supply and demand scenario generating unit 2802 classifies the weather by hours of sunlight and models how the hours of sunlight will change after the respective hours of sunlight.

For example, based on the solar radiation data 2812, the supply and demand scenario generating unit 2802 uses Equation (6) to calculate the conditional probability $P(H_{after}|H_{before})$ that the hours of sunlight $H_{before}$ will changed to the hours of sunlight $H_{after}$ after a unit time elapses.

$P(H_{after}|H_{before})$=(data count of data indicating the hours of sunlight $H_{after}$ occurs after hours of sunlight $H_{before}$)/(data count of data indicating that the hours of sunlight $H_{before}$ occurs)     (6)

By using Equation (6) to calculate the conditional probability $P(H_{after}|H_{before})$ from the past solar radiation data 2812, the supply and demand scenario generating unit 2802 generates the hours of sunlight variance probability table 2813 depicted in FIG. 29.

For example, the supply and demand scenario generating unit 2802 generates multiple output variance scenarios, based on the generated hours of sunlight variance probability table 2813. More specifically, the supply and demand scenario generating unit 2802 receives the start time t0, the end time tn, the initial hours of sunlight value h0, and temporal interval Δt from the receiving unit 2801. The supply and demand scenario generating unit 2802 uses the initial hours of sunlight value h0 as an initial value and by applying the hours of sunlight variance probability table 2813 per unit time from the start time t0 until the end time tn, performs a Monte Carlo simulation to generate N-patterns of probabilistic solar radiation variance scenarios. N is a sufficiently large natural number and is, for example, 10000.

For example, the supply and demand scenario generating unit 2802 generates a uniform random number r, and sets H(t+Δt) as the smallest x for which the cumulative value of a conditional probability P(x|H(t)) that is x or less, is greater than r. For example, when the hours of sunlight H(t) is "0.1", the supply and demand scenario generating unit 2802 refers to the column "0.1-0.5" of the pre-variance hours of sunlight in the hours of sunlight variance probability table 2813 depicted in FIG. 29.

If the generated random number is "r<0.45", the supply and demand scenario generating unit 2802 obtains "H(t+Δt) =0.0"; and if the random number is "0.45≤r<0.6", the supply and demand scenario generating unit 2802 obtains "H(t+Δt) =0.1". Thus, the supply and demand scenario generating unit 2802 obtains the hours of sunlight H(t+Δt) that vary at each temporal interval Δt between the start time t0 and the end time tn.

The supply and demand scenario generating unit 2802 uses a correlative relation between the described hours of sunlight and the amount of solar radiation to convert the obtained hours of sunlight H(t+Δt) into the amount of solar radiation I(t+Δt). The supply and demand scenario generating unit 2802 generates as a solar radiation variance scenario I, variation of the amount of solar radiation I(t) between the start time t0 and the end time tn. The supply and demand scenario generating unit 2802 recursively executes the same processes to thereby generate the N-patterns of a solar radiation variance scenario 2814. N is a sufficiently large natural number and is, for example, 10000.

Figure 31:
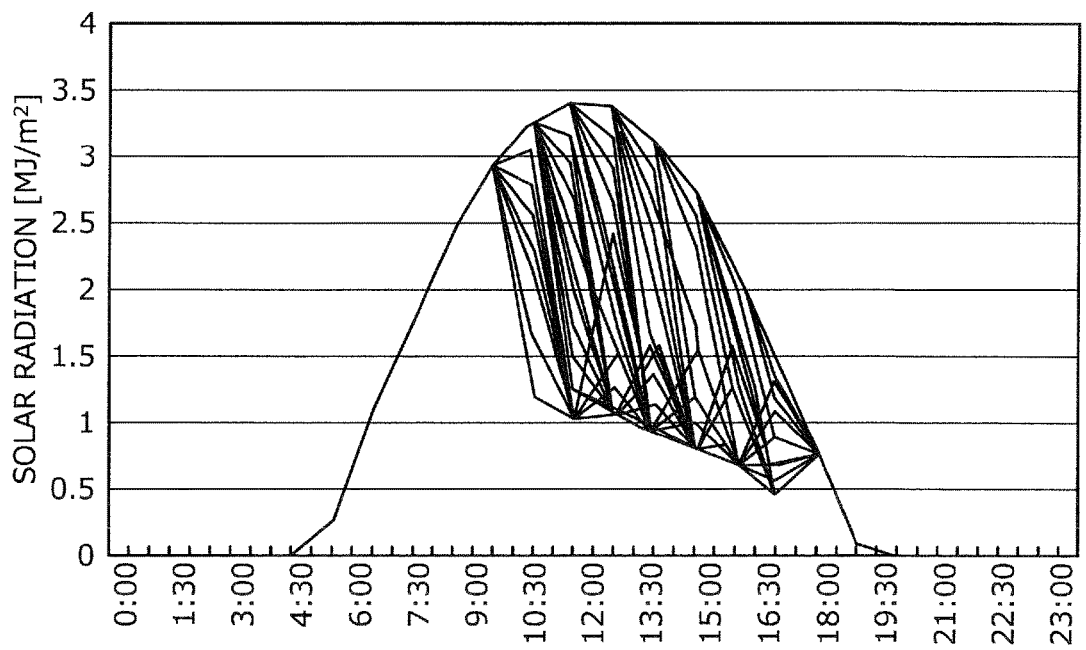
FIG. 31 is a diagram depicting an example of a solar radiation variance scenario 2814.

FIG. 31 is a diagram depicting an example of the solar radiation variance scenario 2814. The horizontal axis in FIG. 31 represents time, and the vertical axis represents the amount of solar radiation [MJ/m$^2$]. In the solar radiation variance scenario 2814, a time period from 9:00 until 16:00 is the solar radiation variance scenario 2814 indicating the variation of the amount of solar radiation from 9:00 until 16:00 and includes N-patterns of scenarios. Further, the time period from 0:00 until 9:00 and the time period from 16:00 until 24:00 are portions created based on the past solar radiation data 2812 and include 1-pattern of scenarios.

For example, based on the solar radiation variance scenario 2814, the supply and demand scenario generating unit 2802 generates the output variance scenario 2815 for photovoltaics. For example, the supply and demand scenario generating unit 2802 converts the amount of solar radiation I(t) [MJ/m$^2$] included in the solar radiation variance scenario 2814 into the amount of power generated O(t) [kWh] by photovoltaics. This conversion, for example, is performed by correlating the amount of solar radiation with a conversion efficiency that changes according to the panel size and type, the temperature, etc. and estimating the amount of power generated. Thus, the supply and demand scenario generating unit 2802 calculates the amount of power generated O(t) from the amount of solar radiation I(t) included in the solar radiation variance scenario 2814 and thereby, generates scenarios for the period from the start time t0 until the end time tn.

Further, for example, the supply and demand scenario generating unit 2802 refers to past data of the amount of photovoltaic power generated and calculates the average power generated for each time period to thereby calculate the power generated from 0:00 until the start time t0 and generates scenarios for the period from the end time tn until 24:00. The supply and demand scenario generating unit 2802 combines scenarios for the period from the start time t0 until the end time tn, the amount of power generated from 0:00 until the start time t0, and scenarios for the period from the end time tn until 24:00 and thereby, generates the output variance scenarios 2815 for one day.

The supply and demand scenario generating unit 2802 stores the generated output variance scenarios 2815 to the storage unit 2800, as output variance data 114. Here, although the use of conversion efficiency has been described, configuration is not limited hereto. For example, a correlative relation between the amount of solar radiation I(t) and the amount of power generated O(t) may be used. More specifically, regression analysis of the amount of solar radiation I(t) and the amount of power generated O(t) is performed and by substituting the amount of solar radiation I(t) into the obtained regression line expression, the amount of power generate O(t) is calculated. For example, the supply and demand scenario generating unit 2802 obtains the difference of the output variance scenarios 2815 and supply and demand variance scenario and thereby, generates multiple supply and demand scenarios.

For example, from the supply and demand power values of the time periods in the supply and demand variance scenario 2816, the supply and demand scenario generating unit 2802 subtracts the power generated in a corresponding time period in the output variance scenario 2815 and thereby, generates the supply and demand scenarios. In other words, the supply and demand scenarios are indices of the amount of power supply and demand with respect to the storage cell 112.

Figure 32:
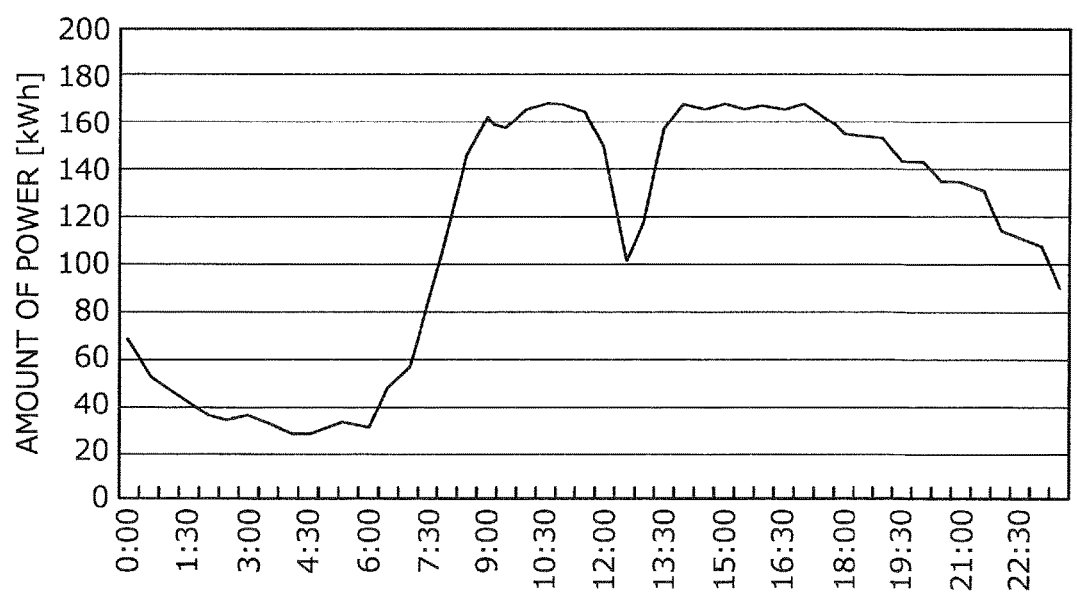
FIG. 32 is a diagram depicting an example of a supply and demand variance scenario.

FIG. 32 is a diagram depicting an example of the demand variance scenario. In FIG. 32, the horizontal axis represents time, and the vertical axis represents the amount of power [kWh]. The demand variance scenario 2816 indicates the possibility of transition of demand during the day for which the operation plan was created. For example, the demand variance scenario 2816 indicates transitions of demand power values for each time period of the day and is generated based on the demand data 2811. In FIG. 32, the demand variance scenario 2816 for one day at a given factory is depicted as an example. In FIG. 32, although the demand variance scenario 2816 is depicted as 1 pattern, the present invention is not limited hereto. For example, the demand variance scenario 2816 may include M patterns when there are differences in the day of the week or seasonal differences, and multiple modes of transitions are expected. M is a natural number.

Figures 33, 34:
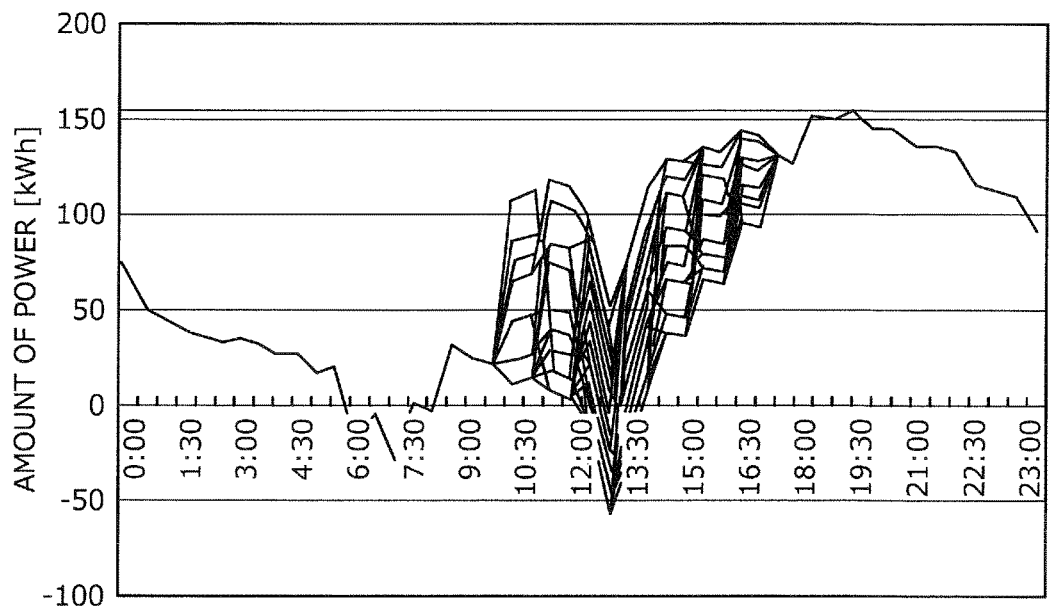
FIG. 33 is a diagram depicting an example of a supply and demand scenario.
FIG. 34 is a diagram depicting an example of an optimal operation assessment table 2817.

FIG. 33 is a diagram depicting an example of a supply and demand scenario. In FIG. 33, the horizontal axis represents time, and the vertical axis represents the amount of power [kWh]. The greater the amount of power is, the greater the demand is. In the supply and demand scenario, the power supply and demand varies according to the time of day as depicted in FIG. 33. For example, when M patterns of supply and demand variance scenarios and N patterns of output variance scenarios are used, the supply and demand scenario generating unit 2802 generates M×N patterns of supply and demand scenarios. Further, the supply and demand scenario generating unit 2802 stores to the scenario DB 700, the generated supply and demand scenarios; and the demand variance scenario 2816, the output variance scenario 2815, and a solar radiation variance scenario 2814 corresponding to the generated supply and demand scenarios.

Description with reference to FIG. 28 is continued. The optimal assessment value calculating unit 2803 calculates for each supply and demand scenario, an operation plan for which the assessment value is optimal when the storage cell 112 is operated, and records the optimal assessment value as a first assessment value for each scenario. For example, the optimal assessment value calculating unit 2803 creates for each supply and demand scenario generated by the supply and demand scenario generating unit 2802, an optimal operation plan for which the assessment value is optimal by simulation. The optimal assessment value calculating unit 2803 correlates and stores to an optimal operation assessment table 2817, the supply and demand scenario, the assessment value by the optimal operation plan, and an optimal control parameter indicating the optimal assessment value.

FIG. 34 is a diagram depicting an example of the optimal operation assessment table 2817. For example, the optimal operation assessment table 2817 correlates and stores the supply and demand scenario "1", the assessment value "36" by the optimal operation plan, and the optimal control parameter "278". In other words, the optimal operation assessment table 2817 indicates that the optimal base discharge value for the supply and demand scenario "1" is 278 [kW] and further indicates that when the storage cell 112 is operated with this base discharge value, the peak cut effect is 36 [kW]. Further, the optimal operation assessment table 2817 similarly correlates and stores for other supply and demand scenarios, supply and demand scenarios, assessment values by the optimal operation plans, and optimal control parameters.

Description with reference to FIG. 28 is continued. Hereinafter, an optimal operation plan creation process performed by the optimal assessment value calculating unit 2803 will be described in detail. Here, a case will be described where the storage cell 112 is operated by a peak cut scheme. For example, the optimal assessment value calculating unit 2803 respectively selects each of the supply and demand scenarios generated by the supply and demand scenario generating unit 2802 and performs the following operations. The optimal assessment value calculating unit 2803 performs simulations that apply various base discharge values and calculates assessment values for the selected supply and demand scenarios. These base discharge values, for example, are within a search range of the control parameter and sequentially applied based on a fixed unit. The base discharge value for which the assessment value is optimized is selected as the optimal operation plan. Here, the search range of the control parameter will be described.

Figures 35, 36:
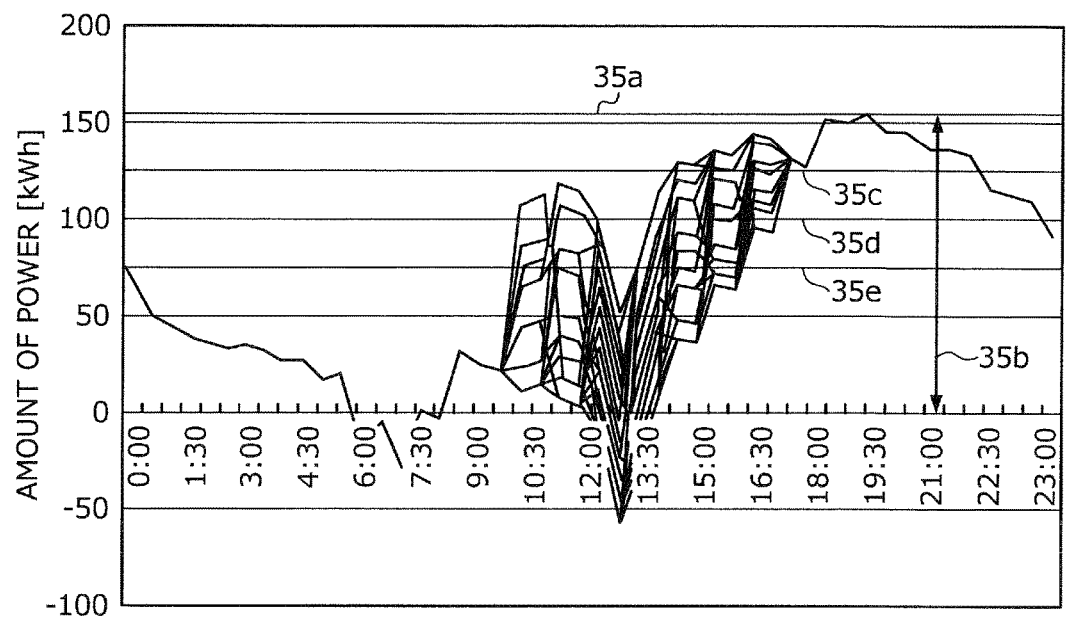
FIG. 35 is a diagram for describing a search range of a control parameter.
FIG. 36 is a diagram depicting an example of an initial operation plan table 2818.

FIG. 35 is a diagram for describing the search range of a control parameter. In FIG. 35, the horizontal axis represents time, and the vertical axis represents the amount of power [kWh]. FIG. 35 depicts the search range of the control parameter for the supply and demand scenario depicted in FIG. 33. When the storage cell 112 is operated by a peak cut scheme, the base discharge value is a positive value that does not exceed the maximum demand value of the supply and demand scenario. Therefore, in the example depicted in FIG. 35, the optimal assessment value calculating unit 2803 uses a range from a maximum demand value 35a to a power value 0 [kWh] as a search range 35b. In other words, the optimal assessment value calculating unit 2803 selects as a base discharge value, an arbitrary power value from the search range 35b and uses the selected base discharge value for simulation. For example, a base discharge value 35c is 125 [kWh], a base discharge value 35d is 100 [kWh], and a base discharge value 35e is 75[kWh].

For example, among the base discharge values within the search range 35b, the optimal assessment value calculating unit 2803 selects a base discharge value 157 [kWh] that is highest and simulates operation of the storage cell 112 at the selected base discharge value 157 [kWh]. The optimal assessment value calculating unit 2803 selects as the next base discharge value, a value that is one fixed unit 1 [kWh] less and similarly recursively performs the process of simulating operation until the lower limit of the search range 35b is reached. The optimal assessment value calculating unit 2803 selects, as the optimal operation plan, the base discharge value indicating the optimal peak cut effect among the base discharge values obtained by simulation.

The optimal assessment value calculating unit 2803 correlates and stores to the optimal operation assessment table 2817, the supply and demand scenario, the optimal peak cut effect, and the base discharge value indicating the optimal peak cut effect. The optimal peak cut effect corresponds to the assessment value by the optimal operation plan; and the base discharge value indicating the optimal peak cut effect corresponds to the optimal control parameter. Further, the optimal assessment value calculating unit 2803 executes the same process for other supply and demand scenarios and thereby, generates the optimal operation assessment table 2817.

The optimal-operation plan search process performed by the optimal assessment value calculating unit 2803 is not limited to the method described above. For example, the base discharge values may be sequentially selected at 1 [kWh] intervals, from the lowest base discharge value 0 [kWh] among the base discharge values within the search range 35b. Further, for example, the base discharge values may be selected at 5 [kWh] intervals. Alternatively, the optimal plan may be searched for using an optimizing algorithm such as Particle Swarm Optimization and a genetic algorithm.

The corrected assessment value calculating unit 2804 creates multiple operation plan candidates and for each operation plan candidate, calculates a second assessment value obtained in a case where the storage cell 112 is operated by the operation plan candidate until the periodic correction, for the scenarios. For example, the corrected assessment value calculating unit 2804 creates multiple candidates for the initial operation plan. The corrected assessment value calculating unit 2804 operates the storage cell 112 by the created initial operation plan until the correction time point. From the remaining capacity of the storage cell thereafter, the corrected assessment value calculating unit 2804 calculates for each supply and demand scenario, an assessment value in the case of operating the storage cell 112 by the optimal corrected operation plan representing the operation plan optimal after the correction time point.

Hereinafter, a process performed by the corrected assessment value calculating unit 2804 will be described. The corrected assessment value calculating unit 2804 creates candidates for the initial operation plan. For example, the corrected assessment value calculating unit 2804 creates a candidate for the initial operation plan, in a range from the smallest value to the largest value among the optimal control parameters in the optimal operation assessment table 2817. The reason for this is that when the storage cell 112 is operated by a peak cut scheme, the peak cut effect for each supply and demand scenario decreases as the base discharge value deviates from the optimal base discharge value for the supply and demand scenario and after a given point, becomes 0.

For example, the corrected assessment value calculating unit 2804 creates as candidates for the initial operation plan, base discharge values at 50 [kW] to 10 [kW] intervals, up to 150 [kW]. The corrected assessment value calculating unit 2804 correlates and stores to an initial operation plan table 2818, the initial operation plan and a control parameter.

FIG. 36 is a diagram depicting an example of the initial operation plan table 2818. The initial operation plan table 2818 correlates and stores initial operation plans and control parameters. Among these, an "initial operation plan" of the initial operation plan table 2818 indicates identification information identifying a candidate for the initial operation plan. Further, a "control parameter" indicates a control parameter of the initial operation plan. For example, the control parameter corresponds to the base discharge value in a case where the storage cell 112 is operated by a peak cut scheme.

For example, the initial operation plan table 2818 correlates and stores the initial operation plan "1" and the control parameter "50". In other words, the initial operation plan table 2818 indicates that the base discharge value of the initial operation plan "1" is 50 [kW]. Further, the initial operation plan table 2818 similarly correlates and stores the initial operation plan and a control parameter for other candidates of the initial operation plan.

A candidate for the initial operation plan corresponds to an initial operation plan; and a base discharge value corresponds to a control parameter. The creation method of a candidate for the initial operation plan is not limited to the method above. For example, the corrected assessment value calculating unit 2804 may arbitrarily create a candidate by the search range 35b.

Description with reference to FIG. 28 is continued. The corrected assessment value calculating unit 2804 creates an optimal corrected operation plan for each initial operation plan candidate. For example, the corrected assessment value calculating unit 2804 simulates for each supply and demand scenario, operation of the storage cell 112 by the initial operation plan candidate. The corrected assessment value calculating unit 2804 calculates from the simulation results, the remaining capacity of the storage cell for a case where the storage cell 112 is operated until the periodic correction. The corrected assessment value calculating unit 2804 creates an optimal operation plan for which the assessment value is optimized in a case of operation from the correction time until the operation end time, where the calculated remaining capacity of the storage cell is regarded as the initial remaining capacity of the storage cell 112; and records the optimal operation plan as the optimal corrected operation plan for the initial operation plan candidate and the combination of scenarios. This optimal output information creation process is implemented by the same procedure as the optimal operation plan creation process performed by the optimal assessment value calculating unit 2803.

The corrected assessment value calculating unit 2804 calculates an assessment value for a case where the storage cell 112 is operated by the initial operation plan candidate until the periodic correction time and by the optimal correction operation plan thereafter; and stores the assessment value to a corrected operation assessment table 2819 as the second assessment value for the initial operation plan candidate and the combination of scenarios.

FIG. 37 is a diagram of an example of the corrected operation assessment table 2819. The corrected operation assessment table 2819 correlates and stores the initial operation plan, the supply and demand scenarios, and the assessment value of optimal corrected operation plan for the initial operation plan. The "initial operation plan" in the corrected operation assessment table 2819 indicates identification information that identifies a candidate for the initial operation plan. The "supply and demand scenario" indicates identification information that identifies a supply and demand scenario. The "assessment value of the optimal corrected operation plan for an initial operation plan P" indicates for each supply and demand scenario concerning the initial operation plan, an assessment value in a case of operating the storage cell 112 by the indicated optimal corrected operation, after the correction time point.

For example, the corrected operation assessment table 2819 correlates and stores the initial operation plan "1", the supply and demand scenario "1", and the assessment value of the optimal corrected operation plan for the initial operation plan P "34". On other words, the corrected operation assessment table 2819 indicates that for supply and demand scenario "1", when the storage cell 112 is operated by the initial operation plan "1" and thereafter, is operated by the optimal corrected operation plan, the assessment value is "34".

Further, the corrected operation assessment table 2819 respectively correlates and stores for the initial operation plan "1", other supply and demand scenarios, and other assessment values of optimal corrected operation plans for other initial operation plans. Thus, the corrected operation assessment table 2819 correlates and stores for one initial operation plan, multiple supply and demand scenarios and multiple assessment values of the optimal corrected operation plan for the initial operation plan P. The corrected operation assessment table 2819 similarly correlates and stores for other initial operation plans, the initial operation plan, supply and demand scenarios, and assessment values of optimal corrected operation plans for initial operation plan.

Description with reference to FIG. 28 is continued. The corrected assessment value calculating unit 2804 similarly executes the process for other initial operation plans. Alternatively, the corrected assessment value calculating unit 2804 may use an optimizing algorithm such as Particle Swarm Optimization or a genetic algorithm to search for an optimal plan. Thus, in the third embodiment, a supply and demand scenario group, an initial operation plan for each supply and demand scenario, and a corrected operation plan for the periodic correction time are obtained and stored to the scenario DB 700.

FIG. 38 is a flowchart depicting and example of the output information creation process procedure by the creating apparatus 600 according to the third embodiment. The creating apparatus 600, via the supply and demand scenario generating unit 2802, executes a supply and demand scenario generating process (step S3801). Details of the supply and demand scenario generating process (step S3801) will be described with reference to FIG. 39.

The creating apparatus 600, via the optimal assessment value calculating unit 2803 and the corrected assessment value calculating unit 2804, generates an initial operation plan (step S3802), and generates a corrected operation plan for the periodic correction time (step S3803), whereby the scenario DB 700 is built. Subsequent operations are the same as those in the first and the second embodiments and the creating apparatus 600, via the early action scenario extracting unit 601, executes the early action scenario extraction process (step S1601), and via the output information creating unit 602, executes the output information creation process (step S1602).

FIG. 39 is a flowchart depicting a process procedure of the supply and demand scenario generating process by the supply and demand scenario generating unit 2802 (step S3801). In FIG. 39, the creating apparatus 600, via the supply and demand scenario generating unit 2802, generates the hours of sunlight variance probability table 2813 from the solar radiation data 2812 (step S3901). The supply and demand scenario generating unit 2802 initializes time t, and the amount of solar radiation I (step S3902), i.e., sets time t=t0 and the amount of solar radiation I(t)=h0.

The creating apparatus 600 determines the amount of solar radiation I(t+Δt) for the time point after the temporal interval Δt (step S3903). The creating apparatus 600 sets the initial hours of sunlight value h0 as an initial value and obtains the hours of sunlight H(t+Δt) for the time point after the temporal interval Δt. The creating apparatus 600 uses the correlative relation between the hours of sunlight and the amount of solar radiation as described above to convert the obtained hours of sunlight H(t+Δt) into the amount of solar radiation I(t+Δt).

The creating apparatus 600 adds the temporal interval Δt to the current time t (step S3904). The creating apparatus 600 compares time t and the end time to to judge whether t<tn is true (step S3905). If t<tn is true (step S3905: YES), the creating apparatus 600 returns to the operation at step S3903. The creating apparatus 600 recursively performs the operations at steps S3903 to S3905, until a solar radiation variance scenario 2814 is generated.

On the other hand, if t<tn is not true (step S3905: NO), the creating apparatus 600 generates the output variance scenario 2815, based on the solar radiation variance scenario 2814 (step S3906). The creating apparatus 600 recursively performs the operations at steps S3902 to S3906 until N patterns of the output variance scenario 2815 are generated. The supply and demand scenario generating unit 2802 obtains the difference of the N patterns of the output variance scenario 2815 and the M patterns of the supply and demand variance scenario to thereby, generates M×N patterns of supply and demand scenarios (step S3907).

Thus, according to the third embodiment, a supply and demand scenario group, an initial operation plan and a periodically corrected operation plan for each supply and demand scenario can be automatically generated. As a result, with respect to an initial operation plan, a supply and demand scenario requiring early action can be identified by simulation.

Thus, according to the present embodiments, operation plan correction rules including an early action time, identification condition, and action (corrected operation plan) are used for operation, thereby enabling the operation plan to be corrected at a suitable timing, using information available at time points during operation. In other words, based on the operation plan correction rules, the state at each time point during the day is monitored and if a state is detected that satisfies an identification condition of any of the operation plan correction rules, operation of the storage cell 112 is switched to the action (corrected operation plan) indicated by the operation plan correction rule, whereby the loss that would have occurred if the operation could not have been suitably corrected at that timing is prevented.

If the system configuration is such that the operation plan creation process requiring a large amount of calculations is preliminarily performed by the creating apparatus 600 in the operation plan creating system 103, resources required for calculation when the operations system 102 is operated can be reduced. In the creation of a suitable operation plan for photovoltaic output fluctuations having a large uncertainty, various situations having the potential of occurring at time points thereafter have to be considered, which requires a large amount of calculations.

In the present embodiments, calculations yielding a suitable operation plan are preliminarily performed by the creating apparatus 600 in the operation plan creating system 103, thereby enabling a configuration where, in the operations system 102, a relatively small amount of calculation processing, including judgment based on an identification condition of an operation plan and operation plan switching, alone is implemented. For example, since the operation plan can be optimized by considering various situations that may occur at each time point regardless of the calculation resources that can be used by the operations system 102 and constraints concerning calculation periods allowed during operation, higher operation results can be achieved.

The creating apparatus 600 implements for scenarios whose action are similar, identification conditions for detecting a situation for which early action is to be taken. Therefore, the possibility that identification conditions and suitable operation plans can be created is increased. Among supply and demand scenarios covering situations that may occur, similar scenarios are included that cannot be distinguished from one another even if complicated conditions combining all available data are used.

With respect to this point, in the present embodiments, with respect to an early action scenario group that has been grouped by action similarity, the creating apparatus 600 attempts to create identification conditions, thereby increasing the possibility that an identification condition can be created. In other words, even for supply and demand scenarios that are difficult to distinguish, if the actions are similar, such supply and demand scenarios need not be distinguished from one another by an identification condition. Further, the classification of action-requiring scenarios by the similarity of the actions is also meaningful in terms of guaranteeing the possibility that a suitable operation plan will be created.

For example, if a scenario whose required action differs drastically is included in the action-requiring scenario group, even if a condition can be created that collectively identifies the scenarios, a single suitable action may not be able to be defined. Therefore, by preliminarily classifying an action-requiring scenario group by action similarity enables such a situation to be prevented.

As described, the creating apparatus, the creating method, and the creating program enable a correction operation plan to be created that can detect a situation where the effect is adversely affected if the correction time point of the operation plan is late, before the adverse effect occurs. As a result, in an operations system, a situation where the effect is adversely affected if the correction time of the operation plan is late can be detected before the adverse effect occurs, enabling the operation plan to be suitably corrected at the time of detection.

According to one aspect of the present invention, an effect is achieved where in situations in which results are adversely affected if the correction time of the operation plan is late, a corrected operation plan that can detect such situations before the adverse effects occur can be created.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation plan creating method of a power generating system having a power generating apparatus configured to generate power according to an environmental condition from an external source, and a storage cell configured to be charged by the power from the power generating apparatus and discharged according to power supply and demand, the creating method executed by a computer comprising:

calculating based on a first corrected operation plan and a second corrected operation plan, an assessment value that indicates whether at an action time, the first corrected operation plan has to be corrected into the second corrected operation plan, the first corrected operation plan obtaining a discharge amount optimal when an operation plan related to the discharge amount from the storage cell is corrected at a given periodic correction time, the second corrected operation plan obtaining a discharge amount optimal when an initial operation plan of the storage cell is corrected at the action time different from the periodic correction time, the assessment value being calculated for a plurality of power supply and demand scenarios stored in a storage unit and indicating transitions of the power supply and demand according to the environmental condition from the external source;

extracting from among the plurality of power supply and demand scenarios and based on the calculated assessment value, an action-requiring scenario requiring the first corrected operation plan to be corrected to the second corrected operation plan at the action time;

classifying from the extracted action-requiring scenario and based on the initial operation plan for the action-requiring scenario and the second corrected operation plan, a timing-change action scenario that corrects, at the action time, the initial operation plan for the action-requiring scenario;

generating for the classified timing-change action scenario and based on the environmental condition from the external source, an identification condition that identifies the classified timing-change action scenario;

correlating and outputting the generated identification condition and the classified timing-change action scenario; and controlling charging and discharging of the storage cell based on the output identification condition and timing-change action scenario.

2. The creating method according to claim 1, wherein the extracting includes extracting as the action-requiring scenario, a power supply and demand scenario for which the assessment value is greater than or equal to a threshold.

3. The creating method according to claim 1, wherein the extracting includes extracting as the action-requiring scenario, a power supply and demand scenario group for which the assessment value is relatively high.

4. The creating method according to claim 1, wherein the classifying includes classifying the action-requiring scenario to a timing-change action scenario group that performs an action of controlling discharge of the storage cell, if the second corrected operation plan is greater than or equal to the operation plan.

5. The creating method according to claim 1, wherein the classifying includes classifying the action-requiring scenario to a timing-change action scenario group that performs an action of facilitating discharge of the storage cell, if the second corrected operation plan is less than the operation plan.

6. The creating method according to claim 1, wherein the classifying includes building a regression tree in which nodes represent a plurality of division rules for classifying the action-requiring scenario and classifying based on the regression tree, the action-requiring scenario into timing-change action scenarios corresponding to leaf nodes of the regression tree, the generating of the identification condition includes generating the identification condition for the timing-change action scenario, based on the division rules en route to a corresponding leaf node in the regression tree, and the correlating and outputting to create output information includes correlating and outputting the generated identification condition and the classified timing-change action scenario.

7. The creating method according to claim 6, wherein the generating of the identification condition includes classifying based on the regression tree, a plurality of non-action-requiring scenarios among the power supply and demand scenarios and excluding action-requiring scenarios, the plurality of non-action-requiring scenarios being classified into a plurality of non-action-requiring scenarios corresponding to a leaf node of the regression tree; and for each non-action-requiring scenario of the plurality of non-action-requiring scenarios, when a difference of a first assessment value and a second assessment value is outside a permitted range, the generating further includes excluding an identification condition that is based on the division rules en route to the leaf node to which the non-action-requiring scenario belongs, the first assessment value being obtained when the operation plan is corrected at the early action time according to an action of the timing-change action scenario and the second assessment value being obtained when the operation plan is not corrected.

8. The creating method according to claim 1 and further comprising executing a process of generating the scenarios, using a stochastic generation model of output fluctuations of power generation by natural energy, wherein the calculating of the assessment value includes calculating for each of the generated power supply and demand scenarios, an assessment value indicating whether an action to correct the first corrected operation plan into the second corrected operation plan at the early action time is necessary, the assessment value being calculated based on the first corrected operation plan and the second corrected operation plan.

9. A non-transitory, computer-readable recording medium stores an operation plan creating program that creates an operation plan of a power generating system having a power generating apparatus configured to generate power according to an environmental condition from an external source, and a storage cell configured to be charged by the power from the power generating apparatus and discharged according to power supply and demand, the creating program causing a computer to execute a process comprising:

calculating based on a first corrected operation plan and a second corrected operation plan, an assessment value that indicates whether at an action time, the first corrected operation plan has to be corrected into the second corrected operation plan, the first corrected operation plan obtaining a discharge amount optimal when an operation plan related to the discharge amount from the storage cell is corrected at a given periodic correction time, the second corrected operation plan obtaining a discharge amount optimal when an initial operation plan of the storage cell is corrected at the action time different from the periodic correction time, the assessment value being calculated for a plurality of power supply and demand scenarios stored in a storage unit and indicating transitions of the power supply and demand according to the environmental condition from the external source;

extracting from among the plurality of power supply and demand scenarios and based on the calculated assessment value, an action-requiring scenario requiring the first corrected operation plan to be corrected to the second corrected operation plan at the action time;

classifying from the extracted action-requiring scenario and based on the initial operation plan for the action-requiring scenario and the second corrected operation plan, a timing-change action scenario that corrects, at the action time, the initial operation plan for the action-requiring scenario;

generating for the classified timing-change action scenario and based on the environmental condition from the external source, an identification condition that identifies the classified timing-change action scenario;

correlating and outputting the generated identification condition and the classified timing-change action scenario; and controlling charging and discharging of the storage cell based on the output identification condition and timing-change action scenario.

10. An operation plan creating apparatus of a power generating system having a power generating apparatus configured to generate power according to an environmental condition from an external source, and a storage cell that is configured to be charged by the power from the power generating apparatus and discharged according to power supply and demand, the creating apparatus comprising a memory; and
a processor coupled to the memory, the processor being configured to:

calculate based on a first corrected operation plan and a second corrected operation plan, an assessment value that indicates whether at an action time, the first corrected operation has to be corrected into the second corrected operation plan, the first corrected operation plan obtaining a discharge amount optimal when an operation plan related to the discharge amount from the storage cell is corrected at a given periodic correction time, the second corrected operation plan obtaining a discharge amount optimal when an initial operation plan of the storage cell is corrected at the action time different from the periodic correction time, the assessment value being calculated for a plurality of power supply and demand scenarios stored in a storage unit and indicating transitions of the power supply and demand according to the environmental condition from the external source;

extract from among the plurality of power supply and demand scenarios and based on the calculated assessment value, an action-requiring scenario requiring the first corrected operation plan to be corrected to the second corrected operation plan at the action time;

classify from the extracted action-requiring scenario and based on the initial operation plan for the action-requiring scenario and the second corrected operation plan, a timing-change action scenario that corrects at the action time, the initial operation plan for the action-requiring scenario;

generate for the classified timing-change action scenario and based on the environmental condition from the external source, an identification condition that identifies the classified timing-change action scenario;

correlate and output the generated identification condition and the classified timing-change action scenario; and control charging and discharging of the storage cell based on the output identification condition and timing-change action scenario.

* * * * *